United States Patent
Petré et al.

(10) Patent No.: US 7,623,571 B2
(45) Date of Patent: Nov. 24, 2009

(54) WIDEBAND MULTIPLE ACCESS TELECOMMUNICATION METHOD AND APPARATUS

(75) Inventors: Frederik Petré, Landen (BE); Geert Leus, Hasselt (BE); Marc Moonen, Herent-Winksele (BE)

(73) Assignee: IMEC, Leuven (BE)

( * ) Notice: Subject to any disclaimer, the term of this patent is extended or adjusted under 35 U.S.C. 154(b) by 0 days.

(21) Appl. No.: 11/599,680

(22) Filed: Nov. 15, 2006

(65) Prior Publication Data
US 2007/0064775 A1    Mar. 22, 2007

Related U.S. Application Data

(62) Division of application No. 10/134,307, filed on Apr. 26, 2002, now Pat. No. 7,158,558.

(60) Provisional application No. 60/286,486, filed on Apr. 26, 2001.

(51) Int. Cl.
*H03H 7/30* (2006.01)
*H04B 1/10* (2006.01)
*G06F 17/10* (2006.01)

(52) U.S. Cl. .................. 375/229; 375/350; 708/323

(58) Field of Classification Search .................. 375/144, 375/145, 146, 147, 229, 232, 285, 346, 350, 375/142, 148, 150, 347, 349, 136, 260, 267, 375/316, 324; 370/335, 503, 342, 320, 441, 370/479; 455/562.1, 130, 334; 708/300, 708/308, 310, 320, 322, 323, 440, 819

See application file for complete search history.

(56) References Cited

U.S. PATENT DOCUMENTS

| | | | | |
|---|---|---|---|---|
| 5,461,640 A | * | 10/1995 | Gatherer | 375/231 |
| 5,862,186 A | * | 1/1999 | Kumar | 375/324 |
| 6,301,298 B1 | * | 10/2001 | Kuntz et al. | 375/232 |
| 6,426,972 B1 | * | 7/2002 | Endres et al. | 375/229 |
| 6,522,683 B1 | * | 2/2003 | Smee et al. | 375/144 |
| 6,580,750 B2 | | 6/2003 | Aue | |
| 6,665,545 B1 | * | 12/2003 | Raleigh et al. | 455/562.1 |
| 6,671,334 B1 | * | 12/2003 | Kuntz et al. | 375/340 |
| 6,801,565 B1 | | 10/2004 | Bottomley et al. | |
| 6,937,292 B1 | * | 8/2005 | Patel et al. | 348/614 |
| 6,990,137 B2 | | 1/2006 | Smee et al. | |
| 2001/0046255 A1 | | 11/2001 | Shattil | |

(Continued)

OTHER PUBLICATIONS

Milstein, "*Wideband Code Division Multiple Access*", (2000) IEEE Journal on Selected Areas in Communication, vol. 18, No. 8, pp. 1344-1354.

(Continued)

*Primary Examiner*—Tesfaldet Bocure
*Assistant Examiner*—Lawrence B Williams
(74) *Attorney, Agent, or Firm*—Knobbe Martens Olson & Bear, LLP

(57) ABSTRACT

A method and system for retrieving a desired user data symbol sequence from a received signal are disclosed. In one embodiment, the method includes i) receiving a channel modified version of a transmitted signal comprising a plurality of user data symbol sequences, each being encoded with a user specific known code, ii) determining an equalization filter directly and in a deterministic way from the received signal and iii) applying the equalization filter on the received signal to thereby retrieve the transmitted signal.

27 Claims, 25 Drawing Sheets

U.S. PATENT DOCUMENTS

2002/0191568 A1* 12/2002 Ghosh .................. 370/335
2003/0165187 A1 9/2003 Tesfai et al.
2007/0104282 A1* 5/2007 Vihriala .................. 375/260

OTHER PUBLICATIONS

Tsatasnis, "*Inverse Filtering Criteria for CDMA Systems*", (1997) IEEE Transactions on Signal Processing, vol. 45, No. 1, pp. 102-112.

Tsatasnis et al., "*Performance Analysis of Minimum Variance CDMA Receivers*", (1998) IEEE Transactions on Signal Processing, vol. 46, No. 11, pp. 3014-3022.

Wang et al., "*Blind Equalization and Multiuser Detection in Dispersive CDMA Channels*", (1998) IEEE Transactions on Communications, vol. 46, No. 1, pp. 91-103.

Ghauri et al., "*Blind and Semi-blind Single User Receiver Techniques for Asynchronous CDMA in Multipath Channels*", (1998) IEEE, pp. 3572-3577.

Petre et al., "*Extended MMSE Receiver for Multiuser Interference Rejection in Multipath DS-CDMA Channels*", (1999) Vehicular Technology Conference, vol. 3, pp. 1840-1844.

Gesbert et al., "*Blind Multiuser MMSE Detector for CDMA Signals in ISI Channels*", (1999) IEEE Communications Letters, vol. 3, No. 8, pp. 233-235.

Honig et al., "*Multiuser CDMA Receivers*", (2000) IEEE Signal Processing Magazine, vol. 17, No. 3, pp. 49-63.

Klein, "*Data Detection Algorithms Specially Designed for the Downlink of CDMA Mobile Radio Systems*", (1997) IEEE, pp. 203-207.

Frank et al., "*Adaptive Interference Suppersion for Direct-Sequence CDMA Systems with Long Spreading Codes*", (1998) Allerton Conference on Communication, Control and Computing, pp. 411-420.

Ghauri et al. "*Linear Receivers for the DS-CDMA Doenlink Exploiting Orthogonality of Spreading Sequences*", (1998) IEEE vol. 1, pp. 650-654.

Krauss et al. "*Simple MMSE Equalizers for CDMA Downlink to Restore Chip Sequence: comparison to Zero-forcing and Rake*", (2000) IEEE, pp. 2865-2868.

Krauss et al., "*Blind Channel Identification on CDMA Forward Link Based on Dual Antenna Receiver at Hand-Set and Cross-Relation*", (1999) IEEE, pp. 75-79.

Li et al., "*A New Blind Receiver for Downlink DS-CDMA Communications*", (1999) IEEE Communications Letters, vol. 3, No. 7, pp. 193-195.

Mudulodu et al., "*A Blind Multiuser Receiver for the CDMA Downlink*", (2000) IEEE, pp. 2933-2936.

Vauhan, "*Polarization Diversity in Mobile Communications*", (1990) IEEE Transactions on Vehicular Technology, vol. 39, No. 3, pp. 177-186.

Correal et al., "*Enhanced DS-CDMA Uplink Performance Through Base Station Polarization Diversity and Multistage Interference Cancellation*", (1998) IEEE, pp. 1905-1910.

Fantacci, "*An Efficient RAKE Receiver Architecture with Pilot Signal Cancellation for Downlink Communications in DS-CDMA Indoor Wireless Networks*", (1999) IEEE Transactions on Communications, vol. 47, No. 6, pp. 823-827.

Gesbert et al., "*On-Line Blind Multichannel Equalization Based on Mutually Referenced Filters*", (1997) IEEE Transactions on Signal Processing, vol. 45, No. 9, pp. 2307-2317.

Petre et al., "*Pilot-aided Adaptive Chip Equalizer Receiver for Interference Suppression in DS-CDMA Forward Link*", Vehicular Technology Conference, (2000) vol. 1, pp. 303-308.

Buzzi et al., "*Channel Estimation and Multiuser Detection in Long-Code DS/CDMA Systems*", (2001) IEEE Journal on Selected Areas in Communications, vol. 19, No. 8, pp. 1476-1487.

S. Verdu, "*Multiuser Detection*", (1998) Cambridge University Press.

Holma et al., "*WCDMA for UMTS*", (2001) Wiley.

S. Haykin, "*Adoptive Filter Theory*", (1996) Prentice Hall, 3rd edition.

J. Proakis, "*Digital Communications!*", (1995) McGraw-Hill, 3rd edition.

Price et al., "*A Communication Technique for Multipath Channels*", (1958) IRE, vol. 46, pp. 555-570.

G. Leus, "*Signal Processing Algorithms for CDMA-Based Wireless Communications*" (2000) Ph.D. Thesis KULeuven.

Hooli et al., "*Multiple Access Interference Suppression with Linear Chip Equalizers in WCDMA Downlink Receivers!*" (1999) Globecom, vol. General Conference (Part A), pp. 467-471.

Leus, "Signal processing algorithms for CDMA-based wireless communications", *Thesis* (2000) pp. 1-231.

Office Action issued on Apr. 2, 2009 in U.S. Appl. No. 10/424,543, filed Apr. 25, 2003.

* cited by examiner

WIDEBAND MULTIPLE ACCESS TELECOMMUNICATION METHOD AND APPARATUS

RELATED APPLICATIONS

This application is a divisional application of U.S. application Ser. No. 10/134,307, filed Apr. 26, 2002, now U.S. Pat. No. 7,158,558 which claims benefit of 60/286,486 filed on Apr. 26, 2001, the full disclosure of which is incorporated herein by reference.

FIELD OF THE INVENTION

The invention relates to telecommunication methods and systems, more in particular Wide-band Code Division Multiple Access (WCDMA) for wireless communications.

DESCRIPTION OF RELATED TECHNOLOGY

Wideband direct sequence code division multiple access (WCDMA) is emerging as the pre-dominant wireless access mode for forthcoming 3G systems, because it offers higher data rates and supports larger number of users over mobile wireless channels compared to conventional access techniques like TDMA and narrowband CDMA [1]. Demodulation of WCDMA signals in multi-path channels is conventionally achieved with a Maximum Ratio Combining (MRC) RAKE receiver [2]. Although the RAKE receiver is optimal for single-user multi-path channels, multi-user interference (MUI) severely limits its performance in a multi-user setting. Moreover, the MUI is enhanced by the near/far situation in the uplink, where the data signal of a desired farby user can be overwhelmed by the data signal of an interfering nearby user.

Multi-user detection techniques, that use joint code, timing and channel information, alleviate the near/far problem and offer significant performance improvement compared to the RAKE receiver [3]. Linear symbol-level multi-user equalizer receivers, that implicitly depend on the instantaneous code-correlation matrix, have been extensively studied in [4], [5], [6], [7], [8] and [9]. Practical adaptive implementations of these receiver techniques require a constant code-correlation matrix in order to guarantee convergence of the adaptive updating algorithm and therefore call for the use of short spreading codes (the code period equals the symbol period) [10]. Although well-suited for implementation in the basestation (the standard foresees a mode with short spreading codes for the uplink [11], these techniques can not be used in the mobile station since the WCDMA downlink employs long spreading codes (the code period is much longer than the symbol period).

In the WCDMA downlink, the symbol streams of the different active users are multiplexed synchronously to the transmission channel by short orthogonal spreading codes that are user specific and a long overlay scrambling code that is base-station specific. The MUI is essentially caused by the channel, since the different user signals are distorted by the same multi-path channel when propagating to the mobile station of interest. Moreover, power control in the downlink enhances the MUI and creates a far/near situation where the data signal of a desired nearby user is overwhelmed by the data signal intended for a farby user. Linear chip-level equalization, introduced in [12], can restore the orthogonality of the user signals and suppress the MUI. Ideal Zero-Forcing (ZF) and Minimum Mean Squared Error (MMSE) chip-level equalizer receivers have also been investigated in [13], [14], [15] and [16]. They consist of a linear chip-level equalizer mitigating the inter-chip interference (ICI), followed by a descrambler/despreader and a decision device.

However, adaptive implementations of such chip-level equalizer receivers that can track time-varying multi-path channels are hard to realize in practice because of two reasons. On the one hand, sending a training chip sequence at regular time instants in correspondence with the coherence time of the channel, would reduce the system's spectral efficiency. On the other hand, using blind techniques that do not require any training overhead, would reduce the system's performance. Nevertheless, most current proposals use blind algorithms to determine the equalizer coefficients. One method applies a standard single-user blind channel identification algorithm and employs the obtained channel estimate to calculate the equalizer coefficients [17]. Another blind approach, pursued in [18] and [19] makes use of the fact that, in the absence of noise, the received signal after equalization should lie in the subspace spanned by the user codes.

GB 2362 075 A describes a Wideband Code Division Multiple Access (WCDMA) method, wherein according to FIG. 4 therein, from the received signal time-delayed versions are made, each of each time-delayed versions are correlated with each of the codes available within the communication system. Said correlated time-delayed signals are then each filtered with a user specific and signal dependent filter. Said filtered correlated time-delayed signals are then finally decimated and combined. It is important to note that the step of time-delaying, correlating (here denoted despreading) and filtering happens at chip-rate signals.

SUMMARY OF CERTAIN INVENTIVE ASPECTS

One embodiment of the invention provides in a wireless communication system having at least one basestation and at least one terminal, a method of wideband multiple access communication, comprising transmitting a block from a basestation to a terminal, the block comprising a plurality of chip symbols scrambled with a base station specific scrambling code, the plurality of chip symbols comprising a plurality of spread user specific data symbols which are user specific data symbols spread by using user specific spreading codes and at least one pilot symbol, and performing in the terminal generating a plurality of independent signals having at least a channel distorted version of the transmitted block, combining the plurality of independent signals with a combiner filter with filter coefficients which are determined by using the pilot symbol, thus obtaining a combined filtered signal and despreading and descrambling the combined filtered signal with a composite code of the basestation specific scrambling code and one of the user specific spreading codes.

Another embodiment of the invention provides in a wireless communication system having at least one basestation and at least one terminal, a method of wideband multiple access communication, comprising transmitting a block from a basestation to a terminal, the block comprising a plurality of chip symbols scrambled with a base station specific scrambling code, the plurality of chip symbols comprising a plurality of spread user specific data symbols, which are user specific data symbols spread by using user specific spreading codes and at least one pilot symbol, transmitting projection information, enabling projecting of a signal on the orthogonal complement of the space spanned by the composite codes of the basestation specific scrambling code and the user specific codes, and performing in the terminal generating at least two independent signals comprising at least a channel distorted version of the transmitted block, combining with a combiner filter with filter coefficients determined by using the projection information being determined on the signals, thus obtaining a combined filtered signal and despreading and descrambling the combined filtered signal with a composite code of the basestation specific scrambling code and one of the user specific codes.

Another embodiment of the invention provides a receiver system for wireless communication, comprising a receiver configured to receive a block comprising a plurality of chip symbols which are data symbols spread by using scrambling and spreading codes and at least one pilot symbol, at least one combining filter circuit configured to receive at least two independent signals derived from the received block and output a multi-user interference suppressed signal, and at least one despreading circuit configured to despread the multi-user interference suppressed signal with one of the scrambling and spreading codes.

Another embodiment of the invention provides a receiver system for wireless communication, comprising a receiver configured to receive a block comprising a plurality of chip symbols which are data symbols spread by using scrambling and spreading codes, and projection information, enabling projecting of a signal on the orthogonal complement of the space spanned by scrambling and spreading codes, at least one combining filter circuit configured to input at least two independent signals derived from the received block and output a multi-user interference suppressed signal, and at least one despreading circuit configured to despread the multi-user interference suppressed signal with one of the scrambling and spreading codes.

Another embodiment of the invention provides a receiver system for wireless communication, comprising J combining filter circuits, each of the combining filter circuits receiving a plurality of independent signals and outputting a multi-user interference suppressed signal, a circuit configured to determine the coefficients of the combining filters circuit, a plurality of despreading circuits configured to despread the J multi-user interference suppressed signals and a combining circuit configured to combine the J multi-user interference suppressed signals.

Still another embodiment of the invention provides in a wireless communication system having at least one basestation and at least one terminal, a method of wideband multiple access communication, comprising receiving a block comprising a plurality of chip symbols scrambled with a base station specific scrambling code, the plurality of chip symbols comprising a plurality of spread user specific data symbols which are user specific data symbols spread by using user specific spreading codes and at least one pilot symbol, generating at least two independent signals based on the received block, and combining the at least two independent signals with a combiner filter having filter coefficients which are determined by using the pilot symbol, thus obtaining a combined filtered signal.

Still another embodiment of the invention provides a receiver system for wireless communication, comprising means for receiving a block comprising a plurality of chip symbols scrambled with a base station specific scrambling code, the plurality of chip symbols comprising a plurality of spread user specific data symbols which are user specific data symbols spread by using user specific spreading codes and at least one pilot symbol, means for generating at least two independent signals based on the received block and means for combining the at least two independent signals with a combiner filter having filter coefficients which are determined by using the pilot symbol, thus obtaining a combined filtered signal.

Yet another embodiment of the invention provides a method of retrieving a desired user data symbol sequence from a received signal, the method comprising receiving a channel modified version of a transmitted signal comprising a plurality of user data symbol sequences, each being encoded with a user specific known code, determining an equalization filter directly and in a deterministic way from the received signal, and applying the equalization filter on the received signal to thereby retrieve the transmitted signal.

Yet another embodiment of the invention provides a system for retrieving a desired user data symbol sequence from a received signal, comprising means for receiving a channel modified version of a transmitted signal comprising a plurality of user data symbol sequences, each being encoded with a user specific known code, means for determining an equalization filter directly and in a deterministic way from the received signal, and means for applying the equalization filter on the received signal to thereby retrieve the transmitted signal.

DETAILED DESCRIPTION OF CERTAIN INVENTIVE EMBODIMENTS

A. System Overview

Figure 1:
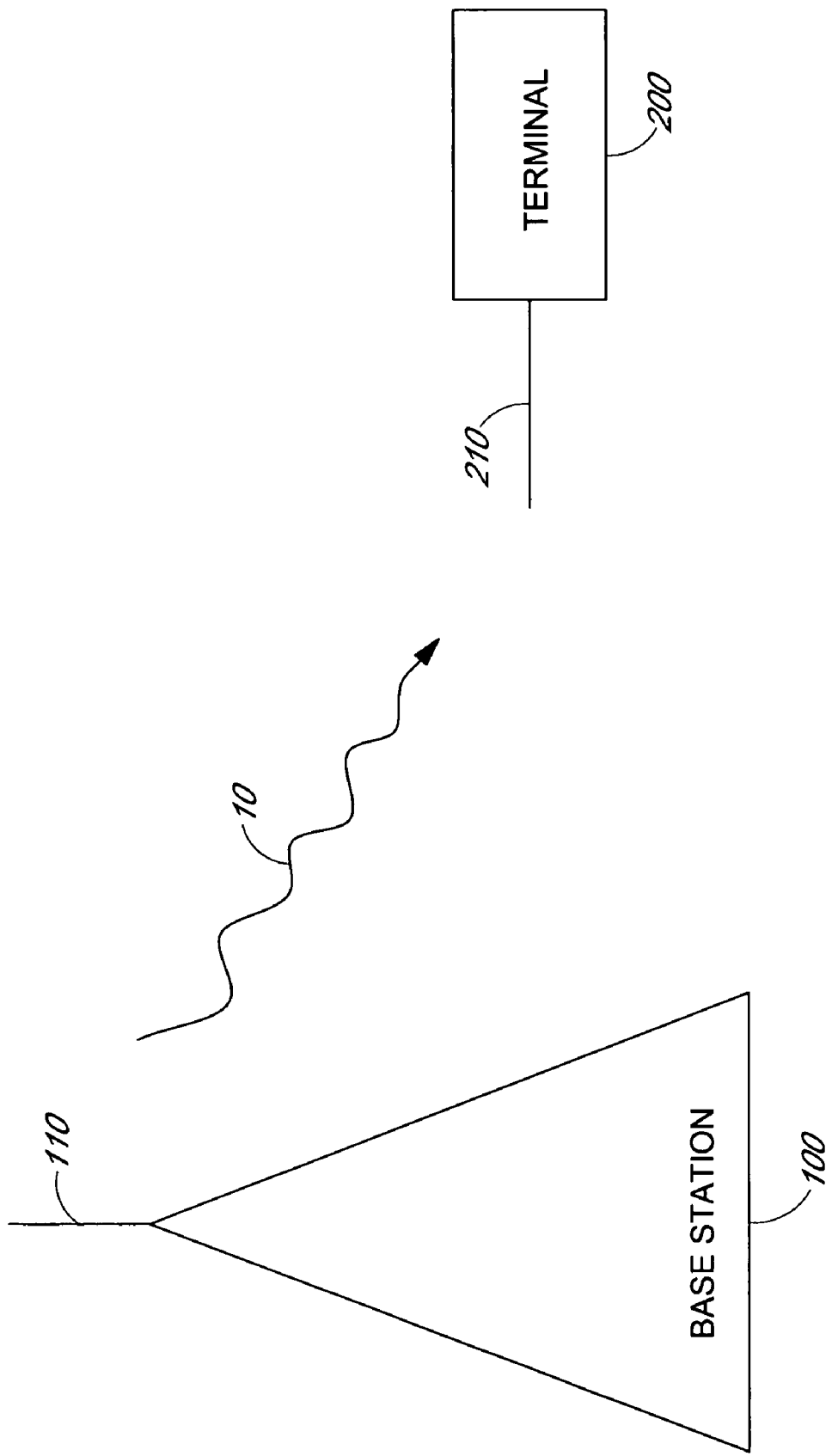
FIG. 1 illustrates a telecommunication system in a single-cell configuration.
Figure 2:
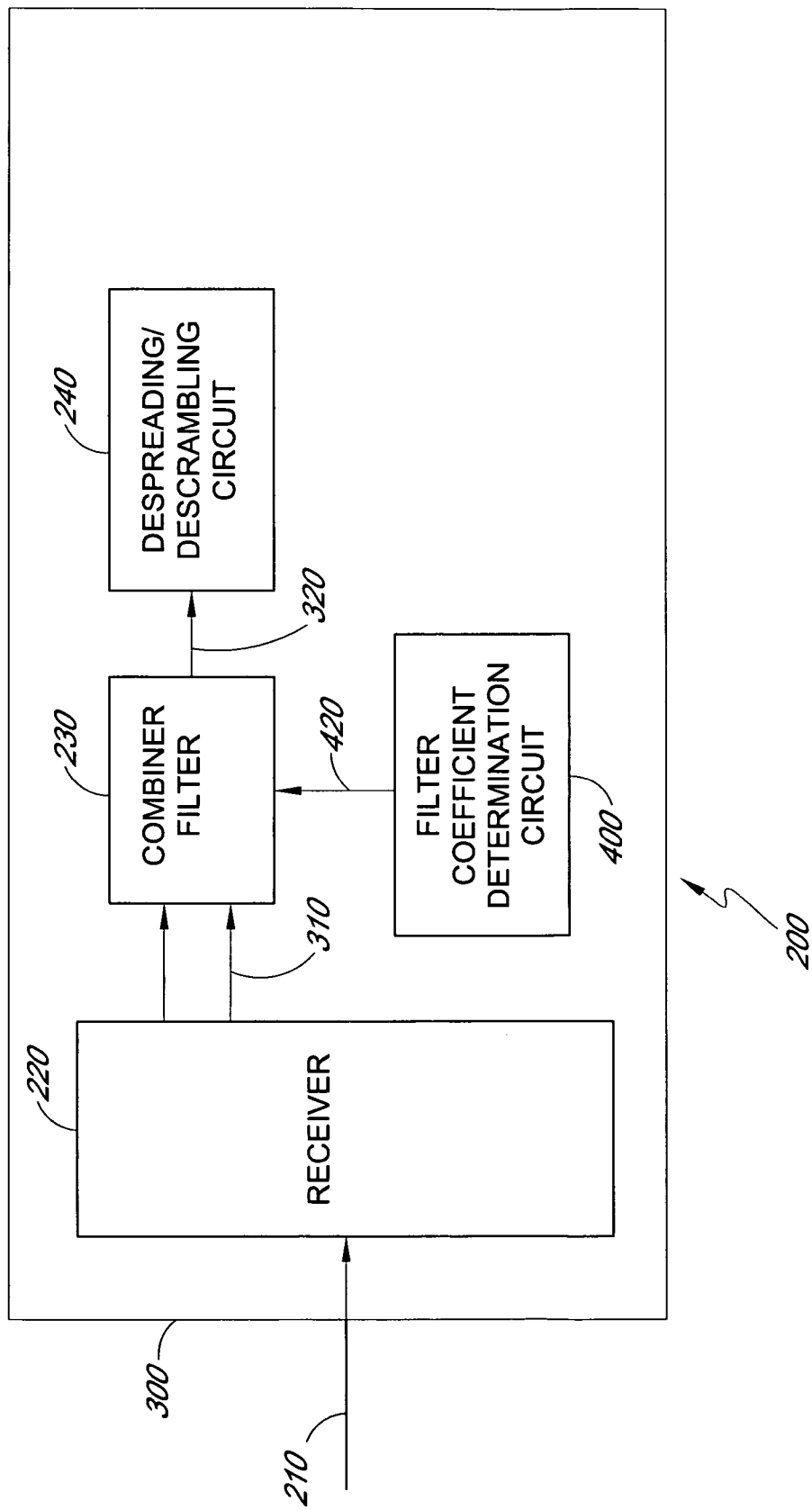
FIG. 2 illustrates a block diagram of a telecommunication system according to one embodiment of the invention.

In the invention, methods for communication, more in particular, wireless communication, between devices and the related devices are presented (FIG. 1). In said method at least data (10) is transmitted from at least one basestation (100) to at least one terminal (200). Said communication method is extendable to a case with a plurality of basestations (FIG. 5, 100, 110), each basestation being designed for covering a single cell (FIG. 5, 20, 21) around such basestation. In such multiple basestation and hence multicell case a terminal receives typically signals from both the most nearby basestation and other basestations. Within the method it is assumed that the basestation has at least one antenna (110) and the terminal also has at least one physical antenna (210). The communication between the basestation(s) and the terminal is designed such that said communication is operable in a context with multiple terminals. Hence it is assumed that substantially simultaneous communication between said basestation(s) and a plurality of terminals is happening, while it can still be distinguished at the terminal side which information was intended to be transmitted to a dedicated terminal. The notion of a user is introduced. It is assumed that with each terminal in such a multi terminal context at least one user is associated. The invented communication method and related devices exploit spreading with orthogonal codes as method for separating information streams being associated with different users. Hence at the basestation side information, more in particular data symbols, of different users, hence denoted user specific data symbols are available. After spreading spread user specific data symbols are obtained. These spread user specific data symbols are added, leading to a sum signal of spread user specific data symbols. Further additional scrambling of said sum signal is performed by a scrambling code being basestation specific. Symbols obtained after spreading or spreading and scrambling, and summing are denoted chip symbols. In the invented communication method blocks with a plurality of said chip symbols are transmitted. In a single basestation case the transmitted signal thus comprises of a plurality of time overlapped coded signals, each coded signal being associated to an individual user and distinguishable only by a user specific encoding, based on the user signature or spreading codes. In a multiple basestation context, the distinguishing also exploits said basestation specific code. Further such blocks have at least one pilot symbol (also called training sequence and denoted by $s_p[i]$ in equation (46)) being predetermined and known at both sides of the transmission link. In the invented method the availability of a receiver (FIG. 2, 220) being capable of generating at least two independent signals (310) from a received signal is assumed. Said receiver receives a spread-spectrum signal, corresponding to a superposition of the signals of all users active in the communication system or link, more in particular said superposition of signals is channel distorted. Said generation of at least two independent signals can be obtained by having either at least two antennas at the terminal, each independent signal being the signal (300) received at such antenna after the typical down-converting and filtering steps. In case of a single antenna terminal, polarization diversity [20] of said single antenna can be exploited or the temporal oversampling of the transmitted signal can be used. In all case these independent signals are channel distorted versions (caused by the time-dispersive nature of the multi-path channel and described by equation (47)) of the signal transmitted by the basestation(s), including the transmitted block of chip symbols. Alternatively formulated it can be stated that the receiver or front-end circuitry provides for samples, typically complex baseband samples for a plurality of channels (either via different antennas or via polarisation diversity or oversampling) in digital format.

Recall that the invention exploits spreading with orthogonal codes for separating different users. Unfortunately said channel distortion is destroying the orthogonality of the used codes, leading to a bad separation. This problem is denoted multi-user interference. Hence the invention concerns a method for retrieving a desired user's symbol sequence (denoted by $s_k[i]$ in equation (46)), from a received signal transmitted in a communication context with multi-user interference. In said method a step of inputting or receiving said received signal, being a channel distorted version of a transmitted signal comprising a plurality of user data symbol sequences, each being encoded with a user specific known code is found.

It is an aspect of the invention to provide a method which suppresses the multi-user interference by performing operations on the chip symbols, hence before despreading and descrambling. This multi-user interference suppression is obtained by performing combining of said independent signals resulting in a combined filtered signal (320). In an embodiment of the invention said combining, also denoted chip-level equalization, is a linear space-time combining. For said combining (chip-level equalizer) a combiner filter (230) is used. The (chip-level equalization) filter coefficients (420) of said combiner filter are determined directly from said independent signals (310), hence without determining an estimate of the channel characteristic. One can state that from said independent signals (310) in a direct and deterministic way a chip-level equalization filter is determined. Said chip-level equalization filter is such that said transmitted signal is retrieved when applying said filter to said received signal.

More in particular said filter coefficients are determined by using said independent signals and the knowledge of the pilot symbol. Finally despreading and descrambling (240) with a code being the composite of said basestation specific scrambling code and one of said user specific codes (denoted by $c_k[n]$ equation (46)) is applied on said combined filtered signal (320) to obtain at least of one of said user specific data symbols. Said last step thus retrieves the desired user data symbol by correlating said retrieved transmitted signal (320) with the desired user specific known code and basestation specific code.

Note that within the despreading and descrambling step steps of performing correlations of modified received spread spectrum signals against selected replica of a spreading sequence are done, here with modified is meant linear space-time combining. Further said despreading step is used to extract the user corresponding to the spreading code used, more in particular the replica of the spreading code used at the transmitting side.

Alternatively said method for detection of a spread-spectrum signal can be formulated as comprising the steps of receiving a spread-spectrum signal including a training sequence, said signal corresponds to a superposition of signals of users; generating a first spread spectrum signal derived from said received spread spectrum signal and a second spread spectrum signal derived from said received spread spectrum signal; directly calculating the coefficients of a filter using knowledge of said training sequence from said derived spread-spectrum signals; and at least passing said first spread-spectrum signal and said second spread-spectrum signal different from said first spread-spectrum signal through said filter to generate a combined spread-spectrum signal; and despreading the filtered spread-spectrum signal, to extract a given user.

Within the invention said generated signals are independent, meaning received through another channel, either by having multiple antenna's, using the polarisation diversity of the available antennas or using temporal oversampling. Said generated signals are not a time-delayed version of each other. The combining of said generated signals is done in order to correct the signal for multi-user interference, more in particular to suppress multi-user interference. The combining filter is independent of the user one finally wants to detect. The combined signal is only then despread, meaning within the context of the description, correlated and decimated. The correlating is performed only with the user specific code of the user one wants to detect. Within the invention the combining is done before correlating steps.

Figure 6:
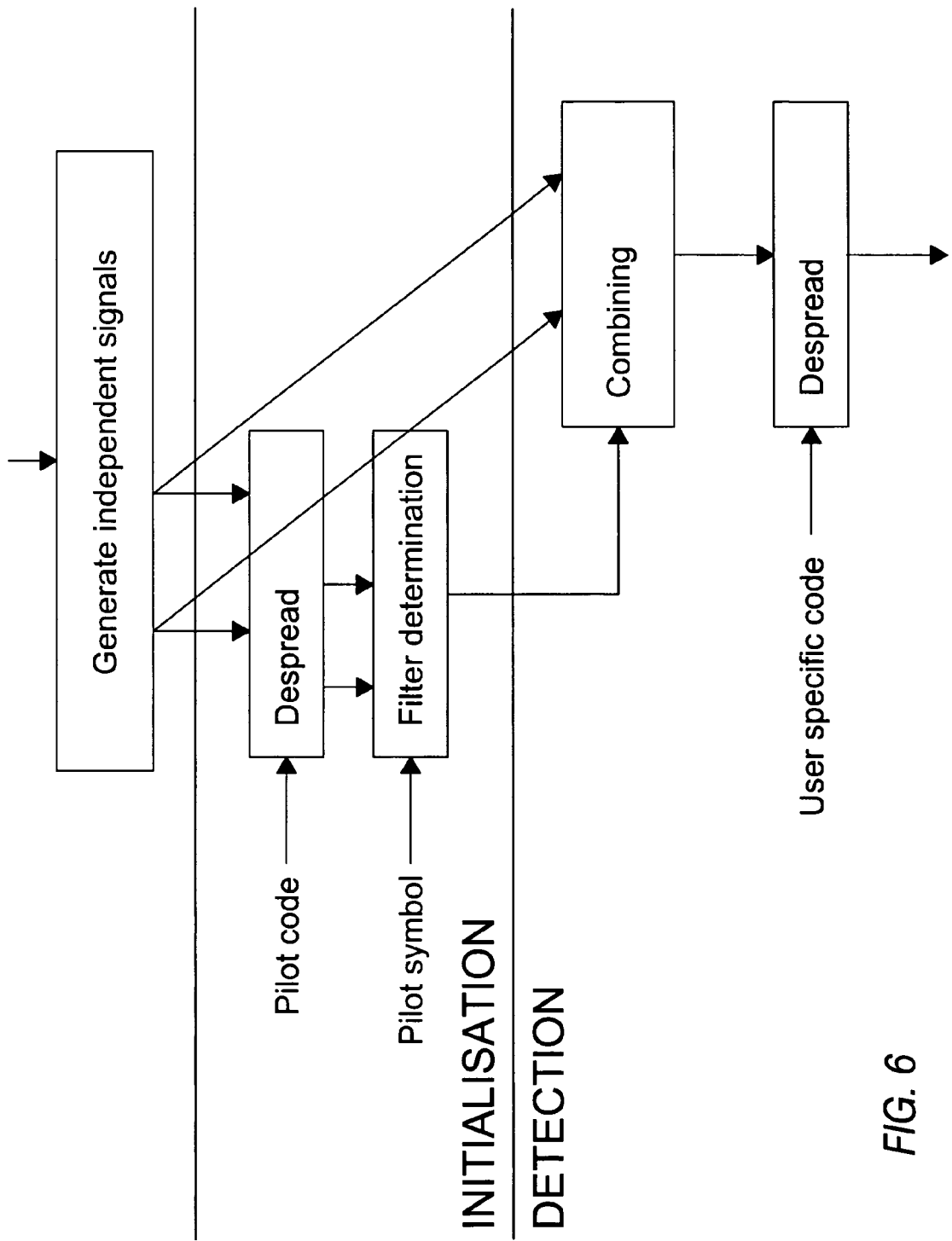
FIG. 6 illustrates a flowchart that explains the operation of a telecommunication system according to one embodiment of the invention.
Figure 7:
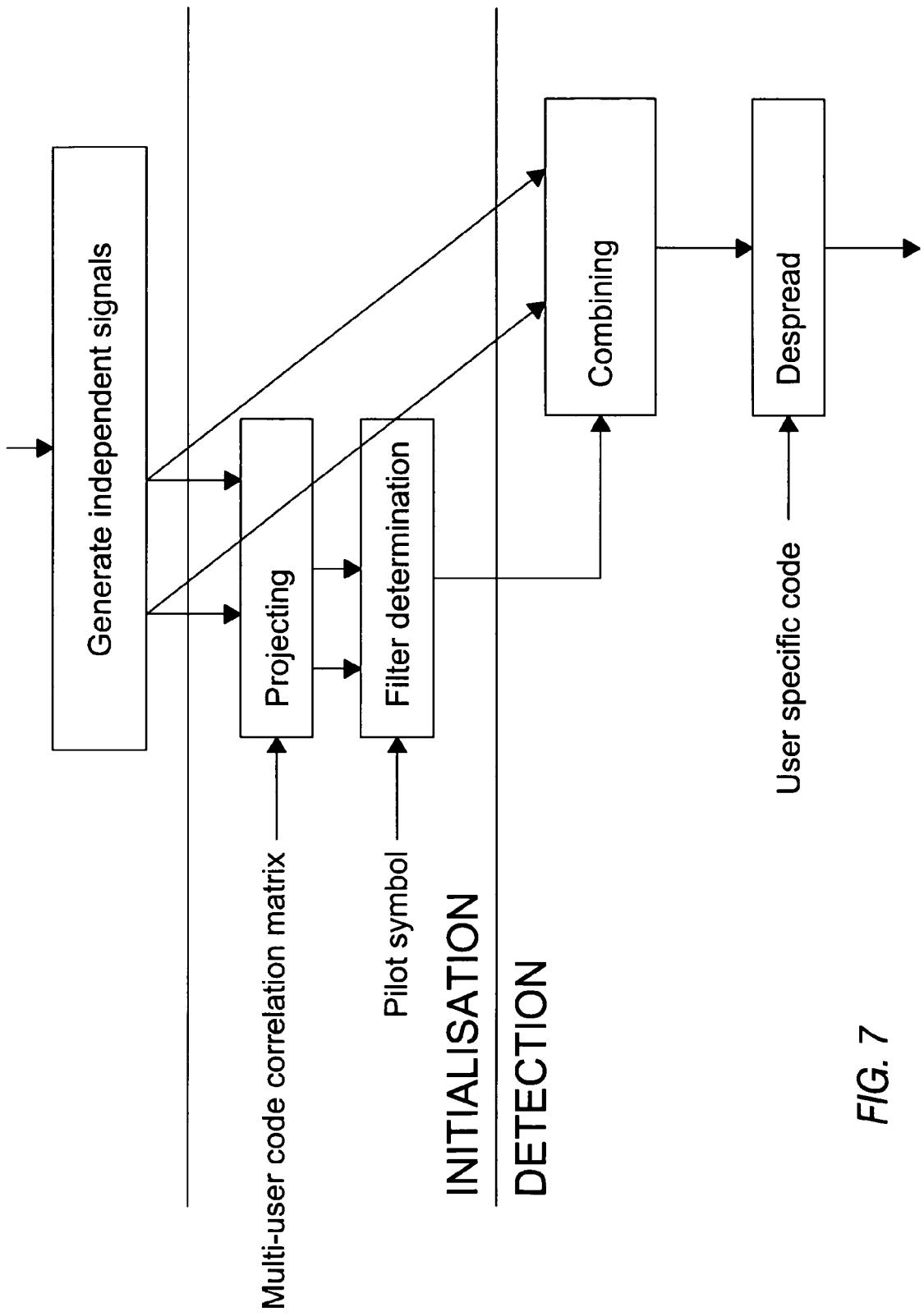
FIG. 7 illustrates a flowchart that explains the operation of a telecommunication system according to another embodiment of the invention.

The method of detection of a user signal, thus comprises the steps of generating independent signals, filtering said generated independent signals with a filter being independent of said user, said filtering results in a combined signal; and despreading and descrambling with a code being user specific. Alternatively it can be stated that the method of detection of a user signal, involves in the detection part, only the code being user specific. The combining is done at chip-rate signals, hence before any step of despreading or even correlating is made. For the sake of clarity it should be understood that in some embodiment in the part for determining the combining filter, thus not in the detection part itself, despreading is done as a first step before the filter is determined. However this despreading is done with the pilot code only. Within the method (FIG. 6) one can thus distinguish a filter determination part, denoted also initialisation, and a detection part using said filter. The method of filter determination despreads said generated independent signals with the pilot code while in the detection part despreading is performed on said filtered signal with the user specific code. It should be also understood that in some other embodiment in the part for determining the combining filter, thus not in the detection part itself, projecting rather than despreading is done as a first step before the filter is determined. However, this projecting is based on the multi-user code correlation matrix. Within the method (FIG. 7) one can thus distinguish a filter determination part, denoted also initialisation, and a detection part using said filter. The method of filter determination projects said generated independent signals using a projection matrix derived from the multi-user code correlation matrix while in the detection part despreading is performed on said filtered signal with the user specific code.

Figure 3:
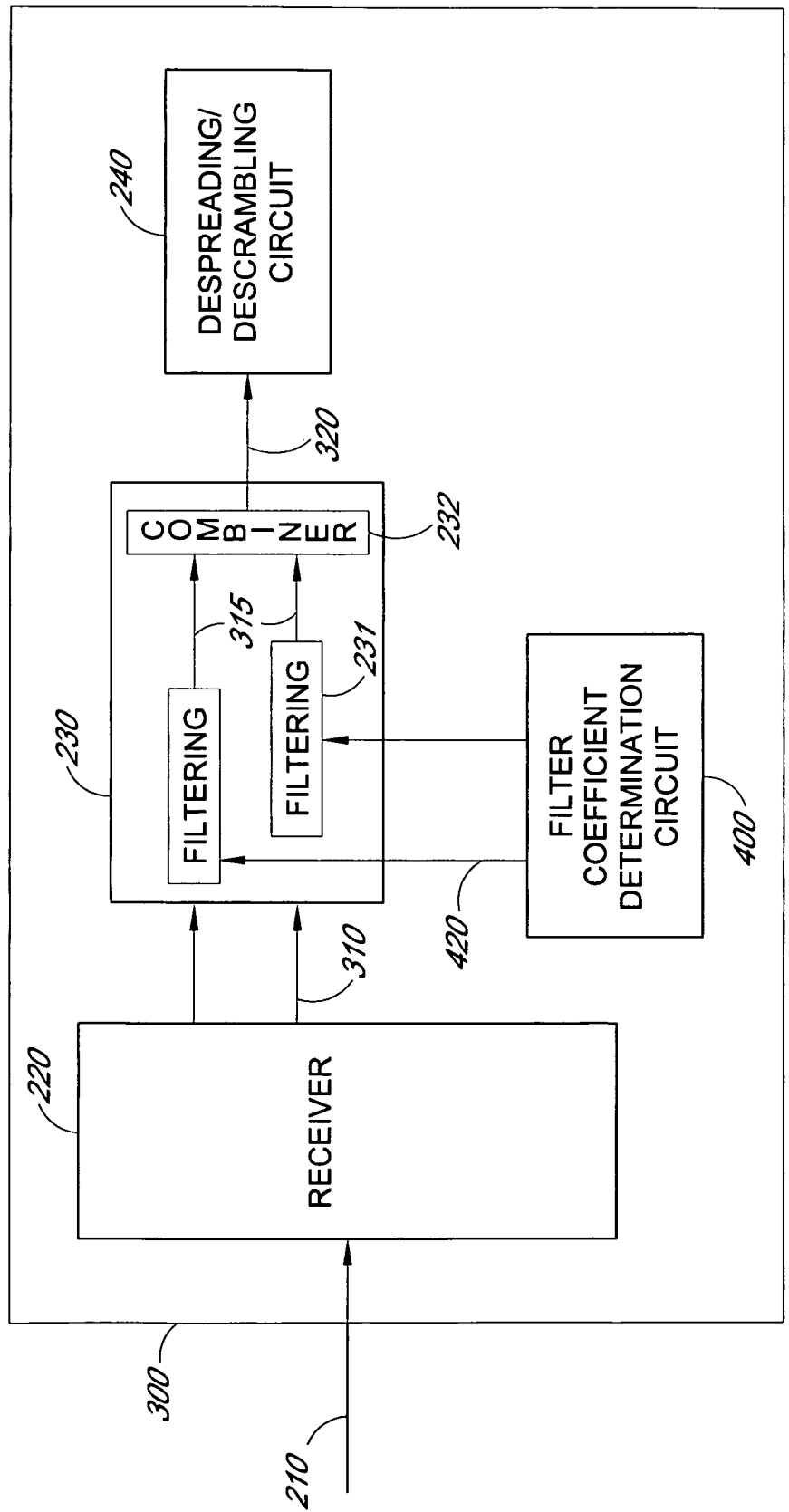
FIG. 3 illustrates a detailed block diagram of the telecommunication system shown in FIG. 2.

In a first embodiment of said method said performing of combining (FIG. 3, 230) comprises the steps of performing filtering, preferable digital linear filtering (231) on said signals (310) to obtain the filtered signals (315) and combining (232), preferably linearly, said filtered signals to obtain said combined filtered signal (320). The filters used in said combining step have filter coefficients (420) being determined in a filter coefficient determination circuit (400) and are being determined by using said pilot symbol, more in particular by directly using said pilot symbol, hence the fact that said pilot symbol is known at the terminal side is exploited. Alternatively formulated, said (filter) coefficients are determined without (explicit) channel estimation (the action of explicitly determining the coefficients of the Finite Impulse Response (FIR) channel filter that models the underlying multi-path propagation channel). Note said two-step combining (230) is used for suppressing multi-user interference, hence restoring the orthogonality of the codes. Note that the chip-level equalization (filter coefficient) determination step does not rely on a-priori estimation of the channel characteristics. Also signal statistics are not used within the chip-level equalization determination step, hence the notion of deterministic determination of said coefficients can be used.

In a second embodiment of said method the direct filter coefficient determination is disclosed, indicating that said filter coefficients are determined such that one version or function of the combined filtered signal is as close as possible to a version or function of the pilot symbol. With as close as possible is meant according to a norm defined on signals, for instance a two-norm, resulting in Least Squares (LS) sense minimization. The LS minimization can also be recursified leading to Recursive Least Squares (RLS) minimization. Other minimization approaches such as Least Mean Squares (LMS) are also possible.

B. Code Division Multiplexed Pilot Based Embodiment

In a first embodiment of said direct filter coefficient determination a communication method is presented, denoted code division multiplexed pilot based determination, wherein for each user a user specific code is available but at least one of said user specific codes is used for spreading a known signal, denoted the pilot symbol. The associated user specific code is therefore denoted the pilot code Hence in said transmitted block a pilot symbol being spread by a pilot code is found.

B.1 Training Based Subembodiment

In a first subembodiment thereof a so-called training-based approach is used, relying on the knowledge of said pilot symbol. More in particular said direct filter determination is such that the used version of the combined filtered signal is the combined filtered signal after despreading with a code being the composite code of said basestation specific scrambling code and said pilot code (denoted by $c_p[n]$ in equation (46)) while said version of said pilot symbol is said pilot symbol itself. It should be noted however, that in practice said independent signals are first despread before combining takes place (see FIG. 6).

In an example thereof said chip-level equalization filter is determined as a multiplication involving said known pilot symbol vector, a matrix involving the composite pilot codes, a Hankel structure output matrix, involving the received signals.

B.2 Semi-Blind Based Subembodiment

In a second subembodiment thereof a so-called semi-blind based approach is used, relying on the knowledge of said pilot symbol but also on characteristics of the codes. More in particular said direct filter determination is such that the used version of the combined filtered signal is the combined filtered signal after projecting on the orthogonal complement on the subspace spanned by the composite codes, being the codes composed of said base station specific scrambling code and said user specific codes, and said version of the pilot symbol is said pilot symbol spread with a composite code of said base station specific scrambling code and said pilot code. It should be noted however, that in practice said independent signals are first projected before combining takes place (see FIG. 7).

In an example thereof said chip-level equalization filter is determined as a multiplication involving said known pilot symbol vector, a matrix involving the pilot codes, a Hankel structure output matrix, involving the received signals and a matrix involving the user codes. Hence one can state that said chip-level equalization determination step exploits said known pilot symbol sequence, said pilot specific known code(s) and substantially all (active) user specific known codes.

C. Time Division Multiplexed Pilot Based Embodiment

In a second embodiment of said direct filter coefficient determination a communication method is presented, denoted time division multiplexed pilot based method, wherein for each user a user specific code is available but in said block of symbols a plurality of a known pilot symbols are found, for each user code at least one. One can state that said transmitted block comprises at least two pilot symbols, each being spread by a user specific code. Hence said pilot symbols can be denoted user specific known pilot symbols (represented by $s_k[i]$ in equation (64)),each being encoded with a user specific known code.

C.1 Training Based Subembodiment

In a first subembodiment of said second embodiment a so-called training-based approach is used, relying on the knowledge of said pilot symbol. More in particular said direct filter determination is such that the used version of the combined filtered signal is the combined filtered signal after despreading with a code being the composite code of said basestation specific scrambling code and a user specific code and said version of said pilot symbol is said pilot symbol itself. It should be noted however, that in practice said independent signals are first despread before combining takes place (see FIG. 6).

In an example thereof said chip-level equalization filter is determined as a multiplication involving said known pilot symbol vector, a matrix involving the pilot codes and a Hankel structure output matrix.

C.2 Semi-blind Based Subembodiment

In a second subembodiment of said second embodiment a so-called semi-blind based approach is used, relying on the knowledge of said pilot symbol but also on characteristics of the codes. More in particular said direct filter determination is such that the used version of the combined filtered signal is the pilot part of the combined filter signal; and said version of the pilot symbol is the sum of the spread pilot symbols within said transmitted block. In said method further said filter coefficients are determined such that the data part of the combined filter signal after projecting on the orthogonal complement on the subspace spanned by the composite codes, being the codes composed of said base station specific scrambling code and said user specific codes being as close as possible to the zero subspace. It should be noted however, that in practice said data part of said independent signals are first projected before combining takes place (see FIG. 7).

In an example thereof said chip-level equalization filter is determined as a multiplication involving said known pilot symbol vector, a matrix involving the pilot codes, a Hankel structure output matrix, involving the received signals and a matrix involving the user codes. Hence one can state that said chip-level equalization determination step exploits substantially all (active) user specific known codes.

D. Multiple Base Station Embodiment

Figure 5:
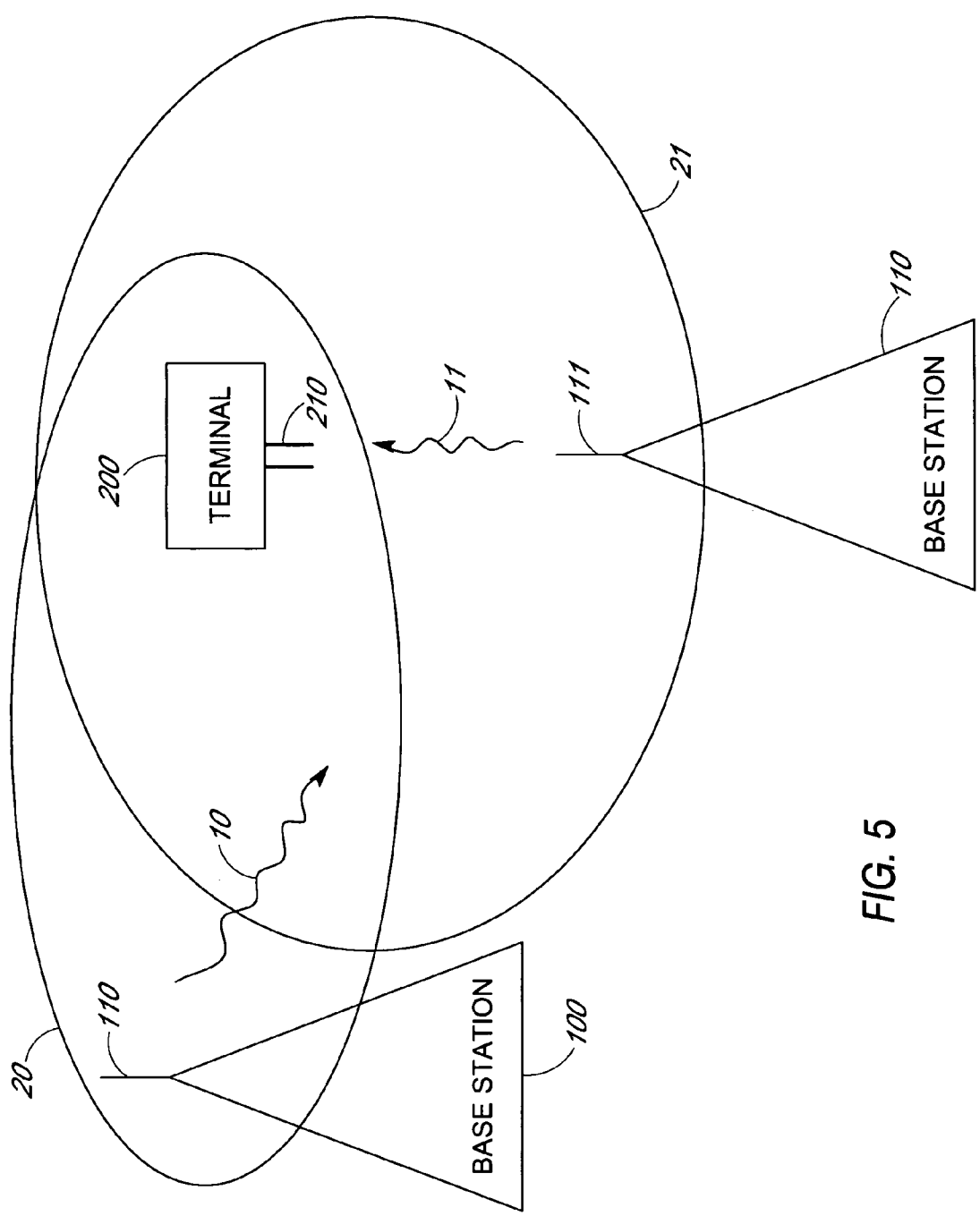
FIG. 5 illustrates a telecommunication system in a multiple-cell configuration.

In a third embodiment of the invention, as shown in FIG. 5, at least J base stations (100, 110) are transmitting to said terminal having at least an integer number M at least J+1/(St*Sp) physical antenna's with St the temporal oversampling factor and Sp the polarisation diversity order. Note that alternatively less than M antenna's can be used by trading off complexity versus performance.

E. Multiple Base Station Multi-Antenna Terminal Embodiment

Figure 4:
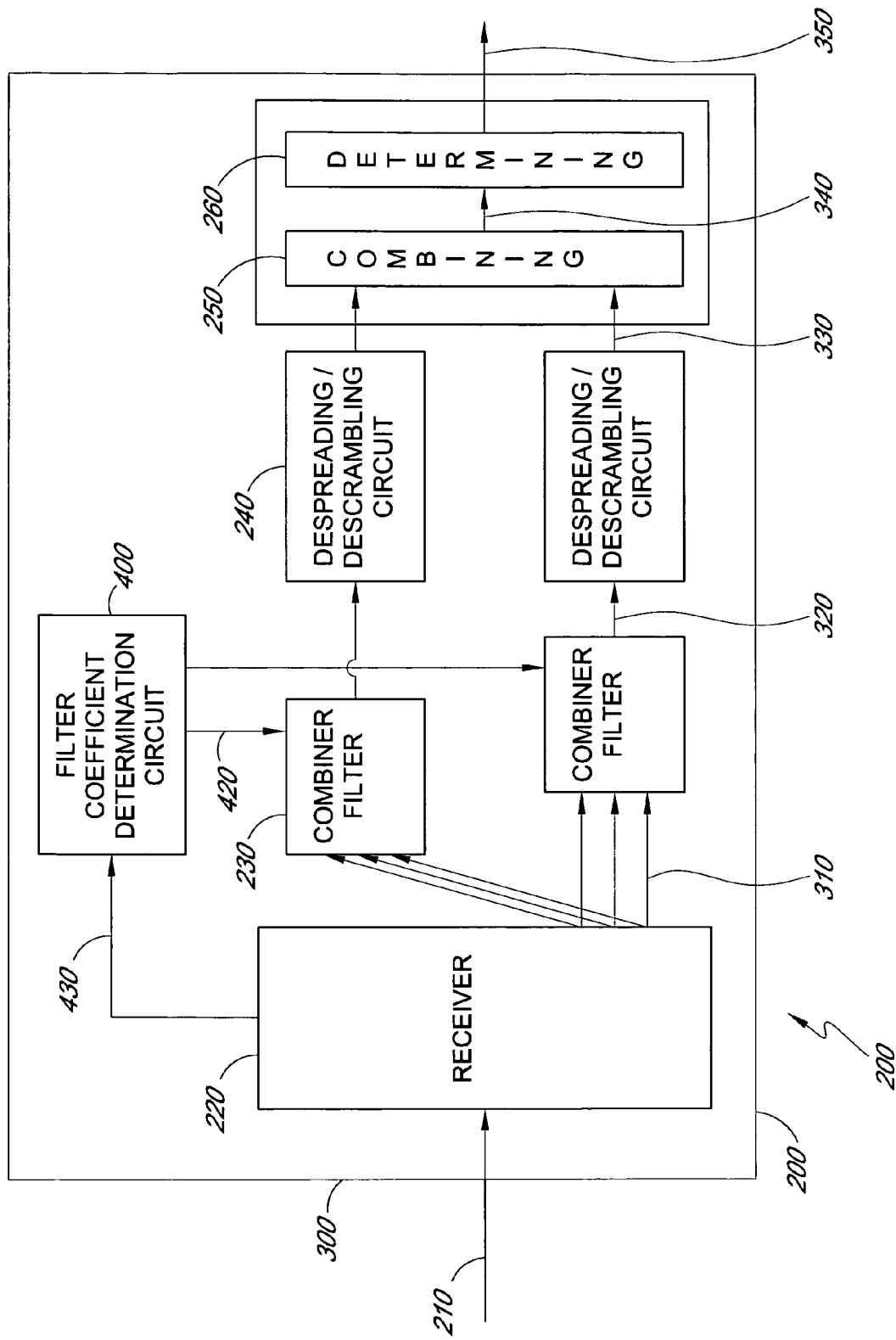
FIG. 4 illustrates a block diagram of a telecommunication system according to another embodiment of the invention.

In a fourth embodiment of the invention within said terminal at least M=J+1 independent signals (310) are generated from the receiver (220) with J the amount of basestations. Within said terminal said steps of space-time combining (230) is performed J times as shown in FIG. 4. Each of the resulting combined filtered signals (320) are multi-user interference suppressed Versions of the signal transmitted from one of said basestations. Finally said despreading and descrambling (240) is performed J times as shown in FIG. 4, to obtain J intermediate soft estimates (330) of a user specific data symbol. Subsequently a step of combining (250), preferably linearly, of said J despread combined signals (330) to obtain a final soft estimate (340) of a user specific data symbol is performed followed by determining (260) from said final soft estimate a hard estimate (350) for said user specific data symbol.

F. Wireless Semi-Blind Embodiment

In a second aspect of the invention a wireless semi-blind communication method wherein besides user data symbols and pilot symbols, additional information is transmitted from the basestation(s) to said terminals. Said additional information (430), received by the receiver block (220), is used in the filter coefficient determination (400). More in particular said additional information is projection information, enabling projecting of said independent signals on the orthogonal complement of the subspace spanned by the composite codes of said basestation specific scrambling code and said user specific codes. Hence the space-time combiner filter has filter coefficients being determined by using said projection information. Depending on the length of the user specific codes N a maximal amount of users, being N in case of time division multiplexed pilots and N−1 in case of code division multiplexed pilots. In practice an amount of active user Ua less than said maximal amount are active.

In a first embodiment of said second aspect said projection information is constructed by using or considering the active user's.

In a second embodiment of said second aspect said projection information is constructed by using or considering a predetermined set of assumed active user's, the size of said set being another upperbound on the amount of active users allowed.

In a third aspect of the invention an apparatus with at least one antenna (210) comprising (i) a receiver (220) capable of receiving a block (300) comprising of a plurality of chip symbols being data symbols spread by using scrambling and spreading codes and at least one pilot symbol, (ii) at least one linear space-time combining filter circuit (230), inputting at least two independent signals (310) derived from said received block and outputting a multi-user interference suppressed signal (320); (iii) a circuit (400) for determination of said combining filter circuit's coefficients (420), said filter circuit's coefficients being determined (directly) by using said pilot symbol; and (iv) at least one despreading circuit (240), used for despreading with one of said scrambling and spreading codes said multi-user interference suppressed signal (320). Alternatively formulated said apparatus can be denoted a radio receiver comprising a front-end circuitry (220) for providing complex baseband samples for a plurality of channels in digital format; an integrated adaptive digital combining circuitry (230), connected to said front-end circuitry, for combining said complex baseband samples; and a digital component (240), connected to said combining circuitry, being arranged to perform correlations of received spread spectrum signals against selected replica offsets of a spreading sequence Alternatively formulated said apparatus for detecting of data signals from a transmitted signal in a Code-Division Multiple Access (CDMA) communication system, wherein the transmitted signal comprising a plurality of time overlapping coded signals, each coded signal associated to an individual user and distinguishable only by a user specific encoding (signature, spreading sequences), comprising a convolutional coder having at least two independent signals being representative for the transmitted signal as an input and outputting a single vector being representative for said transmitted signal; a decoder having said single vector as an input and outputting symbol information for at least one individual user.

In a fourth aspect of the invention an apparatus with at least one antenna (210) comprising (i) a receiver (220) capable of receiving a block comprising of a plurality of chip symbols being data symbols spread by using scrambling and spreading codes, and projection information, enabling projecting of said independent signals on the orthogonal complement of the subspace spanned by scrambling and spreading codes; (ii) at least one linear space-time combining filter circuit (230), inputting at least two independent signals (310) derived from said received block and outputting a multi-user interference suppressed signal, (iii) a circuit (400) for determination of said combining filter circuit's coefficients with filter circuit's coefficients (420) being determined by using said projection information (430), and (iv) at least one despreading circuit (240), used for despreading with one of said scrambling and spreading codes said multi user interference suppressed signal (320).

In a fifth aspect of the invention an apparatus comprising a plurality J of linear space-time combining filter circuits (230), each of said combining filter circuits inputting at least J+1 independent signals (310) and outputting a multi user interference suppressed signal (320), a circuit (400) for determination of said combining filters circuit's coefficients (420), a plurality of J despreading circuits (240), used for despreading said J multi-user interference suppressed signals (320); and a linear combining circuit (250-260) for combining said J spread multi-user interference suppressed signals.

The last combining circuit can comprise of a substep of determining a soft estimate (250) and a substep of determining a hard estimate (260) based on said soft estimate.

Alternatively formulated said apparatus can be denoted a radio receiver comprising a frontend circuitry (220) for providing complex baseband samples for a plurality of channels in digital format; a plurality of integrated adaptive digital combining circuitry (230), corrected to said front-end circuitry, for combining said complex baseband samples; and a digital component (240), connected to said combining circuitry, being arranged to perform correlations of received spread spectrum signals against selected replica offsets of a spreading sequence.

Alternatively said apparatus for detection of a spread-spectrum signal can comprise of a processor arranged to provide a plurality of multiple input combining filter circuits (230), the plurality of multiple input combining filter circuits being respectively coupled to a plurality of despreading circuits (240).

Alternatively formulated said apparatus for detecting of data signals from a transmitted signal in a Code-Division Multiple Access (CDMA) communication system, wherein the transmitted signal comprising a plurality of time overlapping coded signals, each coded signal associated to an individual user and distinguishable only by a user specific encoding (signature, spreading sequences), comprising a plurality of convolutional coders having at least two independent signals being representative for the transmitted signal as an input and outputting a single vector being representative for said transmitted signal; a decoder having said single vector as an input and outputting symbol information for at least one individual user.

Said apparatus further comprises an algorithm unit (400), said algorithm unit is coupled to said plurality of combining filter circuits. In an embodiment said algorithm unit is an adaptive algorithm unit. The algorithm unit is used for calculating the coefficients of said combining filters based upon a training sequence within said spread-spectrum signal, more in particular exploiting a priori knowledge of the training sequence at the detection apparatus side of the communication link.

Before describing the embodiment of the invention more in detail one should note that the block transmitted from said at least one basestation to an at least one terminal comprises of a plurality of chip symbols scrambled with a base station specific scrambling code, said plurality of chip symbols comprising a plurality of spread user specific data symbols, being user specific data symbols spread by using user specific spreading codes and at least one pilot symbol.

Alternatively formulated in a single-cell concept (meaning a single basestation) the transmitted signal can be a synchronous code division multiplex, employing user specific orthogonal Walsh-Hadamard spreading codes and a base-station specific aperiodic scrambling code. The user aperiodic code sequence is the multiplication of the corresponding spreading code and the base-station specific aperiodic scrambling code. In a code division multiplexed pilot approach the multi-user chip sequence (denoted by x[n] in equation (46)) comprises of K user signals plus at least one continuous pilot signal. In a time division multiplexed pilot approach the multi-user chip sequence (denoted by x[n] in equation (64)) comprises of a first set of user symbols, also denoted data symbols and a second set of known pilot symbols.

Alternatively formulated in a multiple cell concept (meaning a plurality of basestations) the transmitted signal of each basestation can be a synchronous code division multiplex, employing user specific orthogonal Walsh-Hadamard spreading codes and a base-station specific aperiodic scrambling code. The user terminal then receives a sum of essentially all said transmitted signals. The user aperiodic code sequence is the multiplication of the corresponding spreading code and the base-station specific aperiodic scrambling code. In a code division multiplexed pilot approach the multi-user chip sequence comprises of K user signals plus at least one continuous pilot signal. In a time-division multiplexed pilot approach the multi-user chip sequence comprises of a first set of user symbols, also denoted data symbols and a second set of known pilot symbols.

Below various embodiments of the invention are described. The invention is not limited to these embodiments but only by the scope of the claims.

G. Embodiment

G.1 Data Model for Multi-cell WCDMA Downlink

Figure 8:
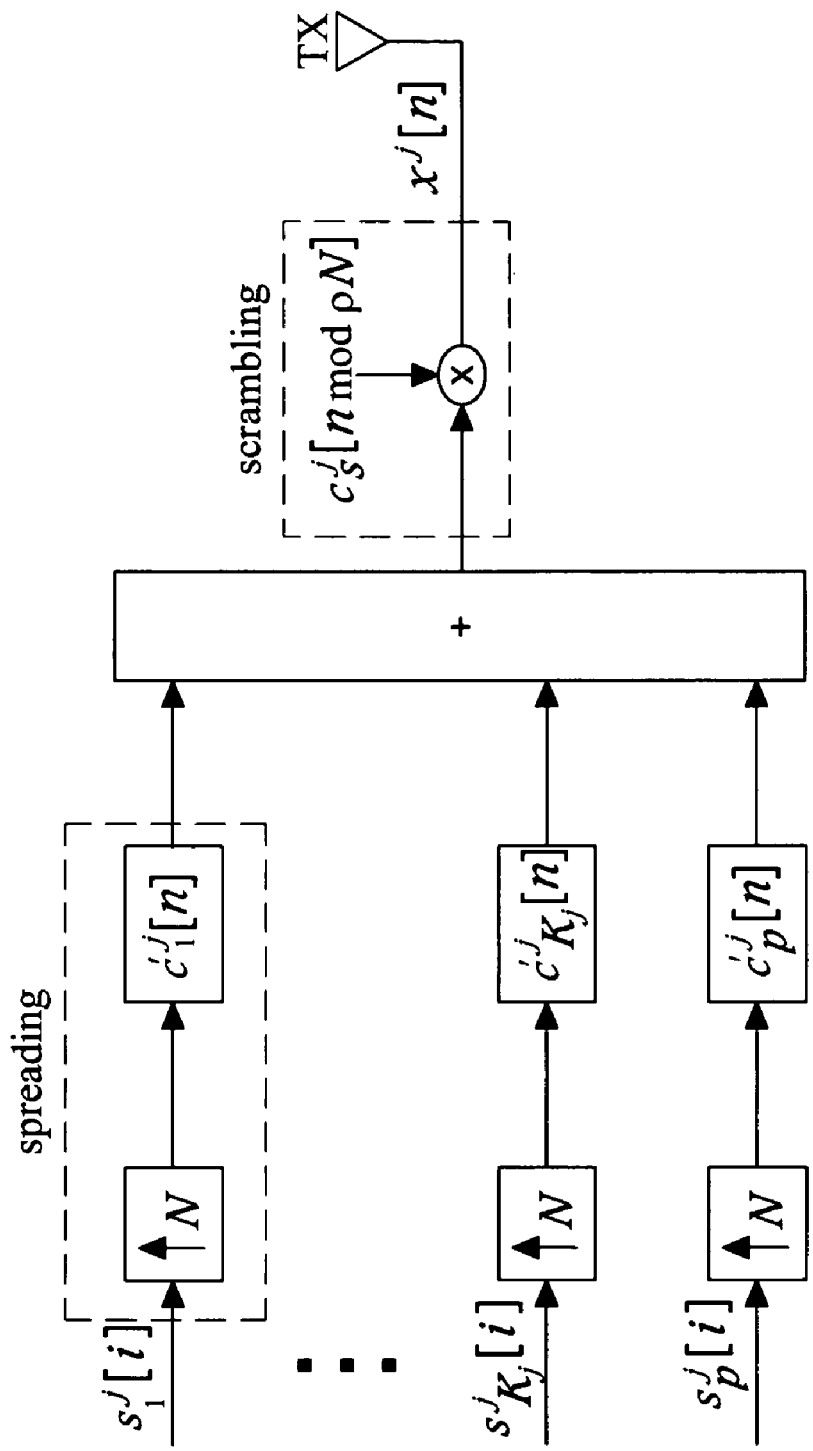
FIG. 8 illustrates a block diagram of a transmitter model of the j-th base-station according to one embodiment of the invention.

G.1.a Multi-channel framework. We consider the downlink of a multi-cell WCDMA system with J active base-stations, transmitting to the mobile station of interest (soft handover mode). Each base-station transmits a synchronous code division multiplex, employing short orthogonal Walsh-Hadamard spreading codes that are user specific and a long overlay scrambling code that is base-station specific. As shown in FIG. 8, the multi-user chip sequence, transmitted by the j-th base-station $x^j[n]$, consists of $K_j$ active user signals and a continuous pilot signal:

$$x^j[n] = \sum_{k=1}^{K_j} s_k^j[i]c_k^j[n \bmod \rho N] + s_p^j[i]c_p^j[n \bmod \rho N] \quad (1)$$

with $$i = \left\lfloor \frac{n}{N} \right\rfloor.$$

The data symbol sequence $s_k^j[i]$ corresponds to the Dedicated Physical Data CHannel (DPDCH) for the k-th user from the j-th base-station whereas the pilot symbol sequence $s_p^j[i]$ corresponds to the j-th base-station's Common PIlot CHannel (CPICH) in the UTRA specification for 3G systems [11]. For notational simplicity, we assume that the power of a symbol sequence is incorporated in the symbol sequence itself. Each user's data symbol sequence $s_k^j[i]$ (pilot symbol sequence $s_p^j[i]$) is spread by a factor N with the length-$\rho$N user composite code sequence $c_k^j[n]$ (pilot composite code sequence $c_p^j[n]$). The k-th user's composite code sequence for the j-th base-station $c_k^j[n]$ (pilot composite code sequence $c_p^j[n]$) is the multiplication of the user specific short Walsh-Hadamard spreading code $\dot{c}_k^j[n]$ (pilot-specific Walsh-Hadamard spreading code $\dot{c}_p^j[n]$ and the base-station specific long scrambling code $c_s^j[n]$.

Assume that the mobile station is equipped with M receive antennas and let $h_m^j(t)$ denote the continuous-time channel from the j-th base-station to the m-th receive antenna, including the transmit and receive filters. The received signal at the m-th receive antenna can then be written as:

$$y_m(t) = \sum_{j=1}^{J} \sum_{n'=-\infty}^{+\infty} h_m^j(t - n'T_c)x^j[n'] + e_m(t)$$

with $e_m(t)$ the continuous-time additive noise at the m-th receive antenna By sampling the received signal at the chiprate $T_c$, we obtain the following received sequence at the m-th receive antenna:

$$y_m[n] = y_m(nT_c) = \sum_{j=1}^{J} \sum_{n'=-\infty}^{+\infty} h_m^j[n']x^j[n-n'] + e_m[n]$$

with $e_m[n]$ the discrete-time additive noise at the m-th receive antenna and $h_m^j[n] = h_m^j(nT_c)$ the discrete-time channel from the j-th base-station to the m-th receive antenna. Stacking the received samples obtained from the M receive antennas:

$$y[n]=[y_1[n]y_2[n]\ldots y_M[n]]^T$$

we can write:

$$y[n] = \sum_{j=1}^{J} \sum_{n'=-\infty}^{+\infty} h^j[n']x^j[n-n'] + e[n] \quad (2)$$

where $e[n]$ is similarly defined as $y[n]$ and $h^j[n]$ is the discrete-time M×1 vector channel from the j-th base-station to the M receive antennas, given by:

$$h^j[n]=[h_1^j[n]h_2^j[n]\ldots h_M^j[]]^T$$

Note that we model $h^j[n]$ as an M×1 FIR vector filter of order $L_j$ with delay index $\delta_j$ ($h^j[n] \neq 0$, for $n = \delta_j$ and $n = \delta_j + L_j$, and $h^j[n]=0$, for $n<\delta_j$ and $n>\delta_j+L_j$).

Until now, we have considered chip rate sampling at the receiver side. Since in practice the transmit and receive filters are root raised cosine filters for a rate $$\frac{1}{T_c}$$

with a bandwidth somewhat higher than $$\frac{1}{T_c},$$

we should actually sample at a rate that is higher than $$\frac{1}{T_c}$$

This is called temporal oversampling; Sampling at $S_t$ times the chip rate, the data model described in Equation 65 would become a multi-channel model with $MS_t$ diversity channels per base-station. Similar to temporal oversampling, polarization diversity can increase as well the number of diversity channels per base-station [21]. Sampling at St times the chip rate and applying $S_p$-fold polarization diversity, the data model described in Equation 65 would become a multi-channel model with $MS_tS_p$ diversity channels per base-station instead of merely M. In practice a temporal oversampling factor of $S_t=2$ suffices. Since in real-life only the horizontal and the vertical polarization can be exploited, the polarization diversity order is limited to $S_p=2$. For simplicity reasons, we will only consider chip rate sampling and 1-fold polarization diversity at the receiver side. Note however that all future discussions remain valid if we replace M by $MS_tS_p$.

G.1.b Data model for block processing. Let us now introduce the following $(Q+1)M \times BN$ output matrix $Y_a$:

$$Y_a = \begin{bmatrix} y[a] & y[a+1] & \cdots & y[a+BN-1] \\ \vdots & \vdots & & \vdots \\ y[a+Q] & y[a+Q+1] & \cdots & y[a+Q+BN-1] \end{bmatrix} \quad (3)$$

where B is the block length, a is the processing delay and $Q+1$ is the temporal smoothing factor. This output matrix can be written as $$Y_a = \sum_{j=1}^{J} H^j X_a^j + E_a \quad (4)$$

where the noise matrix $E_a$ is similarly defined as $Y_a$ and the j-th base-station's $(Q+1)M \times r_j$ ($r_j = L_j + 1 + Q$) channel matrix $\mathcal{H}^j$ with block Toeplitz structure is given by:

$$H^j = \begin{bmatrix} h^j[\delta_j + L_j] & \cdots & h^j[\delta_j] & 0 & \cdots & 0 \\ 0 & h^j[\delta_j + L_j] & \cdots & h^j[\delta_j] & \cdots & 0 \\ & & \ddots & & \ddots & \\ 0 & \cdots & 0 & h^j[\delta_j + L_j] & \cdots & h^j[\delta_j] \end{bmatrix}$$

The j-th base-station's $r_j \times BN$ input matrix $X_a^j$ is given by:

$$X_a^j = [x_{a-\delta_j - L_j}^{j\ T} \ldots x_{a-\delta_j + Q}^{j\ T}]^T$$

where the multi-user chip sequence vector $x_a^j$, transmitted by the j-th base-station, starting at delay a is defined by:

$$x_a^j = [x^j[a] x^j[a+1] \ldots x^j[a+BN-1]] \quad (5)$$

Note that Equation 4 can also be written as:

$$Y_a = \mathcal{H} X_a + E_a \quad (6)$$

where $\mathcal{H}$ is the $(Q+1)M \times r$ channel matrix, given by:

$$\mathcal{H} = [\mathcal{H}^1 \ldots \mathcal{H}^J] \quad (7)$$

and $X_a$ is the following $r \times BN$ input matrix:

$$X_a = [X_a^{1\ T} \ldots X_a^{J\ T}]^T \quad (8)$$

$$r = \sum_{j=1}^{J} r_j$$

is called the system order. In order to guarantee the existence of Zero-Forcing (ZF) chip-level equalizers, we make the following rather standard assumptions about the data model:

Assumption 1: The channel matrix $\mathcal{H}$ has full column rank r.

Assumption 2: The input matrix $X_a$ has full row rank r.

The first assumption requires that $(Q+1)M \geq r$, which is equivalent with:

$$(Q+1)(M-J) \geq \sum_{j=1}^{J} L_j \quad (9)$$

(9)

Therefore, in order to simultaneously track J base-stations the mobile station should be equipped with at least $M=J+1$ receive antennas for chip rate sampling. However, when we use a temporal oversampling factor of $S_t=2$ and we exploit $S_p=2$-fold polarization diversity at the receiver, we obtain $MS_tS_p=4$ (good for soft handover between $J=3$ base-stations) with only $M=1$ receive antenna at the mobile station.

The second assumption, on the other hand, requires that:

$$BN \geq r \quad (10)$$

which states that the number of observed chip samples BN should be larger than the system order r.

G.2 Space-time Block Chip-level Equalizer Receivers

Figure 9:
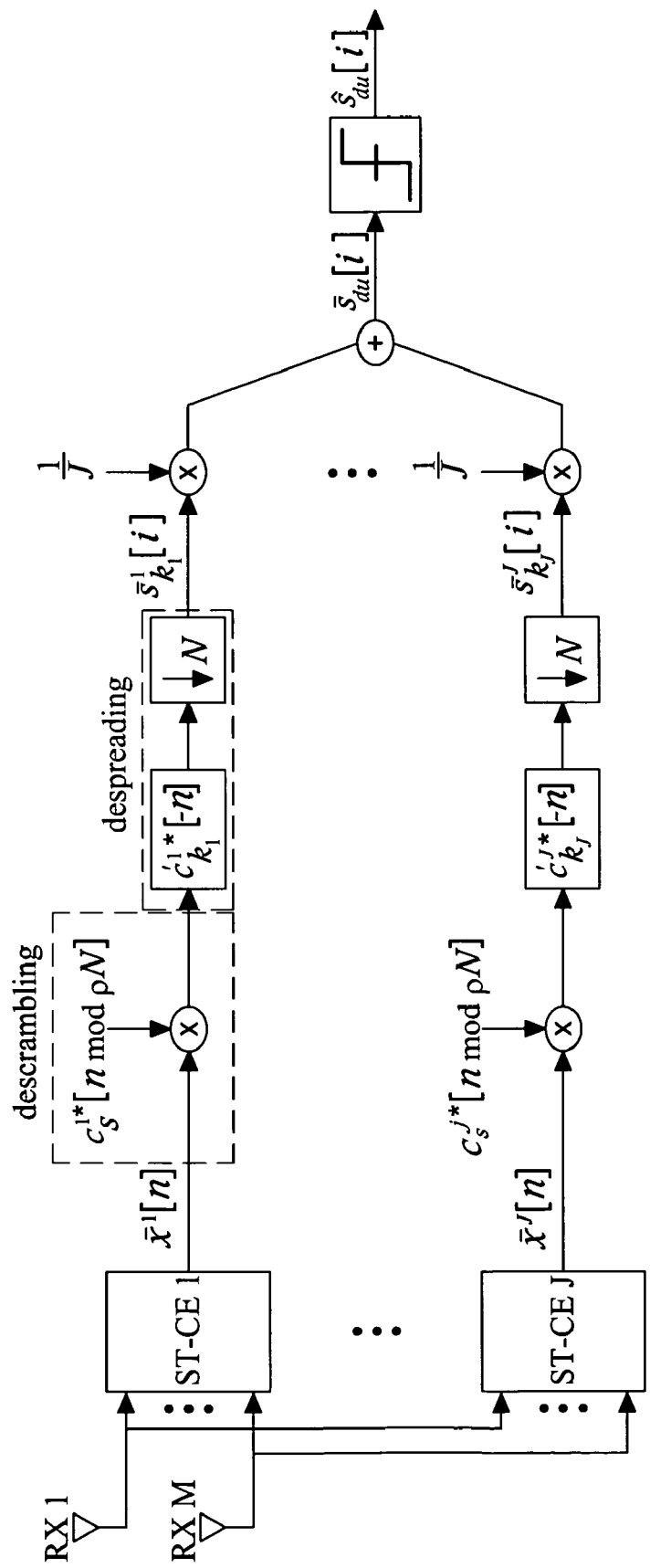
FIG. 9 illustrates a block diagram of a receiver model of the mobile station of interest according to one embodiment of the invention.

In this section, we develop four space-time block chip-level equalizer receivers for the mobile station operating in soft handover mode: the pilot-aided block RAKE receiver, the fully-trained, the pilot-trained and the enhanced pilot-trained block chip-level equalizer receiver. The receivers can detect the desired user's data symbols from each of the J active base-station signals. They address blocks of B symbols at once and, as shown in FIG. 9, consist of J parallel branches, one for each basestation connected to the mobile station of interest. Each branch is made up of a linear space-time chip-level equalizer followed by a correlator. The space-time chip-level equalizer of the j-th branch linearly combines the discrete-time signals from the different antennas and tries to restore the multi-user chip sequence, transmitted by the j-th base-station. The chip-level equalizer receivers differ in the amount of a-priori information they assume to determine their equalizer coefficients. The correlator of the j-th branch descrambles and despreads the equalized signal with the desired user's composite code sequence for the j-th base-station. The final soft decisions about the desired user's data symbols are obtained by combining the correlator outputs of the different branches. These soft decisions are then input to a decision device that generates the final hard decisions.

G.2.a Preliminary definitions. The multi-user chip vector transmitted by the j-th base-station $x_0^j$, starting at delay $a=0$, consists of two parts: a first part corresponding to the unknown data symbols of the different DPDCHs and a second part corresponding to the known pilot symbols of the CPICH. Using Equation 1 and 67, we can write the $1 \times BN$ multi-user chip vector, transmitted by the j-th base-station, starting at delay $a=0$, as follows:

$$x_0^j = s_d^j C_d^j + s_p^j C_p^j \quad (11)$$

where $s_d^j$ is the j-th base-station's $1 \times K_j B$ multi-user data symbol vector that stacks the data symbol vectors of the different active users served by the j-th basestation $$s_d^j = [s_1^j \ldots s_{K_j}^j]$$

and $s_k^j$ is the 1×B data symbol vector that stacks the data symbols of the k-th user served by the j-th base-station:

$$s_k^j = [s_k^j[0] s_k^j[1] \ldots s_k^j[B-1]]$$

The 1×B transmitted pilot symbol vector of the j-th base-station s-p is similarly defined as $s_p^j$. The $K_jB \times BN$ multi-user composite code matrix for the j-th base-station stacks the composite code matrices of the different active users:

$$C_d^j = [C_1^{j^T} \ldots C_{K_j}^{j^T}]^T$$

where $C_k^j$ is the B×BN composite code matrix of the k-th user served by the j-th base-station $$C_k^j = \begin{bmatrix} c_k^j[0] & & \\ & \ddots & \\ & & c_k^j[B-1] \end{bmatrix}$$

and $c_k^j[i]$ is the k-th user's composite code vector for the j-th base-station used to spread and scramble the data symbol $s_k^j[i]$:

$$c_k^j[i] = [c_k^j[(i \bmod \rho)N] \ldots c_k^j[(i \bmod \rho)N+N-1]]$$

It is important to note that the k-th user's composite code vector $c_k^j[i]$ can be written as the component-wise multiplication of the user specific short spreading code vector $\acute{c}_k^j$ and the base-station specific long scrambling code vector $c_s^j[i]$ $$c_k^j[i] = \acute{c}_k^j \odot c_s^j[i] \qquad (12)$$

where $\acute{c}_k^j = [\acute{c}_k^j[0] \ldots \acute{c}_k^j[N-1]]$ stacks the Walsh-Hadamard spreading code coefficients for the k-th user served by the j-th base-station and $c_s^j[i]$ is similarly defined as $c_k^j[i]$. The pilot composite code matrix $C_p^j$, the pilot composite code vector $c_p^j[i]$ and the pilot spreading code vector $\acute{c}_p^j[i]$ of the j-th base-station are similarly defined as $C_k^j$, $c_k^j[i]$ and $\acute{c}_k^j$ respectively.

The vector $x_0^j$ is a row of every input matrix from the set $$\{X_{a_j}\}_{a_j=\delta_j-Q}^{\delta_j+L_j}$$

and is therefore contained in every output matrix from the set $$\{Y_{a_j}\}_{a_j=\delta_j-Q}^{\delta_j+L_j}.$$

For this reason, $x_0^j$ can be determined from the set of $A^j$ output matrices $\{Y_{a_j}\}_{a_j=A_1^j}^{A_2^j}$, with $\delta_j - Q \leq A_1^j \leq a_j \leq A_2^j \leq \delta_j + L_j$ ($A^j = A_2^j - A_1^j + 1$). The $A^j(Q+1)M \times A^jBN$ super output matrix $y^j$ corresponding to the j-th base-station is then defined as follows:

$$y^j = \begin{bmatrix} Y_{A_1^j} & & \\ & \ddots & \\ & & Y_{A_2^j} \end{bmatrix}$$

The B×$A^j$BN super pilot composite code matrix $C_p^j$ corresponding to the j-th base-station is defined by:

$$C_p^j = [C_p^j \ldots C_p^j]$$

while the $K_jB \times A^jBN$ super multi-user composite code matrix $C_d^j$ corresponding to the j-th basestation is given by:

$$C_d^j = [C_d^j \ldots C_d^j]$$

G.2.b Pilot-aided block RAKE receiver. The j-th branch of the pilot-aided block RAKE receiver estimates the desired-user's data symbol vector $s_{k_j}^j$ (we assume the desired user to be the $k_j$-th user of the j-th base-station multiplex) from $Y_{\delta_j}$, with $Q=L_j$, based on the knowledge of the j-th base-station's composite code matrix for the desired user $C_{k_j}^j$, pilot composite code matrix $C_p^j$ and pilot symbol vector $s_p^j$.

The pilot-aided channel estimation part of the j-th branch exploits the knowledge of the pilot composite code matrix and the pilot symbol vector to determine the j-th base-station's space-time channel coefficients [22]. The columns of the $(L_j+1)M \times B$ matrix $V^j$ contain the initial estimates of j-th base-station's space-time channel vector at the different symbol instants. $V^j$ is determined as follows:

$$V^j = (Y_{\delta_j} C_p^{j^H}) \odot S_p^{j*} \qquad (13)$$

where the j-th base-station's $(L_j+1)M \times B$ pilot symbol matrix $S_p^j$ is defined as follows:

$$S_p^j = [s_p^{j^T} \ldots s_p^{j^T}]^T$$

The $(L_j+1)M \times BN$ output matrix $Y_{\delta_j}$ is first despread with the j-th base-station's pilot composite code matrix $C_p^j$. The $(L_j+1)M \times B$ despread output matrix $Y_{\delta_j} C_p^{j^H}$ is then component-wise multiplied with the complex conjugate of the $(L_j+1)M \times B$ pilot symbol matrix $S_p^j$ to remove the effect of the pilot symbol modulation. The final estimate of the j-th base-station's space-time channel vector is the average of the different initial estimates $$v^j = \frac{1}{B} V^j 1_{B \times 1} \qquad (14)$$

This final estimate of the space-time channel vector $v^j$ may subsequently be used to extract the desired user's soft symbol decisions in the j-th branch:

$$\bar{s}_{k_j}^j = v^{j^H} Y_{\delta_j} C_{k_j}^{j^H} \qquad (15)$$

by despreading the coherently combined output matrix $v^{j^H} Y_{\delta_j}$ with the desired user's composite code matrix $C_{k_j}^j$.

The final soft symbol decisions for the desired user are then obtained by averaging the soft symbol decisions from each of the J branches:

$$\bar{s}_{du} = \frac{1}{J} \sum_{j=1}^{J} \bar{s}_{k_j}^j \qquad (16)$$

Finally, the soft decisions $\bar{s}_{du}$ are fed into a decision device that determines the nearest constellation point. This results in the hard decisions $\hat{s}_{du}$.

G.2.c Fully-trained block chip-level equalizer receiver. The j-th branch of the fully-trained block chip-level equalizer receiver estimates the desired user's data symbol vector $s_{k_j}^j$ (we assume the desired user to be the $k_j$-th user of the j-th base-station multiplex) from $Y_{a_j}$, with $\delta_j - Q \leq a_j \leq \delta_j + L_j$, based on the knowledge of the j-th base-station's composite code matrix for the desired user $C_{k_j}^j$ and multi-user chip vector $x_0^j$. Although the fully-trained block chip-level equalizer receiver has zero spectral efficiency and is therefore useless in practice, its BER performance serves well as a lower bound on the BER probability of the proposed block chip equalizer receivers [14].

We assume first, for the sake of clarity, there is no additive noise present in $Y_{a_j}$ ($\delta_j - Q \leq a_j \leq \delta_j + L_j$): Because of assumptions 5 and 6, the rows of $Y_{a_j}$ span the row space of $X_{a_j}$. Hence, there exists a $1 \times (Q+1)M$ linear fully-trained chip-level equalizer $w_{a_j}^j$, for which:

$$w_{a_j}^j Y_{a_j} - x_0^j = 0 \qquad (17)$$

where $w_a^j$ is a ZF linear chip-level equalizer with $(Q+1)M-r$ degrees of freedom.

In order to derive an identifiability condition on $w_{a_j}^j$, we observe that the ZF problem in Equation 17 can be recast into the following equivalent ZF problem:

$$[\tilde{w}_{a_j}^j \mid 1] \begin{bmatrix} X_{a_j} \\ -x_0^j \end{bmatrix} = 0$$

because the rows of $X_{a_j}$ span the row space of $Y_{a_j}$. In order to guarantee the uniqueness of the solution for $\tilde{w}_{a_j}^j$, the right-hand side matrix of the above equation should have at most a one-dimensional left null space. This leads to the following identifiability condition:

$$BN \geq r \qquad (18)$$

which states that the number of observed chip samples should be larger than the system order r.

Let us now assume that additive noise is present in $Y_{a_j}$ ($\delta_j - Q \leq a_j \leq \delta_j + L_j$). We then solve the following Least Squares (LS) minimisation problem:

$$\overline{w}_{a_j}^j = \underset{w_{a_j}^j}{\arg\min} \| w_{a_j}^j Y_{a_j} - x_0^j \|^2 \qquad (19)$$

which can be interpreted as follows. The equalized output matrix for the j-th base-station $w_{a_j}^j Y_{a_j}$ should be as close as possible to the known multi-user chip vector of the j-th base-station $x_0^j$ in a Least Squares sense.

The obtained fully-trained chip-level equalizer $\overline{w}_a^j$ may subsequently be used to extract the desired user's soft symbol decisions in the j-th branch:

$$\overline{s}_{k_j}^j = \overline{w}_{a_j}^j Y_{a_j} C_{k_j}^{jH} \qquad (20)$$

The final soft symbol decisions for the desired user are then obtained by averaging the soft symbol decisions from each of the J branches:

$$\overline{s}_{du} = \frac{1}{J} \sum_{j=1}^{J} \overline{s}_{k_j}^j \qquad (21)$$

Finally, the soft decisions $\overline{s}_{du}$ are fed into a decision device that determines the nearest constellation point. This results in the hard decisions $\hat{s}_{du}$.

G.2.d Pilot-trained block chip-level equalizer receiver. The j-th branch of the pilot-trained block chip-level equalizer receiver estimates the desired user's data symbol vector $s_{k_j}^j$ (we assume the desired user to be the $k_j$-th user of the j-th base-station multiplex) from $Y_{a_j}$, with $\delta_j - Q \leq a_j \leq \delta_j + L_j$, based on the knowledge of the j-th base-station's composite code matrix for the desired user $C_{k_j}^j$, pilot composite code matrix $C_p^j$ and pilot symbol vector $s_p^j$.

We assume first, for the sake of clarity, there is no additive noise present in $Y_{a_j}$ ($\delta_j - Q \leq a_j \leq \delta_j + L_j$). Because of assumptions 5 and 6, the rows of $Y_{a_j}$ span the row space of $X_{a_j}$. Hence, there exists a $1 \times (Q+1)M$ linear pilot-trained chip-level equalizer $g_{a_j}^j$, for which:

$$g_{a_j}^j Y_{a_j} - x_0^j = 0$$

where $g_a^j$ is a ZF linear chip-level equalizer with $(Q+1)M-r$ degrees of freedom. By despreading the above equation with the pilot composite code matrix $C_p^j$ by using Equation 70 we can then write $$g_{a_j}^j Y_{a_j} C_p^{jH} - s_p^j = 0 \qquad (22)$$

because $C_d^j C_p^{jH} = 0_{K_j B \times B}$ due to the orthogonality of the user and pilot code sequences at each symbol instant and because $C_p^j C_p^{jH} = I_B$ due to the normalisation of the pilot code sequence at each symbol instant.

In order to derive an identifiability condition on $g_{a_j}^j$, we observe that the ZF problem in Equation 22 can be recast into the following equivalent ZF problem $$[\tilde{g}_{a_j}^j \mid 1] \begin{bmatrix} X_{a_j} C_p^{jH} \\ -s_p^j \end{bmatrix} = 0$$

because the rows of $X_{a_j}$ span the row space of $Y_{a_j}$. In order to guarantee the uniqueness of the solution for $\tilde{g}_{a_j}^j$, the right-hand side matrix of the above equation should have at most a one-dimensional left null space. This leads to the following identifiability condition $$B \geq r \qquad (23)$$

which states that the block length B should be larger than the system order r.

Note that Equation 22 can be derived for all $A^j$ processing delays $a = A_1^j, A_1^j + 1, \ldots, A_2^j$ and these results can be combined, leading to:

$$\frac{1}{A_j} g^j Y^j C_p^j - s_p^j = 0$$

where $g^j$ is the $1 \times A^j (Q+1)M$ linear pilot-trained super chip-level equalizer for the j-th base-station:

$$g^j = [g_{A_1}^j \cdots g_{A_2}^j]$$

For the pilot-trained receiver, choosing $A^j > 1$ corresponds to taking a larger Q. For this reason, we will only focus on one processing delay ($A^j = 1$).

Let us now assume that additive noise is present in $Y_{a_j}$ ($\delta_j-Q \leq a_j \leq \delta_j+L_j$). We then solve the following Least Squares (LS) minimisation problem:

$$\bar{g}_{a_j}^j = \arg\min_{g_{a_j}^j} \|g_{a_j}^j Y_{a_j} C_p^{jH} - s_p^j\|^2 \tag{24}$$

which can be interpreted as follows. The equalized output matrix for the j-th base-station $g_{a_j}^j Y_{a_j}$ is despread with the j-th base-station's pilot composite code matrix $C_p^j$. The equalized output matrix after despreading $g_{a_j}^j Y_{a_j} C_p^{jH}$ should then be as close as possible to the known pilot symbol vector of the j-th basestation $s_p^j$ in a Least Squares sense.

It is easy to prove that the LS problem in Equation 24 can be rewritten as follows:

$$\bar{g}_{a_j}^j = \arg\min_{g_{a_j}^j} \|g_{a_j}^j Y_{a_j} (C_p^{jH} C_p^j) - s_p^j C_p^j\|^2 \tag{25}$$

showing that the equalized output matrix $g_{a_j}^j Y_{a_j}$ is first projected on the subspace spanned by the j-th base-station's pilot composite code matrix $C_p^j$. The equalized output matrix after projecting $$g_{a_j}^j Y_{a_j} (C_p^{jH} C_p^j)$$

should-then be as close as possible to the known pilot chip vector of the j-th base-station $s_p^j C_p^j$ in a Least Squares sense.

The user-specific detection part of the pilot-trained block chip-level equalizer receiver is very similar to the one of the fully-trained block chip-level equalizer receiver. Equations 20 and 75 remain valid if we replace $$\bar{w}_{a_j}^j \text{ by } \bar{g}_{a_j}^j.$$

G.2.e Enhanced pilot-trained block chip-level equalizer receiver. The j-th branch of the enhanced pilot-trained block chip-level equalizer receiver estimates the desired user's data symbol vector $s_{k_i}^j$ from $Y_{a_j}$, with $\delta_j-Q \leq a_j \leq \delta_j+L_j$, based on the knowledge of the j-th base-station's multi-user composite code matrix $C_d^j$, pilot composite code matrix $C_p^j$ and pilot symbol vector $s_p^j$.

We assume first, for the sake of clarity, there is no additive noise present in $Y_{a_j}$ ($\delta_j- \leq a_j \leq \delta_j+L_j$). Because of assumptions 5 and 6, the rows of $Y_{a_j}$ span the row space of $X_{a_j}$. Hence, there exists a $1\times(Q+1)M$ linear enhanced pilot-trained chip-level equalizer $f_{a_j}^j$, for which:

$$f_{a_j}^j Y_{a_j} - x_0^j = 0$$

where $f_{a_j}^j$ is a ZF linear chip-level equalizer with $(Q+1)M-r$ degrees of freedom (hence, this linear chip-level equalizer is only unique when $(Q+1)M=r$). Using Equation 70 we can then write:

$$f_{a_j}^j Y_{a_j} - s_d^j C_d^j - s_p^j C_p^j = 0 \tag{26}$$

which is a ZF problem in both the equalizer vector $f_{a_j}^j$, and the multi-user data symbol vector $s_d^j$.

In order to derive an identifiability condition on $f_{a_j}^j, s_d^j$, we observe that the ZF problem in Equation 26 can be recast into the following equivalent ZF problem:

$$[\bar{f}_{a_j}^j | s_d^j | 1] \begin{bmatrix} X_{a_j} \\ \hline -C_d^j \\ \hline -s_p^j C_p^j \end{bmatrix} = 0$$

because the rows of $X_{a_j}$ span the row space of $Y_{a_j}$. In order to guarantee the uniqueness of the solution for $\bar{f}_{a_j}^j, s_d^j$, the right-hand side matrix of the above equation should have at most a one-dimensional left null space. This leads to the following identifiability condition:

$$B(N-K_j) \geq r \tag{27}$$

which states that the block length B times the number of unused spreading codes $N-K_j$ should be larger than the system order r. Therefore the maximum number of users that can be supported is $K_j=N-1$, where N is the spreading factor.

Note that Equation 26 can be derived for all $A^j$ processing delays $a=A_1^j, A_1^j+1, \ldots, A_2^j$ and these results can be combined, leading to:

$$f^j y^j - s_d^j \mathcal{C}_d^j - s_p^j \mathcal{C}_p^j = 0$$

where $f^j$ is the $1\times A^j(Q+1)M$ linear enhanced pilot-trained super chip-level equalizer for the j-th base-station:

$$f^j = [f_{A_1}^j \ldots f_{A_2}^j]$$

For the enhanced pilot-trained receiver, taking $A^j>1$ does not correspond to taking a larger Q but to the mutually referenced equalizer (MRE) approach presented in [23]. However, the performance improvements obtained by taking $A^j>1$ come at a very high cost. For this reason, we will only focus on one processing delay ($A^j=1$).

Let us now assume that additive noise is present in $Y_{a_j}$ ($\delta_j-Q \leq a_j \leq \delta_j+L_j$). We then solve the following Least Squares (LS) minimisation problem:

$$\bar{f}_{a_j}^j, \bar{s}_d^j = \arg\min_{f_{a_j}^j, s_d^j} \|f_{a_j}^j Y_{a_j} - s_d^j C_d^j - s_p^j C_p^j\|^2 \tag{28}$$

Since the LS cost function is a quadratic form in $f_{a_j}^j, s_d^j$, the minimisation can be done independently for $f_{a_j}^j$ and $s_d^j$. In order to obtain a direct equalizer estimation, we first solve for $s_d^j$, assuming $f_{a_j}^j$ to be known and fixed. The LS solution for $s_d^j$ can be simplified to:

$$\bar{s}_d^j = f_{a_j}^j Y_{a_j} C_d^{jH} \tag{29}$$

because $C_d^j C_d^{jH} = I_{k_jB}$ and $C_p^j C_d^{jH} = 0_{B \times K_jB}$ due to the orthogonality of the user code sequences and the pilot code sequence at each symbol instant. Substituting $\bar{s}_d^j$ into the original LS problem of Equation 28, leads to a modified LS problem in $f_{a_j}^j$ only:

$$\bar{f}_{a_j}^j = \arg\min_{f_{a_j}^j} \|f_{a_j}^j Y_{a_j} (I_{BN} - C_d^{jH} C_d^j) - s_p^j C_p^j\|^2 \tag{30}$$

which can be interpreted as follows. The equalized output matrix for the j-th base-station $f_{a_j}^j Y_{a_j}$ is projected on the orthogonal complement of the subspace spanned by the j-th base-station's multi-user composite code matrix $C_d^j$. The equalized output matrix after projecting $f_{a_j}^j Y_{a_j} (I_{BN} - C_d^{jH} C_d^j)$ should then be as close as possible to the known pilot chip vector of the j-th base-station $s_p^j C_p^j$ in a Least Squares sense. Note that when $K_j = N-1$, $I_{BN} - C_d^{jH} C_d^j = C_p^{jH} C_p^j$ and Equation 30 reduces to Equation 25. This means that for a fully loaded system ($K_j = N-1$) the enhanced pilot-trained approach is exactly the same as the pilot-trained approach. This is also indicated by the identifiability conditions 23 and 27.

It is easy to prove that the modified LS problem of Equation 30 can be rewritten as follows:

$$\tilde{f}_{a_j}^j = \underset{f_{a_j}^j}{\operatorname{argmin}} \left\{ \left\| f_{a_j}^j Y_{a_j} C_p^{jH} - s_p^j \right\|^2 + \left\| f_{a_j}^j Y_{a_j} \left( I_{BN} - C_d^{jH} C_d^j - C_p^{jH} C_p^j \right) \right\|^2 \right\} \quad (31)$$

showing that the enhanced pilot-trained LS problem naturally decouples into two different parts: a training-based part and a fully-blind part. On the one hand, the training-based part (described by the first term of Equation 31) corresponds to the pilot-trained chip equalizer of Equation 24. On the other hand, the fully-blind part (described by the second term of Equation 31) projects the equalized output matrix $f_{a_j}^j Y_{a_j}$ on the orthogonal complement of the subspace spanned by both the j-th base-station's multi-user composite code matrix $C_d^j$ and the j-th base-station's pilot composite code matrix $C_p^j$. Furthermore, the energy in the equalized output matrix after projecting $f_{a_j}^j Y_{a_j} (I_{BN} - C_d^{jH} C_d^j - C_p^{jH} C_p^j)$ should be as small as possible in a Least Squares sense which actually corresponds to the Minimum Output Energy (MOE) criterion of [18] and [19]. For this reason, the enhanced pilot-trained chip equalizer is actually a semi-blind chip-level equalizer.

The user-specific detection part of the enhanced pilot-trained block chip equalizer receiver is very similar to the one of the fully-trained block chip equalizer receiver. Equations 20 and 75 remain valid if we replace $\overline{w}_{a_j}^j$ by $\tilde{f}_{a_j}^j$.

G.3 Space-time Adaptive Chip-level Equalizer Receivers

Up till now, we have only discussed the block version of the different chip equalizer receivers. It addresses a block of B symbols at once and is only suited for a block fading channel, that remains constant during the entire duration of the block. Since in practice, the multi-path fading channel is time-varying, we have to devise an adaptive version as well that updates the equalizer coefficients on the fly. In this section, we derive an adaptive version of the different chip-level equalizer receivers from their corresponding block version and provide complexity figures for each of them. The adaptive receivers address a single symbol at once and consist of J parallel branches, one for each base-station connected to the mobile station of interest. The j-th branch basically consists of two parts: a pilot-aided updating part and a user specific detection part.

G.3.a Preliminary definitions. We introduce the following $(Q+1)M \times N$ output matrix block $Y_a[i]$:

$$Y_a[i] = \begin{bmatrix} y[iN+a] & \cdots & y[(i+1)N+a-1] \\ \vdots & & \vdots \\ y[iN+a+Q] & \cdots & y[(i+1)N+a+Q-1] \end{bmatrix} \quad (32)$$

where i represents the symbol instant and a the processing delay.

The $(L_j+1)M \times 1$ pilot symbol vector for the j-th base-station at the i-th symbol instant is defined as follows:

$$s_p^j[i] = [s_p^j[i] \ldots s_p^j[i]]^T$$

The $1 \times N$ multi-user chip vector transmitted by the j-th base-station at the i-th symbol instant starting at delay a is defined by:

$$x_a^j[i] = [x^j[iN+a] \ldots x^j[(i+1)N+a-1]]$$

The $K_j \times N$ multi-user composite code matrix $C_d^j[i]$ stacks the j-th base-station's active user composite code vectors at the i-th symbol instant:

$$C_d^j[i] = [c_1^j[i]^T \ldots c_{K_j}^j[i]^T]^T$$

Note that the $K_j \times N$ multi-user spreading code matrix $\dot{C}_d^j$ can be similarly defined as $C_d^j[i]$, stacking the j-th base-station's active user spreading code vectors for each symbol instant.

G.3.b Pilot-aided adaptive RAKE receiver. The j-th branch of the pilot-aided adaptive RAKE receiver estimates the desired user's data symbol $s_k^j[i]$ (we assume the desired user to be the $k_j$-th user of the j-th base-station multiplex) from the set $Y_{\delta_j}[0], Y_{\delta_j}1, \ldots, Y_{\delta_j}[i]$, with $Q = L_j$, based on the knowledge of the j-th base-station's composite code vectors for the desired user $c_{k_j}^j[0], c_{k_j}^j[1], \ldots, c_{k_j}^j[i]$, pilot composite code vectors $c_p^j[0], c_p^j[1], \ldots, c_p^j[i]$ and pilot symbols $s_p^j[0], s_p^j[1], \ldots, s_p^j[i]$.

The pilot-aided channel updating part of the j-th branch exploits the knowledge of the pilot composite code vectors and pilot symbols of the corresponding j-th base-station [22]. It continuously updates the j-th base-station's space-time channel vector at the symbol rate. By having a closer look at the corresponding block processing algorithm in Equation 13, it is rather straightforward to derive an adaptive processing algorithm for the j-th branch. The new estimate of the space-time channel vector is the weighted sum of the old estimate and some correction term:

$$v^j[i] = (1-\alpha)v^j[i-1] + \alpha(Y_{\delta_j}[i]c_p^j[i]^H) \odot s_p^j[i]^* \quad (33)$$

The correction term is the component-wise multiplication of the new despread output matrix block $Y_{\delta_j}[i]c_p^{j[i]H}$ and the complex conjugate of the new pilot symbol vector $s_p^j[i]$. The pilot-aided channel updating part for the j-th branch consists of three computational steps per time update, namely first a pilot despreading step, then a pilot symbol modulation removal step and finally an updating step. The pilot despreading step requires $\mathcal{O}(L_j MN)$ computations. The pilot symbol modulation removal step as well as the updating step require $\mathcal{O}(L_j M)$ computations. So, the pilot-aided channel updating part requires $$\mathcal{O}\left(\sum_{j=1}^{J} L_j MN\right)$$

computations in total for all J branches. By setting $L = \max_j L_j$, we can upperbound this complexity figure by $\mathcal{O}(JLMN)$.

The user-specific detection part of the j-th branch utilizes the updated space-time channel vector, provided by the channel updating part, to coherently combine the received output matrix block $Y_{\delta_j}[i]$. It subsequently generates a soft decision $\bar{s}_{k_j}^j[i]$ about the desired user's i-th symbol:

$$\bar{s}_{k_j}^j[i] = v^j[i]^H Y_{\delta_j}[i] c_{k_j}^j[i]^H \quad (34)$$

a by despreading the coherently combined output matrix block $v^j[i]^H Y_{\delta_j}[i]$ with the desired user's composite code vector at the i-th symbol instant $c_{k_j}^j[i]$. The user-specific detection part consists of two computational steps per time update, namely first a coherent combining step and then a correlation step. On the one hand, the coherent combining step requires $O$ (NL$_j$M) computations. On the other hand, the correlation step requires $O$ (N) computations. So, the user-specific detection part requires $$O\left(\sum_{j=1}^{J} NL_j M\right)$$

computations in total for all J branches. With L=max$_j$ L$_j$, we finally arrive at $O$ (JNLM) computations.

The final soft decision $\bar{s}_{du}[i]$ about the desired user's i-th symbol is then obtained with $O$ (J) complexity by averaging the soft decisions of the different branches $$\bar{s}_{du}[i] = \frac{1}{J}\sum_{j=1}^{J} \bar{s}_{k_j}^j[i] \qquad (35)$$

Finally, the soft decision $\bar{s}_{du}[i]$ is fed into a decision device, that determines the nearest constellation point. This results in the hard decision $\hat{s}_{du[i]}$.

G.3.c Fully-trained adaptive chip-level equalizer receiver. The j-th branch of the fully-trained adaptive chip-level equalizer receiver estimates the desired user's data symbol $s_{k_j}^j[i]$ (we assume the desired user to be the $k_j$-th user of the j-th base-station multiplex) from the set $Y_{a_j}[0], Y_{a_j}[1], \ldots Y_{a_j}[i]$, with $\delta_j - Q \leq a_j \leq \delta_j + L_j$, based on the knowledge of the j-th base-station's composite code vectors for the desired user $c_k^j[0], c_k^j[1], \ldots c_k^j[i]$ and multi-user chip vectors $x_0^j[0], x_0^j[1], \ldots x_0^j[i]$. Although the fully-trained adaptive chip-level equalizer receiver is useless in practice, its BER performance serves well as a lower bound on the BER probability of the proposed adaptive chip-level equalizer receivers [14].

The fully-trained updating part of the j-th branch exploits the knowledge of the multi-user chip vectors of the corresponding j-th base-station. It continuously updates the equalizer coefficients at the symbol rate using a Square Root Information (SRI) RLS type of adaptive algorithm [24]. By having a closer look at the corresponding LS block processing algorithm in Equation 19, it is indeed rather straightforward to derive an RLS type of adaptive processing algorithm for the j-th branch. The new incoming output matrix block $Y_{a_j}[i]$ is used together with the new multi-user chip sequence vector $x_0^j[i]$ in a QRD-updating step:

$$\left[\begin{array}{c|c|c} R_{a_j}^j[i] & 0_{(Q+1)M \times 1} & 0_{(Q+1)M \times (N-1)} \\ \hline z_{a_j}^j[i] & \star & 0_{1 \times (N-1)} \end{array}\right] \leftarrow \left[\begin{array}{c|c|c} \lambda R_{a_j}^j[i-1] & Y_{a_j}[i] \\ \hline \lambda z_{a_j}^j[i-1] & x_0^j[i] \end{array}\right] \cdot T_{a_j}^j[i] \qquad (36)$$

In this equation, $\lambda$ is the forget factor, that should be chosen in correspondence with the coherence time of the time-varying channel. $T_{a_j}^j[i]$ represents the orthogonal updating matrix at the i-th symbol instant that can be written as a sequence of Givens transformations [24]0. The fully-trained QRD-updating step tracks a (Q+1)M×(Q+1)M lower-triangular factor $R_{a_j}^j[i]$ and a corresponding 1×(Q+1)M right-hand side $z_{a_j}^j[i]$.

The new values for the fully-trained chip equalizer coefficients of the j-th branch $w_{a_j}^j[i]$ then follow from the backsubstitution step:

$$w_{a_j}^j[i] \cdot R_{a_j}^j[i] = z_{a_j}^j[i] \qquad (37)$$

The fully-trained SRI-RLS updating part for the j-th branch consists of two computational steps per time update, namely first a triangular QRD-updating step and then a triangular backsubstitution step. On the one hand, the QRD-updating step amounts to triangularizing a structured matrix, namely a triangular matrix plus N extra columns, and requires $O$ (NQ$^2$M$^2$) computations. On the other hand, the triangular backsubstitution step requires $O$ (Q$^2$M$^2$) computations. So, the fully-trained updating part requires $O$ (JNQ$^2$M$^2$) computations in total for all J branches.

The user-specific detection part of the j-th branch utilizes the updated chip equalizer coefficients $w_{a_j}^j[i]$, provided by the updating part, to equalize the received output matrix block $Y_{a_j}[i]$. It subsequently generates a soft decision $\bar{s}_{k_j}^j[i]$ about the desired user's i-th symbol $$\bar{s}_{k_j}^j[i] = w_{a_j}^j[i] Y_{a_j}[i] c_{k_j}^j[i]^H \qquad (38)$$

by despreading the equalized output matrix block $w_{a_j}^j[i] Y_{a_j}[i]$ with the desired user's composite code vector at the i-th symbol instant $c_{k_j}^j[i]$. The user-specific detection part also consists of two computational steps per time update, namely first an equalization step and then a correlation step. On the one hand, the equalization step requires $O$ (NQM) computations. On the other hand, the correlation step requires $O$ (N) computations. So, the user-specific detection part requires $O$ (JNQM) computations in total for all J branches.

The final soft decision $\bar{s}_{du}[i]$ about the desired user's i-th symbol is then obtained with $O$ (J) complexity by averaging the soft decisions of the different branches:

$$\bar{s}_{du}[i] = \frac{1}{J}\sum_{j=1}^{J} \bar{s}_{k_j}^j[i] \qquad (39)$$

Finally, the soft decision $\bar{s}d_{du}[i]$ is fed into a decision device, that determines the nearest constellation point. This results in the hard decision $\hat{s}d_{du}[i]$.

G.3.d Pilot-trained adaptive chip-level equalizer receiver. The j-th branch of the pilot-trained adaptive chip-level equalizer receiver estimates the desired user's data symbol $s_{k_j}^j[i]$ (we assume the desired user to be the $k_j$-th user of the j-th base-station multiplex) from the set $Y_{a_j}[0], Y_{a_j}[1], \ldots Y_{a_j}[i]$, with $\delta_j - Q \leq a_j \leq \delta_j + L_j$, based on the knowledge of the j-th base-station's composite code vectors for the desired user $c_{k_j}^j[0], c_{k_j}^j[1], \ldots c_{k_j}^j[i]$, pilot composite code vectors $c_p^j[0], c_p^j[1], \ldots c_p^j[i]$ and pilot symbols $s_p^j[0], s_p^j[1], \ldots s_p^j[i]$.

The pilot-trained updating part of the j-th branch exploits the knowledge of the pilot composite code vectors and pilot symbols of the corresponding j-th base-station [25]. It continuously updates the equalizer coefficients at the symbol rate using a Square Root Information (SRI) RLS type of adaptive algorithm [24]. By having a closer look at the corresponding LS block processing algorithm in Equation 24, it is indeed rather straightforward to derive an RLS type of adaptive processing algorithm for the j-th branch. The new incoming output matrix block $Y_{a_j}[i]$ is first despread with the j-th base-station's pilot composite code vector for the i-th symbol instant $c_p^j[i]$. The new despread output matrix block $Y_{a_j}[i] c_p^j[i]^H$ is then used together with the new pilot symbol $s_p^j[i]$ in a QRD-updating step:

$$\left[\begin{array}{c|c} R_{a_j}^j[i] & 0_{(Q+1)M \times 1} \\ \hline z_{a_j}^j[i] & \star \end{array}\right] \leftarrow \left[\begin{array}{c|c} \lambda R_{a_j}^j[i-1] & Y_{a_j}[i]c_p^j[i]^H \\ \hline \lambda z_{a_j}^j[i-1] & s_p^j[i] \end{array}\right] \cdot T_{a_j}^j[i] \quad (40)$$

In this equation, $\lambda$ is again the forget factor and $T_{a_j}^j[i]$ the orthogonal updating matrix. The pilot-trained QRD-updating step tracks a $(Q+1)M \times (Q+1)M$ lower-triangular factor $R_{a_j}^j[i]$ and a corresponding $1 \times (Q+1)M$ right-hand side $z_{a_j}^j[i]$. The new-values for the pilot-trained chip-level equalizer coefficients of the j-th branch $g_{a_j}^j[i]$ then follow from the backsubstitution step:

$$g_{a_j}^j[i] \cdot R_{a_j}^j[i] = z_{a_j}^j[i] \quad (41)$$

The pilot-trained SRI-RLS updating part for the j-th branch consists of three computational steps per time update, namely first a pilot despreading step, then a triangular QRD-updating step and finally a triangular backsubstitution step. The pilot despreading step requires $O(QMN)$ computations. The QRD-updating step amounts to triangularizing a structured matrix, namely a triangular matrix with one extra column, and requires $O(Q^2M^2)$ computations. The triangular backsubstitution step also requires $O(Q^2M^2)$ computations. So, the pilot-trained updating part requires $O(JQMN + JQ^2M^2)$ computations in total for all J branches.

The user-specific detection part of the pilot-trained adaptive chip-level equalizer receiver is very similar to the one of the fully-trained adaptive chip-level equalizer receiver. Equations 38 and 39 remain valid if we replace $w_{a_j}^j[i]$ by $g_{a_j}^j[i]$.

G.3.e Enhanced pilot-trained adaptive chip-level equalizer receiver. The j-th branch of the enhanced pilot-trained adaptive chip-level equalizer receiver estimates the desired user's data symbol $s_{k_j}^j[i]$ (we assume the desired user to be the $k_j$-th user of the j-th base-station multiplex) from the set $Y_{a_j}[0]$, $Y_{a_j}[1], \ldots Y_{a_j}[i]$ with $\delta_j - Q \leq a_j \leq \delta_j + L_j$, based on the knowledge of the j-th base-station's multi-user composite code matrices $C_d^j[0], C_d^j[1], \ldots, C_d^j[i]$, pilot composite code vectors $c_p^j[0], c_p^j[1], \ldots c_p^j[i]$ and pilot symbols $s_p^j[0], s_p^j[1], \ldots s_p^j[i]$.

The enhanced pilot-trained updating part of the j-th branch exploits the knowledge of all composite code vectors (so both pilot and user composite code vectors) and pilot symbols of the corresponding j-th base-station. It continuously updates the equalizer coefficients at the symbol rate using a Square Root Information (SRI) RLS type of adaptive algorithm [24]. By having a closer look at the corresponding LS block processing algorithm in Equation 30, it is indeed rather straightforward to derive an RLS type of adaptive processing algorithm for the j-th branch. Each new incoming output matrix block $Y_{a_j}[i]$ is first projected on the orthogonal complement of the subspace spanned by the j-th base-station's multi-user composite code matrix $C_d^j[i]$, achieved by the projection matrix $P_d^j[i]$:

$$P_d^j[i] = I_N - C_d^j[i]^H C_d^j[i] \quad (42)$$

The new projected output matrix block $Y_{a_j}[i]P_d^j[i]$ is then used together with the new pilot chip vector $s_p^j[i]c_p^j[i]$ in a QRD-updating step:

$$\left[\begin{array}{c|c|c} R_{a_j}^j[i] & 0_{(Q+1)M \times 1} & 0_{(Q+1)M \times (N-1)} \\ \hline z_{a_j}^j[i] & \star & 0_{1 \times (N-1)} \end{array}\right] \leftarrow \left[ \quad (43)\right.$$

-continued $$\left[\begin{array}{c|c} \lambda R_{a_j}^j[i-1] & Y_{a_j}[i]P_d^j[i] \\ \hline \lambda z_{a_j}^j[i-1] & s_p^j[i]c_p^j[i] \end{array}\right] \cdot T_{a_j}^j[i]$$

In this equation $\lambda$ is again the forget factor and $T_{a_j}^j[i]$ the orthogonal updating matrix. The enhanced pilot-trained QRD-updating step tracks a $(Q+1)M \times (Q+1)M$ lower-triangular factor $R_{a_j}^j[i]$ and a corresponding $1 \times (Q+1)M$ right-hand side $z_{a_j}^j[i]$. The new values for the enhanced pilot-trained chip-level equalizer coefficients of the j-th branch $f_{a_j}^j[i]$ then follow from the backsubstitution step:

$$f_{a_j}^j[i] \cdot R_{a_j}^j[i] = z_{a_j}^j[i] \quad (44)$$

The enhanced pilot-trained SRI-RLS updating part for the j-th branch consists of four computational steps per time update, namely first a projection step, then a pilot symbol spreading step, next a triangular QRD-updating step and finally a triangular backsubstitution step. The projection step decomposes into two substeps, namely the projection matrix calculation substep and the projection matrix multiplication substep. The projection matrix calculation substep would normally require $O(K_j N^2)$ computations. Note however that the multi-user composite code correlation matrix $C_d^j[i]^H C_d^j[i]$ in Equation 42 can be expressed as follows:

$$C_d^j[i]^H C_d^j[i] = \dot{C}_d^{jH}\dot{C}_d^j \odot c_s^j[i]^H c_s^j[i] \quad (45)$$

showing that it is the component-wise multiplication of the multi-user spreading code correlation matrix $\dot{C}_d^{jH}\dot{C}_d^j$ and the scrambling code correlation matrix $c_s^j[i]^H c_s^j[i]$. Since the multi-user spreading code correlation matrix does not depend on the symbol instant i, it can be precalculated at the basestation and broadcasted to all active mobile stations. This leaves only $O(N^2)$ complexity for the projection matrix calculation substep at the mobile station. The projection matrix multiplication substep requires $O(QMN^2)$ computations. The pilot symbol spreading step only requires $O(N)$ computations. The QRD-updating step amounts to triangularizing a structured matrix, namely a triangular matrix plus N extra columns, and requires $O(NQ^2M^2)$ computations. Finally, the triangular backsubstitution step requires $O(Q^2M^2)$ computations. So, the enhanced pilot-trained updating part requires $O(JQMN^2 + JNQ^2M^2)$ computations in total for all J branches.

The user-specific detection part of the enhanced pilot-trained adaptive chip equalizer receiver is very similar to the one of the fully-trained adaptive chip equalizer receiver. Equations 38 and 39 remain valid if we replace $w_{a_j}^j[i]$ by $f_{a_j}^j[i]$.

G.3.f Complexity comparison. Table I compares the complexity of the different adaptive chin level equalizer receivers. The user-specific detection part is common to all receivers. Moreover, all receivers have linear complexity in the number of actively tracked base-stations J. The updating part of the pilot-aided adaptive RAKE receiver (PA-RAKE) has linear complexity in both the total number of RAKE fingers LM and the spreading factor N. The updating part of all other receivers has quadratic complexity in the total number of equalizer coefficients QM. The updating part of both the fully-trained (FT-CE) and the pilot-trained (PT-CE) adaptive chip-level equalizer receiver has linear complexity whereas that of the enhanced pilot-trained (EPT-CE) adaptive chip-level equalizer receiver has quadratic complexity in the spreading factor N. In fact, the updating part of the EPT-CE is N times more complex than that of the PT-CE. Note that the complexity figure of the EPT-CE agrees with the complexity figure of the LS channel estimators for long code DS-CDMA systems recently proposed in [26].

G.4 Simulation Results

G.4.a Block processing. The simulations for the block chip-level equalizer receivers are performed for the downlink of a WCDMA system with J=2 active base-stations, $K_j$=K users per base-station, QPSK data modulation, real orthogonal Walsh-Hadamard spreading codes of length N=12 along with a random overlay code for scrambling whose period measures

TABLE I

COMPLEXITY OF ADAPTIVE CHIP-LEVEL EQUALIZER RECEIVERS

| | updating | detection |
|---|---|---|
| PA-RAKE | O (JLMN) | O (JNLM) |
| FT-CE | O (JNQ$^2$M$^2$) | O (JNQM) |
| PT-CE | O (JQMN + JQ$^2$M$^2$) | O (JNQM) |
| EPT-CE | O (JQMN$^2$ + JNQ$^2$M$^2$) | O (JNQM) |

ρ=B symbols. The j-th base-station's interfering user signals and pilot signal are transmitted with a $P_i^j$=$P_i$ dB respectively $P_p^j$=$P_p$ dB higher power than the j-th base-station's desired user signal. The mobile station is equipped with the minimum number of receive antennas for chip rate sampling M=J+1=3 to simultaneously track J=2 base-stations. Each base-station's vector channel with order $L_j$=L=3 has M(L+1)=12 Rayleigh distributed channel taps of equal average power and is assumed to be constant during the entire duration of the block (block fading channel). The temporal smoothing factor Q+1 is chosen in correspondence with Equation 9 to be Q+1=JL=6. Note that the system order in this case equals r=J(J+1)L=18. All figures show the average BER versus the average SNR per bit for the pilot-aided block RAKE receiver (PA-RAKE), the pilot-trained (PT-CE), the enhanced pilot-trained (EPT-CE) and the fully-trained (FT-CE) block chip-level equalizer receiver. Also shown in the figures is the single-user bound (SUB) which is the theoretical BER-curve of QPSK with M(L+1)-th order diversity in Rayleigh fading channels [27].

Figure 10:
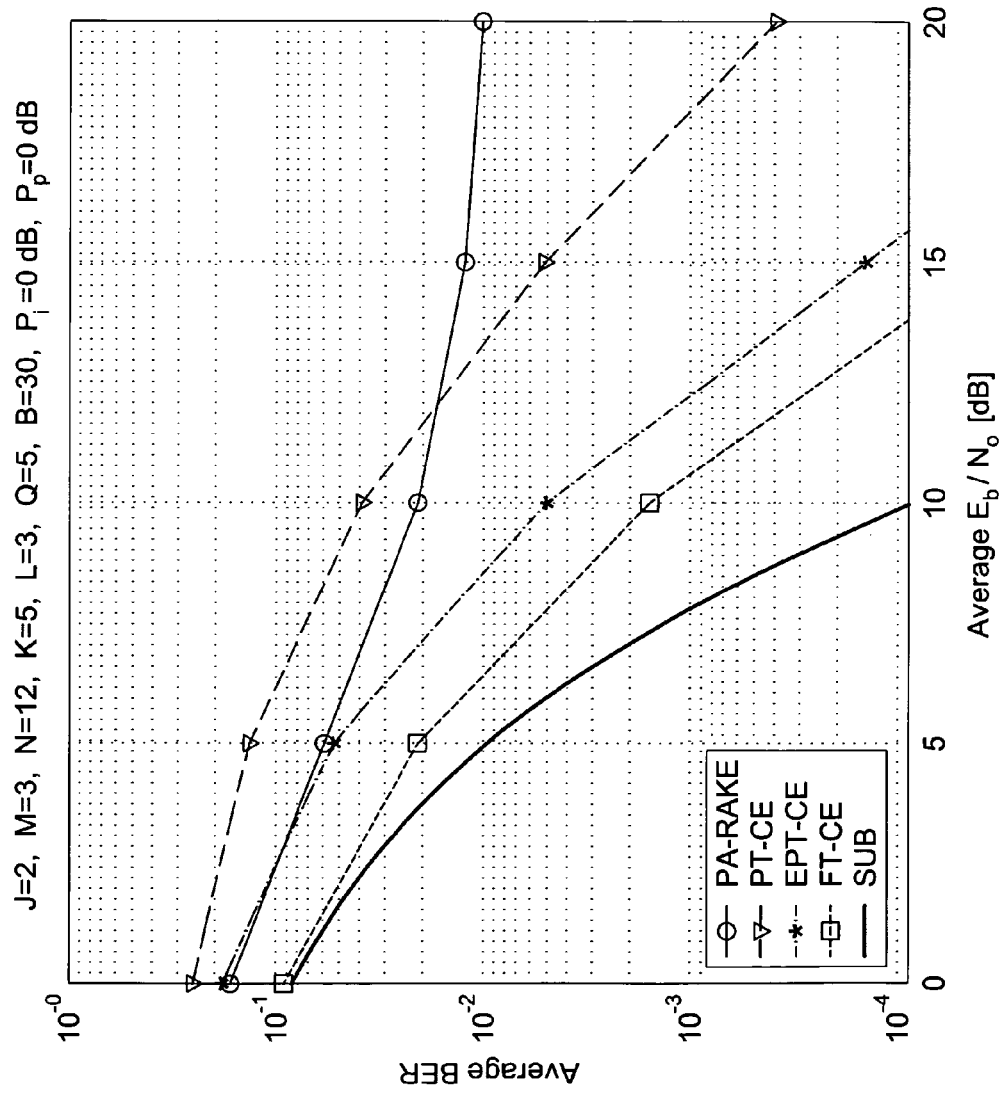
FIG. 10 illustrates a chart showing block processing for small block length B=30 according to one embodiment of the invention.
Figure 11:
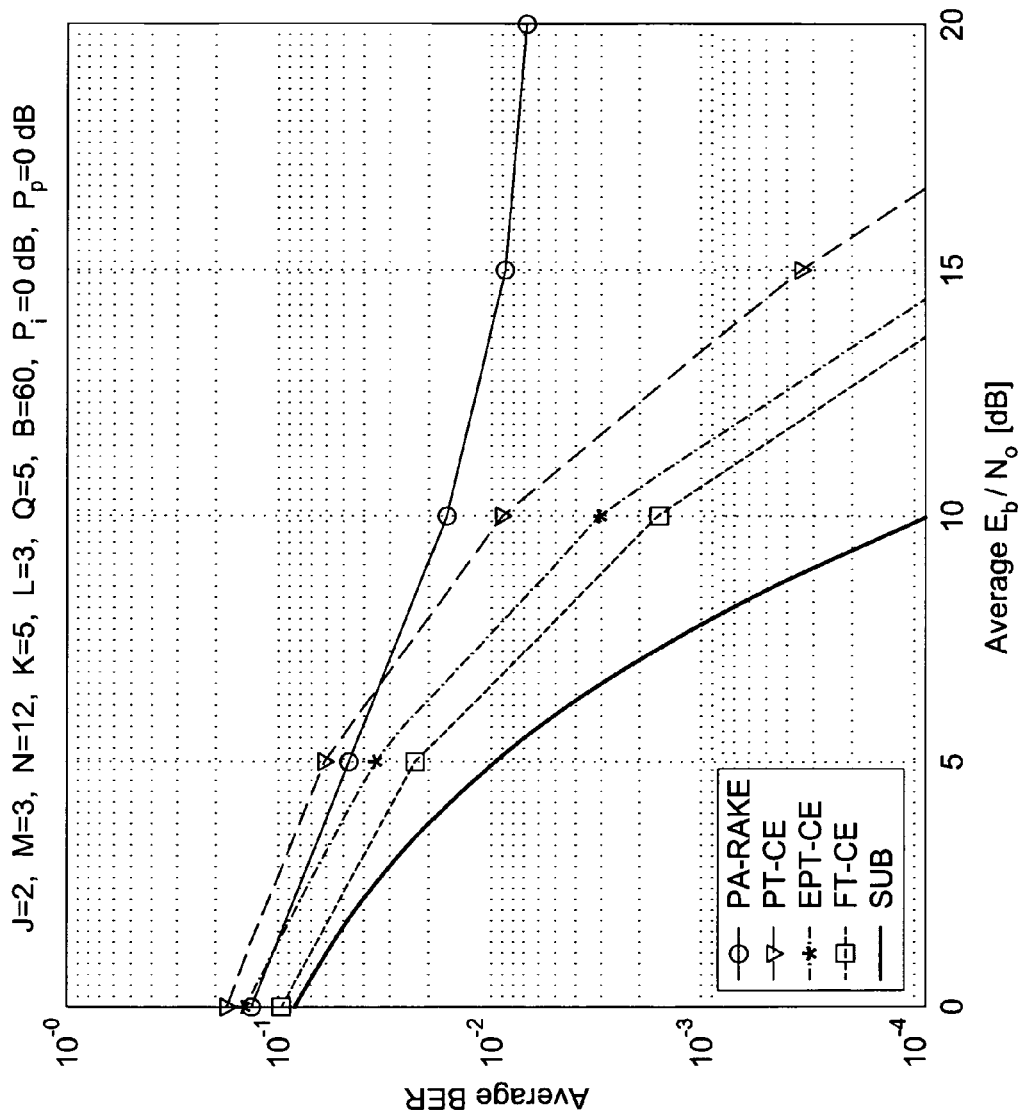
FIG. 11 illustrates a chart showing block processing for large block length B=60 according to one embodiment of the invention.

FIGS. 10 and 11 compare the performance of the space-time block chip-level equalizer receivers for half system load (K=5) and a block length of B=30 respectively B=60. The relative interference power is $P_i$=0 dB and the relative pilot power is $P_p$=0 dB. For a block length of B=30, shown in FIG. 10, both the EPT-CE and the FT-CE outperform the PA-RAKE for low to high SNR per bit. The PT-CE only outperforms the PA-RAKE at rather high SNR per bit. The EPT-CE achieves a 5.8 dB gain at a BER of $10^{-3}$ compared to the PT-CE and only exhibits a 1.7 dB loss compared to the ideal FT-CE. For a block length of B=60, this performance gain respectively loss decreases to 2.1 dB respectively 0.8 dB. For large block lengths B→∞, the performance of both the PT-CE and the EPT-CE converges to that of the ideal FT-CE.

Figure 12:
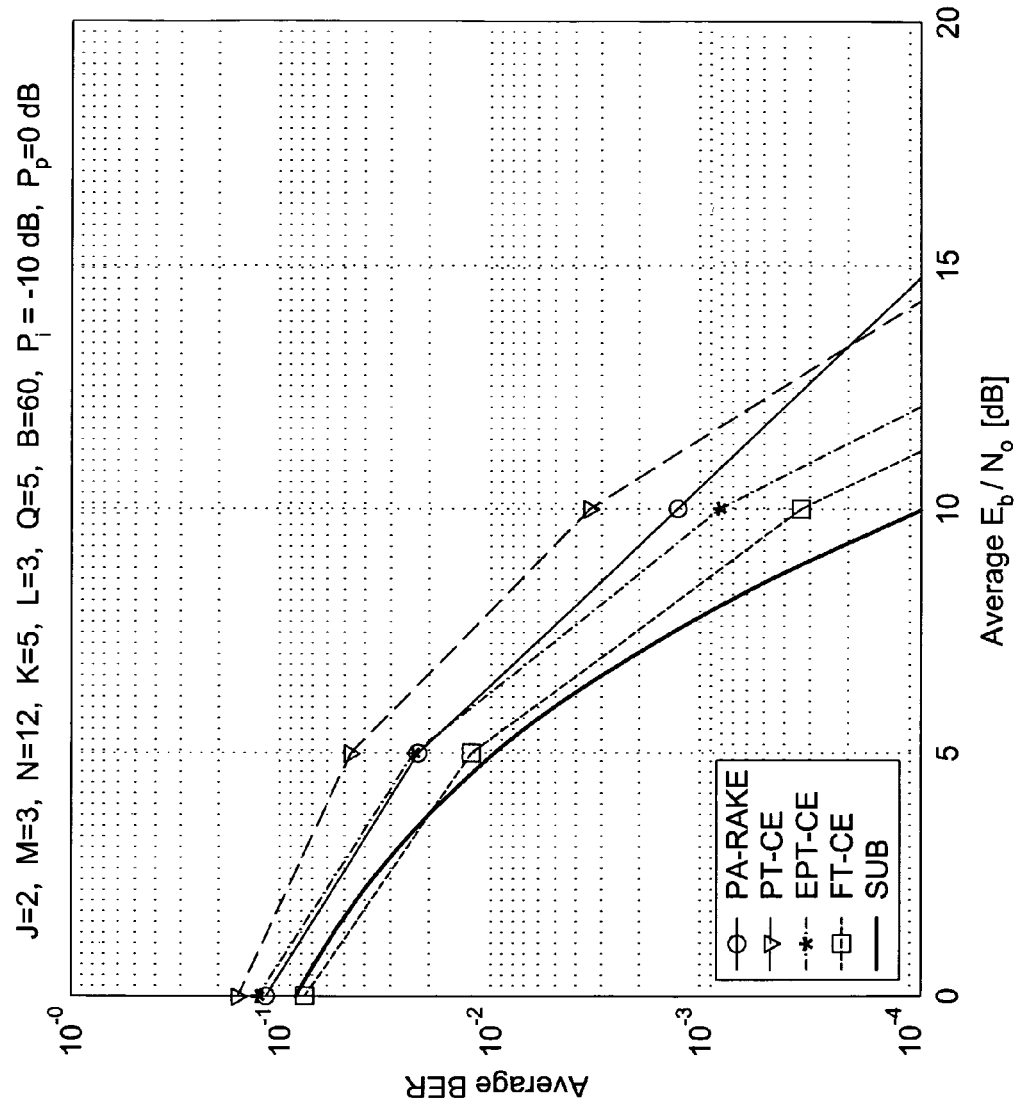
FIG. 12 illustrates a chart showing block processing for small interference power $P_i$=−10 dB according to one embodiment of the invention.
Figure 13:
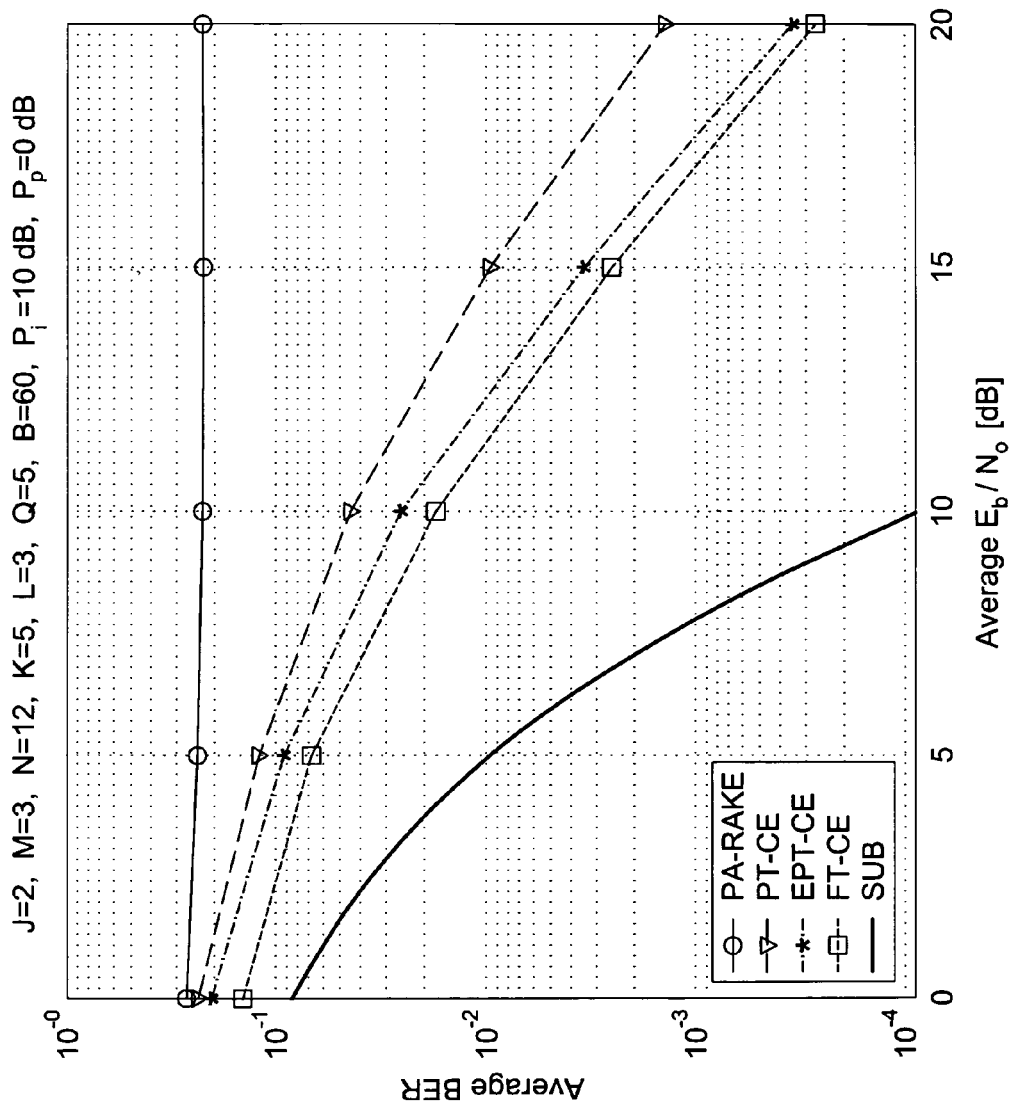
FIG. 13 illustrates a chart showing block processing for large interference power $P_i$=+10 dB according to one embodiment of the invention

FIGS. 12 and 13 compare the performance of the space-time block chip-level equalizer receivers for half system load (K=5) and a relative interference power of $P_i$=−10 dB respectively $P_i$=+10 dB. The block length is B=60 and the relative pilot power is $P_p$=0 dB. For a relative interference power of $P_i$=−10 dB, shown in FIG. 12, the FT-CE approaches the SUB rather closely. For low SNR per bit, the EPT-CE and the PA-RAKE have similar performance. Only at medium to high SNR per bit $$\left(\frac{E_b}{N_o} \geq 5 \text{ dB}\right),$$

the EPT-CE outperforms the PA-RAKE. The PT-CE has worse performance than the PA-RAKE. Only at rather high SNR per bit $$\left(\frac{E_b}{N_o} \geq 15 \text{ dB}\right)$$

the PT-CE has better performance than the PA-RAKE. For a relative interference power of $P_i$=+10 dB, shown in FIG. 13, the PA-RAKE exhibits an error floor at a BER of 2·10$^{-1}$. The curves for the PT-CE, the EPT-CE and the FT-CE shift up due to the increased MUI but remain near/far resistant.

Figure 14:
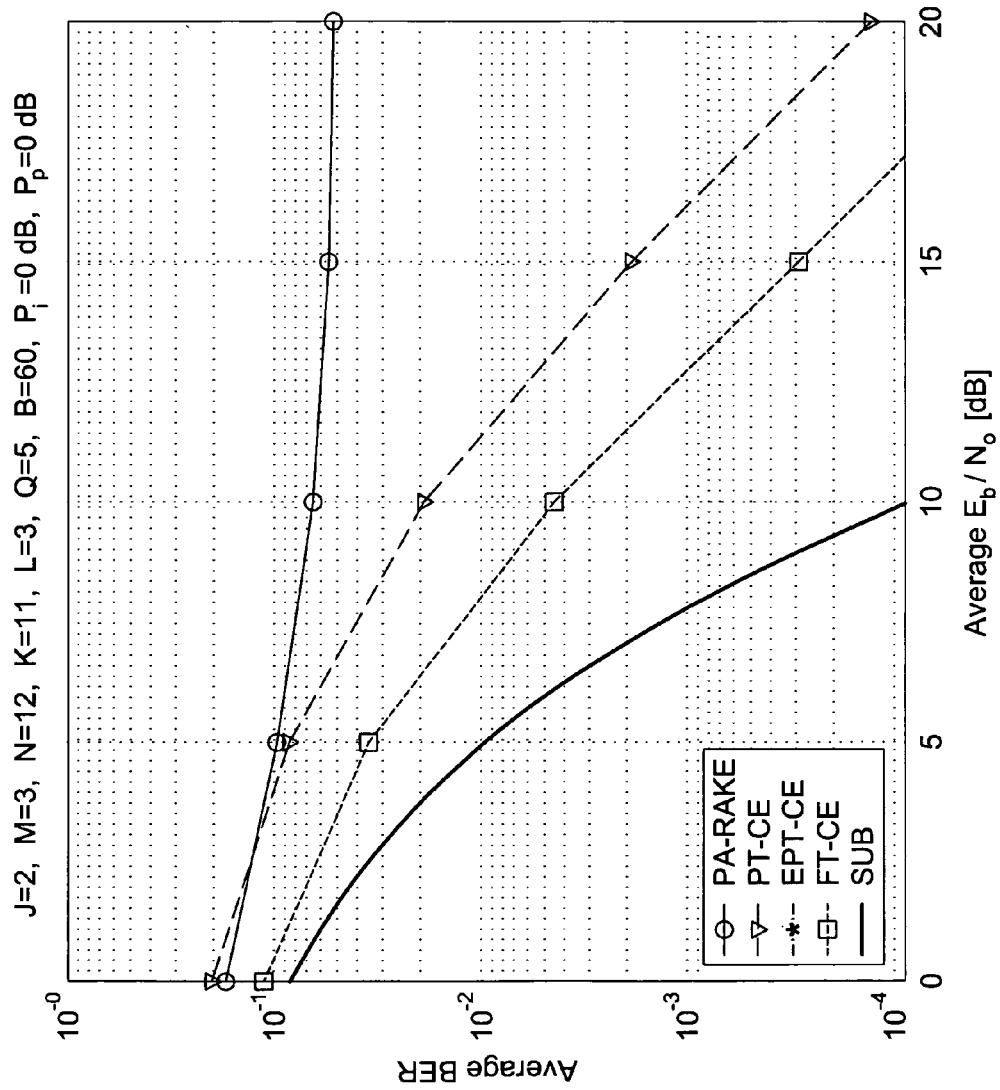
FIG. 14 illustrates a chart showing block processing for full system load K=11 according to one embodiment of the invention.

FIG. 14 compares the performance of the space-time block chip-level equalizer receivers for full system load (K=11), a block length of B=60, a relative interference power of $P_i$=0 dB and a relative pilot power of $P_p$=0 dB. The PT-CE and the EPT-CE have exactly the same performance (as discussed in Subsection G.2.e) but still outperform the PA-RAKE receiver, that exhibits an error floor at a BER of 5·10$^{-2}$. Compared to the ideal FT-CE, the PT-CE and the EPT-CE exhibit a 3.3 dB loss at a BER of 10$^{-3}$.

Figure 15:
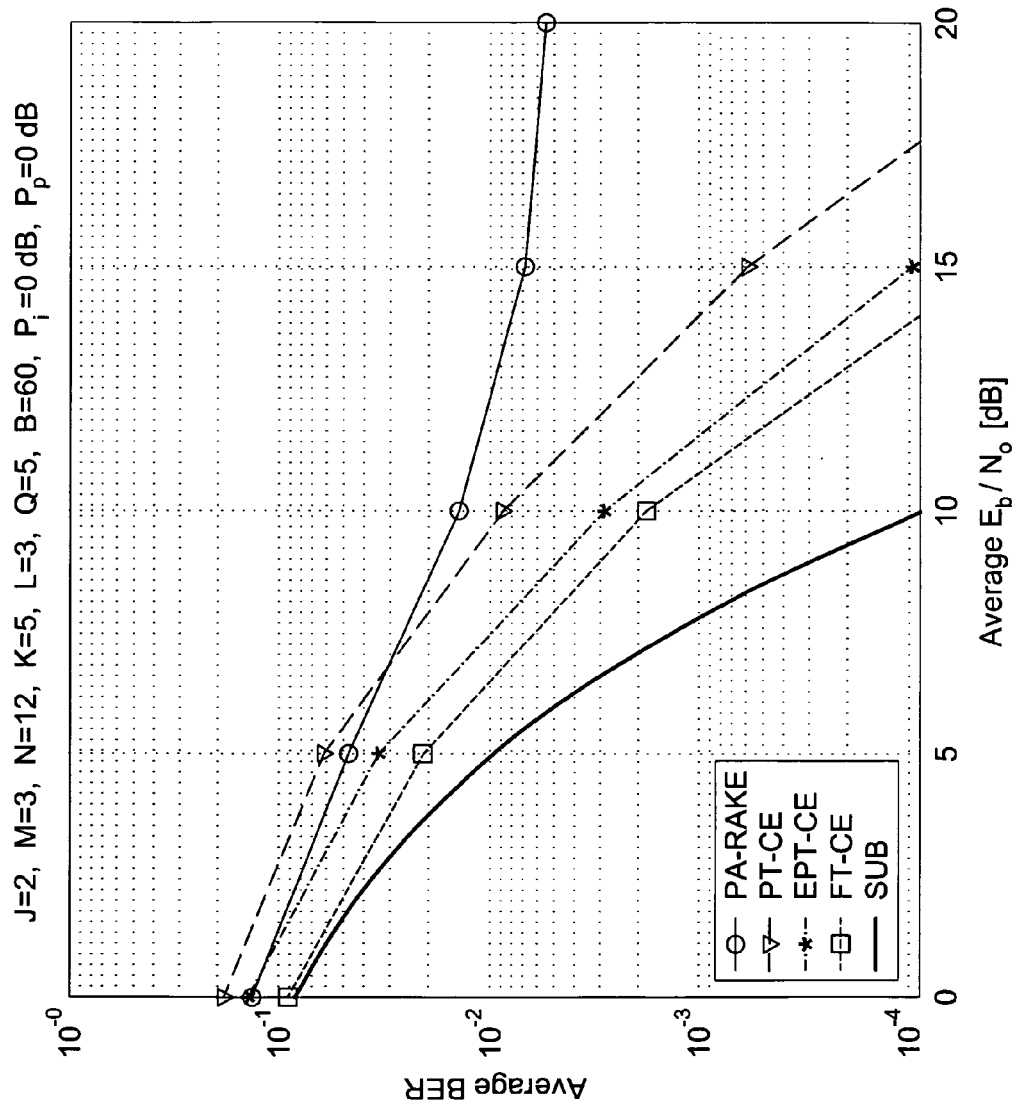
FIG. 15 illustrates a chart showing block processing for exponential power delay profile according to one embodiment of the invention.

FIG. 15 compares the performance of the space-time block chip-level equalizer receivers for half system load (K=5), an exponential power delay profile with a decay factor of 3 dB, a block length of B=60, a relative interference power of $P_i$=0 dB and a relative pilot power of $P_p$=0 dB. Compared to the curves in FIG. 11, the different CE receivers exhibit a marginal performance loss.

Figure 16:
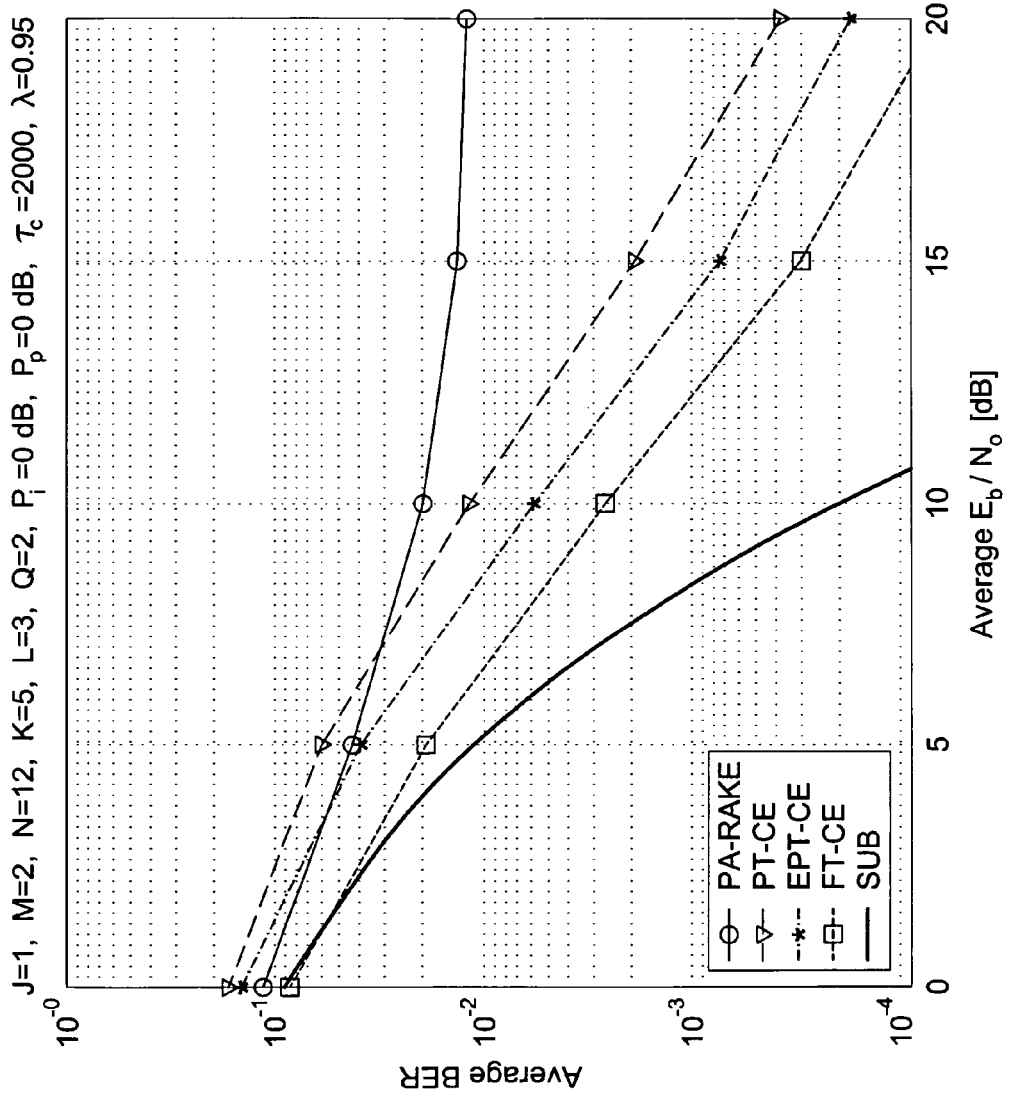
FIG. 16 illustrates a chart showing adaptive processing for half system load K=5 according to one embodiment of the invention.
Figure 17:
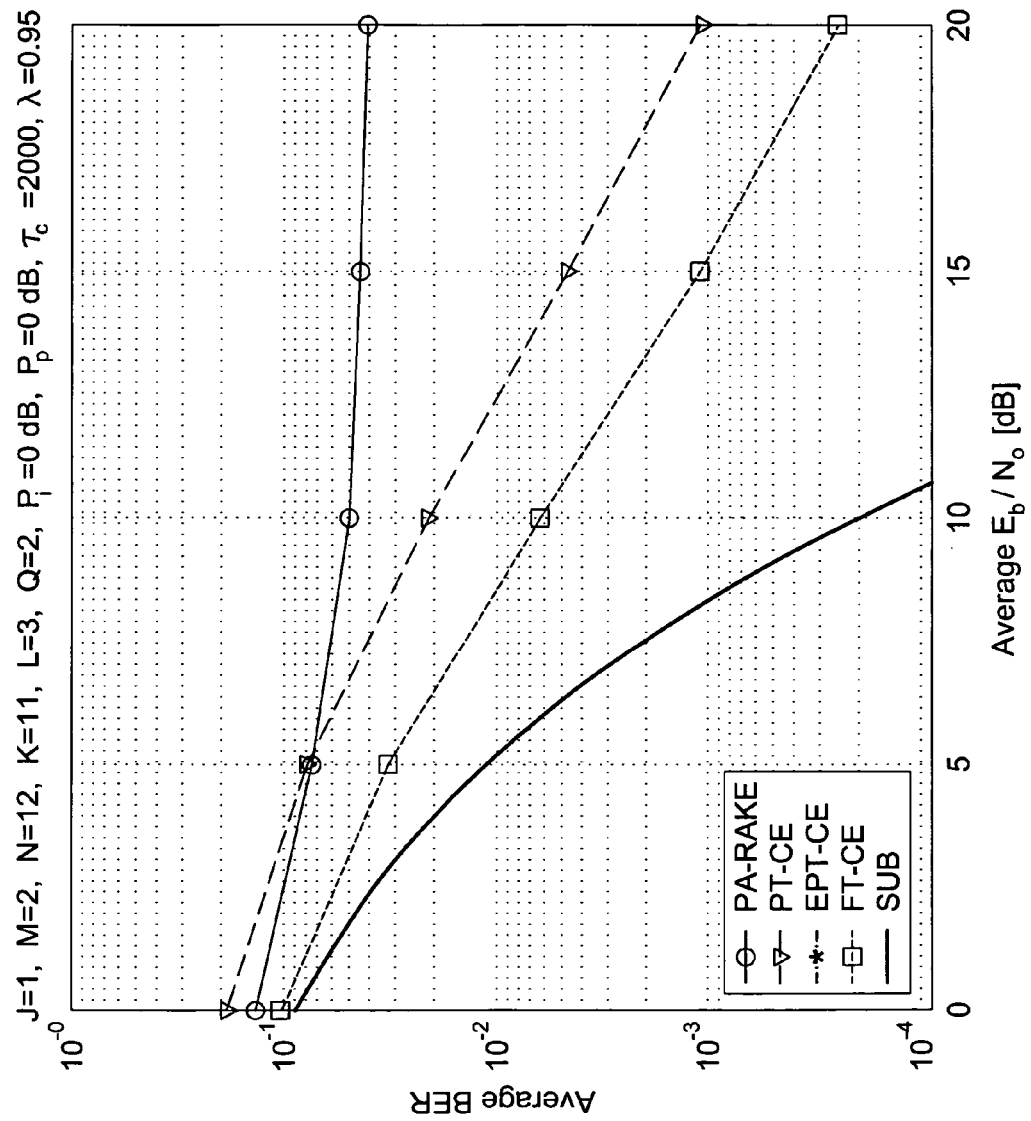
FIG. 17 illustrates a chart showing adaptive processing for full system load K=11 according to one embodiment of the invention.

G.4.b Adaptive processing. The simulations for the adaptive chip-level equalizer receivers are performed for the downlink of a WCDMA system with J=1 active base-station, $K_j$=K equal power users, QPSK data modulation, real orthogonal Walsh-Hadamard spreading codes of length N=12 along with a random overlay code for scrambling whose period measures ρ=10 symbols. The mobile station is equipped with the minimum number of receive antennas for chip rate sampling M=J+1=2 to simultaneously track J=1 base-station. The base-station's time-varying vector channel with order $L_j$=L=3 has M(L+1)=8 Rayleigh distributed channel taps of equal average power with the classical Jakes spectrum and a normalized coherence time of $\tau_c$=2000 symbols. FIGS. 16 and 17 compare the performance of the pilot-aided adaptive RAKE receiver (PA-RAKE) with weighting factor α=½ the pilot-trained (PT-CE), the enhanced pilot-trained (EPT-CE) and the fully-trained (FT-CE) adaptive chip-level equalizer receiver for half respectively full system load. The temporal smoothing factor Q+1 is chosen in correspondence with Equation 9 to be Q+1=JL=3. The optimal value of the RLS forget factor proved to be λ=0.95, corresponding to a data memory $$\frac{1}{1-\lambda}$$

being $$\frac{1}{100}$$

of the normalized coherence time $\tau_c$. Also shown in the figures is the single-user bound (SUB) which is the theoretical BER-curve of QPSK with M(L+1)-th order diversity in Rayleigh fading channels [27].

For half system load, shown in FIG. 16, the EPT-CE outperforms the PT-CE by 2.9 dB and suffers a 1.9 dB loss compared to the FT-CE at a BER of $10^{-3}$. The PA-RAKE exhibits an error floor at a BER of $10^{-2}$.

For full system load, shown in FIG. 17, the PT-CE and the EPT-CE have exactly the same performance and suffer a 5 dB loss compared to the FT-CE at a BER of $10^{-3}$. The PA-RAKE exhibits an error floor at a BER of $4 \cdot 10^{-2}$.

G.5 Conclusion

In this paper, we proposed new pilot-trained and enhanced pilot-trained space-time chip-level equalizer receivers for the downlink of WCDMA systems with a continuous code-multiplexed pilot. With $MS_tS_p$=J+1 diversity channels at the mobile station, the proposed receivers can simultaneously track J active base-station signals in soft handover mode. These diversity channels can be obtained by either M-fold space diversity, $S_t$-fold temporal oversampling, $S_p$-fold polarization diversity or a combination of the three above mentioned techniques. For instance, with a temporal oversampling factor of $S_t$=2 and $S_p$=2-fold polarization diversity at the receiver, we obtain $MS_tS_p$=4 (good for soft handover between J=3 base-stations) with only M=1 receive antenna at the mobile station. For both receivers a Least Squares algorithm for block processing and a QRD-based Recursive Least Squares algorithm for adaptive processing has been derived. The proposed receivers are compared with the conventional pilot-aided space-time RAKE receiver and the ideal fully-trained space-time chip-level equalizer receiver both in terms of performance and complexity.

For full system load, the pilot-trained and the enhanced pilot-trained receiver have exactly the same performance. However, for low to medium system load, the enhanced pilot-trained receiver outperforms the pilot-trained receiver and its performance comes close to that of the ideal fully-trained receiver. Moreover, the enhanced pilot-trained chip-level equalizer can be viewed as a semi-blind chip equalizer, since its cost function can be written as the sum of a training-based term and a fully-blind term.

The Least Squares block processing algorithms on the one hand, detect blocks of B symbols at once. For large block lengths B→∞, the performance of both the pilot-trained and the enhanced pilot-trained block chip equalizer receiver converges to the performance of the fully-trained block chip equalizer receiver. Conversely, the performance gain of the enhanced pilot-trained block chip-level equalizer receiver compared to the pilot-trained block chip-level equalizer receiver increases for decreasing block lengths B. Both receivers can deal with a severe near/far situation caused by the power control in the downlink. Moreover they are robust against both channel order over- and underestimation and they can cope with channels with a head or tail approaching zero.

The QRD-based Recursive Least Squares adaptive processing algorithms on the other hand, that detect symbol by symbol, are easily derived from their corresponding block processing algorithm. Both the pilot-trained and the enhanced pilot-trained adaptive chip-level equalizer receiver can track time-varying multi-path channels. The pilot-trained adaptive chip-level equalizer receiver outperforms the pilot-aided adaptive RAKE receiver at medium to high SNR per bit while the enhanced pilot-trained adaptive chip-level equalizer receiver always outperforms the pilot-aided adaptive RAKE receiver. Both the pilot-trained and the enhanced pilot-trained chip-level equalizer receiver have linear complexity in the number of tracked base-stations J and quadratic complexity in the total number of equalizer coefficients $QMS_tS_p$. Whereas the pilot-trained receiver has only linear complexity in the spreading factor N, the enhanced pilot-trained receiver has quadratic complexity in the spreading factor N. In fact, the enhanced pilot-trained adaptive chip-level equalizer receiver exhibits a N times higher complexity than the regular pilot-trained adaptive chip-level equalizer receiver.

We can conclude that the enhanced pilot-trained space-time chip-level equalizer receiver is a promising receiver for future WCDMA terminals, from a performance as well as a complexity point of view.

H. Embodiment

H.1 WCDMA Forward Link Data Model

H.1.a Multi-channel framework. Let us consider the forward link of a single-cell WCDMA system with K active user terminals. The base-station transmits a synchronous code division multiplex, employing user specific orthogonal Walsh-Hadamard spreading codes and a base-station specific aperiodic scrambling code. The transmitted multi-user chip sequence consists of K user signals and a continuous pilot signal:

$$x[n] = \sum_{k=1}^{K} s_k[i]c_k + s_p[i]c_p[n] \qquad (46)$$

with $$i = \left\lfloor \frac{n}{N} \right\rfloor.$$

Each user's data symbol sequence $s_k[i]$ (pilot symbol sequence $s_p[i]$) is spread by a factor N with the user code sequence $c_k[n]$ (pilot code sequence $c_p[n]$). The k-th user aperiodic code sequence $c_k[n]$ (pilot code sequence $c_p[n]$) is the concatenation of the corresponding Walsh-Hadamard spreading code and the base-station specific aperiodic scrambling code.

Assume that the user terminal is equipped with M receive antennas and let $h_m(t)$ denote the continuous-time channel from the base-station to the m-th receive antenna, including the transmit and receive filters. By sampling the different received antenna signals at the chiprate $$Y_a = \begin{bmatrix} y[a] & y[a+1] & \ldots & y[a+BN-1] \\ \vdots & \vdots & & \vdots \\ y[a+Q] & y[a+Q+1] & \ldots & y[a+Q+BN-1] \end{bmatrix} \quad (48)$$

N/T, we obtain the following received vector sequence:

$$y[n] = [y_1[n] y_2[n] \ldots y_M[n]]^T$$

which can be written as:

$$y[n] = \sum_{n'=0}^{L} h[n'] x[n-n'] + e[n] \quad (47)$$

where e[n] is similarly defined as y[n] and h[n] is the discrete-time M×1 vector channel from the base-station to the M receive antennas, given by:

$$h[n] = [h_1[n] h_2[n] \ldots h_M[n]]^T$$

In this equation $$h_m[n] = h_m\left(n\frac{N}{T}\right)$$

is the discrete-time channel impulse response from the base-station to the m-th receive antenna. Note that we model h[n] as an M−1 FIR vector filter of order L.

H.1.b Data model for block processing. Let us now introduce the (Q+1)M×BN output matrix $Y_a$ (with Hankel structure), shown in equation VIII-I.1.b, where B is the block length, a is the processing delay and Q+1 is the temporal smoothing factor. This output matrix can be written as $$Y_a = \mathcal{H} X_a + E_a \quad (49)$$

where the noise matrix $E_a$ is similarly defined as $Y_a$ and $\mathcal{H}$ is the (Q+1)×r (r=L+Q+1) channel matrix (with Toeplitz structure). The r×BN input matrix $X_a$ (with Hankel structure) is given by:

$$X_a = [x_{a-L}^T \ldots x_{a+Q}^T]^T$$

with the transmitted multi-user chip sequence vector at delay a:

$$x_a = [x[a] x[a+1] \ldots x[a+BN-1]]$$

H.2 Semi-blind Chip Equalizer Receiver

In this section, we discuss a new semi-blind chip equalizer receiver, that exploits all code information on one hand and pilot symbol information on the other hand. This receiver is based on the fully blind chip equalizer receiver for the reverse link of WCDMA systems, presented in the second part of [28]. One algorithm for block processing and one for adaptive processing is derived.

H.2.a Block processing. The block processing algorithm for the semi-blind chip equalizer detects B data symbols at once. We can write the transmitted multi-user chip sequence at delay a=0 as follows:

$$x_0 = s_d C_d + s_p C_p \quad (50)$$

where $s_d$ is the 1×KB total transmitted data symbol vector $$s_d = [s_1 \ldots s_K]$$

and $s_k$ is the k-th user's 1×B transmitted data symbol vector:

$$s_k = [s_k[0] s_k[1] \ldots s_k[B-1]]$$

The transmitted pilot symbol vector $s_p$ is similarly defined as $s_k$. The KB×BN user code sequence matrix $C_d$ stacks the code sequence matrices of the individual users:

$$C_d = [C_1^T \ldots C_K^T]^T$$

where $C_k$ is the k-th user's B×BN code sequence matrix $$C_k = \begin{bmatrix} c_k[0] & & \\ & \ddots & \\ & & c_k[B-1] \end{bmatrix}$$

and $c_k[i]$ is the k-th user's code sequence vector used to spread the data symbol $s_k[i]$:

$$c_k[i] = [c_k[iN] \ldots c_k[iN+N-1]]$$

The B×BN pilot code sequence matrix $C_p$ and the pilot code sequence vector $c_p[i]$ are similarly defined as $C_k$ respectively $c_k[i]$.

The vector $x_0$ is a row of every input matrix from the set $\{X_a\}_{a=-Q}^{L}$ and is therefore 'contained' in every output matrix from the set $\{X_a\}_{a=-Q}^{L}$. The semi-blind block processing problem addressed here is to compute the desired user's data symbol sequence $s_1$ (we assume the first user to be the user of interest) from $Y_a$, with $-Q \le a \le L$, based on the knowledge of the user code sequence matrix $C_d$, the pilot code sequence matrix $C_p$ and the pilot symbol vector $s_p$. In order to solve this problem we make the following rather standard assumptions:

Assumption 3: The channel matrix $\mathcal{H}$ has full column rank r.

Assumption 4: The input matrix $X_a$ has full row rank r.

The first assumption requires that:

$$(Q+1)(M-1) \ge L$$

Therefore the number of antennas should be at least M=2. The second assumption, on the other hand, requires that:

$$BN \ge r$$

Let us first, for the sake of clarity, assume there is no additive noise present in $Y_a$ ($-Q \le a \le L$). Because of assumptions 5 and 6, the rows of $Y_a$ span the row space of $X_a$. Hence, there exists a 1×(Q+1)M linear chip equalizer $f_a$, for which:

$$f_a Y_a - x_0 = 0$$

and this linear chip equalizer $f_a$ is a ZF linear chip equalizer with (Q+1) M−r degrees of freedom (hence, this linear chip equalizer is only unique when (Q+1)M−r). Using Equation 50 we can then write:

(51) $\quad f_a Y_a - s_d C_d - s_p C_p = 0$

In order to guarantee the uniqueness of the solution for $f_a, s_d$ up to a complex scaling factor, the matrix $[X_a^T - C_d^T - (s_p C_p)^T]^T$ should have at most a one-dimensional left null space. This leads to the following identifiability condition:

$$B(N-K) \geq r \quad (52)$$

Therefore the maximum number of users that can be supported is $K=N-1$.

Let us now assume that additive noise is present in $Y_a$ ($-Q \leq a \leq L$). We then solve the following Least Squares (LS) minimisation problem:

$$\overline{f}_a, \overline{s}_d = \underset{f_a, s_d}{\arg\min} \|f_a Y_a - s_d C_d - s_p C_p\|^2 \quad (53)$$

Since the LS cost function is a quadratic form in $f_a, s_d$, the minimisation can be done independently for $f_a$ and $s_d$. In order to obtain a direct semi-blind equalizer estimation, we first solve for $s_d$, assuming $f_a$ to be known and fixed. The LS solution for $s_d$ can be simplified to:

$$\overline{s}_d = f_a Y_a C_d^H \quad (54)$$

because $C_d C_d^H = I_{KB}$ and $C_p C_d^H = 0_{B \times KB}$ due to the orthogonality of the user code sequences and the pilot code sequence at each symbol instant. Substituting $\overline{s}_d$ into the original LS problem (see Equation 53) leads to a modified LS problem in $f_a$:

$$\overline{f}_a = \underset{f_a}{\arg\min} \|f_a Y_a (I_{BN} - C_d^H C_d) - s_p C_p\|^2 \quad (55)$$

which can be interpreted as follows. The equalized signal $f_a Y_a$ is projected on the orthogonal complement of the space spanned by the user code sequences. Furthermore, the projected equalized signal $f_a Y_a (I_{BN} - C_d^H C_d)$ should be as close as possible to the transmitted pilot chip sequence $s_p C_p$ in a Least Squares sense. Eventually, the LS solution for $f_a$ can be written as:

$$\overline{f}_a = s_p C_p Y_a^H \{Y_a (I_{BN} - C_d^H C_d) Y_a^H\}^{-1} \quad (56)$$

H.2.b Adaptive processing. In this subsection, we derive a Square-Root Information (SRI) RLS type of adaptive algorithm for the semi-blind chip equalizer. By having a closer look at $$\begin{bmatrix} R_a[i] & 0_{(Q+1)M \times 1} & 0_{(Q+1)M \times (N-1)} \\ z_a[i] & * & 0_{1 \times (N-1)} \end{bmatrix} \leftarrow \begin{bmatrix} \lambda R_a[i-1] & Y_a[i] \tilde{C}_d[i] \\ \lambda z_a[i-1] & s_p[i] c_p[i] \end{bmatrix} \cdot T_a[i] \quad (57)$$

Equation 55, we notice that each new incoming $(Q+1)M \times N$ output matrix block $Y_a[i]$ is first projected on the orthogonal complement of the space spanned by the user code sequences, by using the projection matrix $\tilde{C}_d[i]$:

$$\tilde{C}_d[i] = I_N - \sum_{k=1}^{K} c_k[i]^H c_k[i]$$

The new projected output matrix block $Y_a[i]\tilde{C}_d[i]$ is then used together with the new transmitted pilot chip sequence vector $s_p[i] c_p[i]$ in a QRD-updating step, shown in Equation 57. In this equation, $\lambda$ is the forget factor, that should be chosen in correspondence with the coherence time of the time-varying channel. The QRD-updating step tracks a lower-triangular factor $R_a[i]$ and a corresponding right-hand side $z_a[i]$. The new value for the semi-blind chip equalizer $f_a[i]$ then follows from the backward substitution step:

$$f_a[i] \cdot R_a[i] = z_a[i] \quad (58)$$

H.3 Training-based Chip Equalizer Receiver

In this section, we discuss a training-based chip equalizer receiver [25], that exploits (besides the desired user's code information) only pilot code information on one hand and pilot symbol information on the other hand. Again, one algorithm for block processing and one for adaptive processing is derived.

H-3.a Block processing. The block processing algorithm for the training-based chip equalizer, that detects B data symbols at once, can again be formulated as a LS minimisation problem:

$$\overline{g}_a = \underset{g_a}{\arg\min} \|g_a Y_a C_p^H - s_p\|^2 \quad (59)$$

which can be interpreted as follows. The equalized signal $g_a Y_a$ is despread with the pilot code sequence matrix $C_p$. The equalized signal after despreading $g_a Y_a C_p^H$ should then be as close $$\begin{bmatrix} \hat{R}_a[i] & 0_{(Q+1)M \times 1} \\ \hat{z}_a[i] & \star \end{bmatrix} \leftarrow \begin{bmatrix} \lambda \hat{R}_a[i-1] & Y_a[i] c_p[i]^H \\ \lambda \hat{z}_a[i-1] & s_p[i] \end{bmatrix} \cdot \hat{T}_a[i] \quad (62)$$

as possible to the transmitted pilot symbol vector $s_p$ in a Least Squares sense. The LS solution for $g_a$ can be written as:

$$\overline{g}_a = s_p C_p Y_a^H \{Y_a (C_p^H C_p) Y_a^H\}^{-1} \quad (60)$$

In order to guarantee the uniqueness of the solution for & up to a complex scaling factor, the matrix $[(X_a C_p^H)^T - s_p^T]^T$ should have at most a one-dimensional left null space. This leads to the following identifiability condition:

$$B \geq r \quad (61)$$

Note that when $K=N-1$, $I_{BN} - C_d^H C_d = C_p^H C_p$. This means that for a fully loaded system ($K=N-1$) the semi-blind method is exactly the same as the training-based method. This is also indicated by the identifiability conditions 52 and 61.

H.3.b Adaptive processing. In this subsection, we derive an SRI-RLS type of adaptive algorithm for the training-based chip equalizer. By having a closer look at Equation 59, we notice that each new incoming $(Q+1)M \times N$ output matrix block $Y_a[i]$ is first despread with the pilot code sequence vector $c_p[i]$. The new despread output matrix block $Y_a[i] c_p[i]^H$ is then used together with the new pilot symbol $s_p[i]$ in a QRD-updating step, shown in Equation 62. In this equation $\lambda$ is again the forget factor. The QRD-updating step tracks a lower-triangular factor $\hat{R}_a[i]$ and a corresponding right-hand side $\hat{z}_a[i]$. The new value for the training-based chip equalizer $g_a[i]$ then follows from the backward substitution step:

$$g_a[i] \cdot \hat{R}_a[i] = \hat{z}_a[i] \quad (63)$$

H.4 Conclusion

We have developed new training-based and semi-blind space-time chip equalizer receivers for the forward link of WCDMA systems employing a continous code-multiplexed pilot. The proposed receivers can track fast fading multipath channels and outperform the conventional RAKE receiver with perfect channel knowledge. For full system load, the training-based and the semi-blind approach have exactly the same performance. However, for low to medium system load, the semi-blind approach outperforms the training-based approach.

I. Embodiment

I.1 WCDMA Forward Link Data Model

I.1.a Multi-channel framework. Let us consider the forward link of a single-cell WCDMA system with K active user terminals. The base-station transmits a synchronous code division multiplex, employing user specific orthogonal Walsh-Hadamard spreading codes and a base-station specific aperiodic scrambling code. The transmitted multi-user chip sequence can then be written as:

$$x[n] = \sum_{k=1}^{K} s_k[i] c_k[n \bmod \rho N] \quad (64)$$

with $$i = \left\lfloor \frac{n}{N} \right\rfloor.$$

Each user's symbol sequence is transmitted in blocks of B=P+D symbols, where the first P symbols are known pilot symbols and the final D symbols are unknown data symbols. The pilot symbols correspond to the Dedicated Physical Control CHannel (DPCCH) whereas the data symbols correspond to the Dedicated Physical Data CHannel (DPDCH) in the UTRA specification for 3G mobile communications [11]. Each user's symbol sequence $s_k[i]$ is spread by a factor N with the length-$\rho N$ user code sequence $c_k[n]$. The k-th user aperiodic code sequence is the multiplication of the user specific Walsh-Hadamard spreading code and the base-station specific aperiodic scrambling code.

We assume that the user terminal is equipped with M receive antennas. The received antenna signals are sampled at the chiprate $$\frac{1}{T_c}$$

and the obtained samples are stacked in the M×1 received vector sequence $y[n]=[y_1[n]\ y_2[n]\ \ldots\ y_M[n]]^T$, which can be written as:

$$y[n] = \sum_{n'=0}^{L} h[n'] x[n-n'] + e[n] \quad (65)$$

where e[n] is the M×1 received noise vector sequence and $h[n]=[h_1[n]\ h_2[n]\ \ldots\ h_M[n]]^T$ is the M×1 discrete-time vector channel from the basestation to the M receive antennas. Note that we model h[n] as an M×1 FIR vector filter of order L.

I.1.b Data model for block processing. Let us now introduce the following (Q+1)M×BN output matrix $Y_a$ (with Hankel structure):

$$Y_a = \begin{bmatrix} y[a] & \ldots & y[a+BN-1] \\ \vdots & & \vdots \\ y[a+Q] & \ldots & y[a+Q+BN-1] \end{bmatrix}$$

where B is the block length, a is the processing delay and Q+1 is the temporal smoothing factor. This output matrix can be written as:

$$Y_a = \mathcal{H} X_a + E_a \quad (66)$$

where the noise matrix $E_a$ is similarly defined as $Y_a$, the (Q+1)M×r channel matrix $\mathcal{H}$ (with block Toeplitz structure) is given by:

$$\mathcal{H} = \begin{bmatrix} h[L] & \ldots & h[0] & 0 & \ldots & 0 \\ 0 & h[L] & \ldots & h[0] & \ldots & 0 \\ & & \ddots & & \ddots & \\ 0 & \ldots & 0 & h[L] & \ldots & h[0] \end{bmatrix}$$

and the r×BN input matrix $X_a$ (with Hankel structure) is defined by:

$$X_a = [x_{a-L}^T \ldots x_{a+Q}^T]^T$$

with the transmitted multi-user chip sequence vector $x_a$, starting at delay a, given by:

$$x_a[x[a]\ x[a+1]\ \ldots\ x[a+BN-1]] \quad (67)$$

r=L+1+Q is called the system order. In order to guarantee the existence of Zero-Forcing (ZF) chip equalizers, we make the following rather standard assumptions about the data model:

Assumption 5: The channel matrix $\mathcal{H}$ has full column rank r.

Assumption 6: The input matrix $X_a$ has full row rank r.

The first assumption requires that:

$$(Q+1)(M-1) \geq L \quad (68)$$

which states that the number of receive antennas should be at least M=2 and correspondingly the temporal smoothing factor Q+1 should be at least the channel order L. The second assumption requires that:

$$BN \geq r \quad (69)$$

which states that the number of observed chip samples BN should be larger than the system order r.

I.2 Space-time Block Chip Equalizer Receivers

In this section we develop a DPCCH-trained and an enhanced DPCCH-trained chip equalizer receiver for the mobile user terminal that can detect the desired user's data symbols from the received base-station signal. Both chip equalizer receivers consist of a linear space-time chip equalizer followed by a correlator. The space-time chip equalizer tries to restore the transmitted multi-user chip sequence by linearly combining the discrete-time signals from the different receive antennas. The correlator descrambles and despreads the equalized signal with the desired user's aperiodic code sequence and generates the soft decisions about the desired user's data symbols. These soft decisions are then input to a decision device that generates the final hard decisions.

The DPCCH-trained and the enhanced DPCCH-trained chip equalizer receivers differ in the amount of a-priori information they assume to determine their equalizer coefficients. In the following, we will describe for both receivers a Least Squares (LS) block processing algorithm, that addresses a block of B symbols at once.

I.2.a Preliminary definitions. The transmitted multi-user chip sequence vector $x_0$, starting at delay $\alpha=0$, consists of two parts: a first part corresponding to the known pilot symbols of the DPCCH and a second part corresponding to the unknown data symbols of the DPDCH. Using Equation 1 and 67, we can write the 1×BN transmitted multi-user chip sequence vector $x_0$ as follows:

$$x_0 = s_p C_p + s_d C_d \quad (70)$$

where $s_p$ is the 1×KP total pilot symbol vector that stacks the pilot symbol vectors of the different active users:

$$s_p = [s_{p,1} \ldots s_{p,K}]$$

and $s_{p,k}$ is the 1×P pilot symbol vector that stacks the pilot symbols of the k-th user:

$$s_{p,k} = [s_k[0] s_k[1] \ldots s_k[P-1]]$$

The 1×KD total data symbol vector $s_d$ and the 1×D data symbol vector of the k-th user $s_{d,k}$ are similarly defined as $s_p$ respectively $s_{p,k}$. The KP×BN total pilot code sequence matrix $C_p$ stacks the pilot code sequence matrices of the different active users:

$$C_p = [C_{p,1}{}^T \ldots C_{p,K}{}^T]^T$$

where $C_{p,k}$ is the P×BN pilot code sequence matrix of the k-th user:

$$C_{p,k} = [\overline{C}_{p,k} | 0_{P \times DN}]$$

and $\overline{C}_{p,k}$ is the P×PN effective pilot code sequence matrix of the k-th user that stacks the k-th user's code sequence vectors used to spread its pilot symbols:

$$\overline{C}_{p,k} = \begin{bmatrix} c_k[0] & & \\ & \ddots & \\ & & c_k[P-1] \end{bmatrix}$$

The 1×N code sequence vector of the k-th user $c_k[i]$ is used to spread the data symbol $s_k[i]$:

$$c_k[i] = [c_k[(i \bmod \rho)N] \ldots c_k[(i \bmod \rho)N+N-1]]$$

The KP×PN total effective pilot code sequence matrix $\overline{C}_p$ stacks the effective pilot code sequence matrices of the different active users:

$$\overline{C}_p = [\overline{C}_{p,1}{}^T \ldots \overline{C}_{p,K}{}^T]^T$$

The KD×BN total data code sequence matrix $C_d$ and the D×BN data code sequence matrix of the k-th user $C_{d,k}$ are similarly defined as $C_p$ respectively $C_{p,k}$. The D×DN effective data code sequence matrix of the k-th user $\overline{C}_{d,k}$ and the KD×DN total effective data code sequence matrix $\overline{C}_d$ are similarly defined as $\overline{C}_{p,k}$ respectively $\overline{C}_p$.

The vector $x_0$ is a row of every input matrix from the set $\{X_a\}_{a=-Q}{}^L$ and is therefore contained in every output matrix from the set $\{Y_a\}_{a=-Q}{}^L$. Note that the output matrix $Y_a$ can also be partitioned into two parts:

$$Y_a = [Y_{p,a} Y_{d,a}]$$

where the (Q+1)M×PN pilot part $Y_{p,a}$ corresponds to the DPCCH and the (Q+1)M×DN data part $Y_{d,a}$ corresponds to the DPDCH.

I.2.b DPCCH-trained block chip equalizer receiver. The DPCCH-trained block chip equalizer receiver estimates the desired user's data symbol vector $s_{d,k}$ (we assume the desired user to be the k-th user of the basestation multiplex) from $Y_a$, with $-Q \leq a \leq L$, based on the knowledge of the desired user's data code sequence matrix $C_{d,k}$, the desired user's pilot code sequence matrix $C_{p,k}$ and the desired user's pilot symbol vector $s_{p,k}$.

We assume first, for the sake of clarity, there is no additive noise present in $Y_a (-Q \leq a \leq L)$. Because of assumptions 5 and 6, the rows of $Y_a$ span the row space of $X_a$. Hence, there exists a 1×(Q+1)M linear DPCCH-trained chip equalizer $g_a$, for which:

$$g_a Y_a - x_0 = 0$$

where $g_a$ is a ZF linear chip equalizer with (Q+1)M−r degrees of freedom. By despreading the above equation with the desired user's pilot code sequence matrix $C_{p,k}$ and by using Equation 70 we can then write:

$$g_a Y_a C_{p,k}{}^H - s_{p,k} = 0 \quad (71)$$

because of the orthogonality between the data code sequence matrices $C_{d,k}$ (k=1 ... K) and the pilot code sequence matrices $C_{p,k}$ (k=1 ... K) of the different active users.

Let us now assume that additive noise is present in $Y_a(-Q \leq a \leq L)$. We then solve the following Least Squares (LS) minimisation problem:

$$\overline{g}_a = \underset{g_a}{\operatorname{argmin}} \| g_a Y_a C_{p,k}^H - s_{p,k} \|^2 \quad (72)$$

which can be interpreted as follows. The equalized signal $g_a Y_a$ is first despread with the desired user's pilot code sequence matrix $C_{p,k}$. The equalized signal after despreading $g_a Y_a C_{p,k}{}^H$ should then be as close as possible to the desired user's known pilot symbol vector $s_{p,k}$ in a Least Squares sense.

It is easy to prove that the LS problem in Equation 72 can be rewritten as follows:

$$\bar{g}_a = \underset{g_a}{\arg\min} \left\| g_a Y_{p,a} \bar{C}_{p,k}^H - s_{p,k} \right\|^2 \quad (73)$$

showing that the DPCCH-trained LS problem only exploits the pilot part $Y_{p,a}$ of the output matrix $Y_a$.

The LS solution for $g_a$ can be written as:

$$\bar{g}_a = s_{p,k} C_{p,k} Y_a^H \{ Y_a (C_{p,k}^H C_{p,k}) Y_a^H \}^{-1} \quad (74)$$

The obtained LS DPCCH-trained chip equalizer $\bar{g}_a$ may subsequently be used to extract the 1×D desired user's vector of soft symbol decisions $\bar{s}_{d,k}$:

$$\bar{s}_{d,k} = \bar{g}_a Y_a C_{d,k}^H \quad (75)$$

Finally, the soft decisions $\bar{s}_{d,k}$ are fed into a decision device that determines the nearest constellation point. This results in the hard decisions $\hat{s}_{d,k}$.

I.2.c Enhanced DPCCH-trained block chip equalizer receiver. The enhanced DPCCH-trained block chip equalizer receiver estimates the desired user's data symbol vector $s_{d,k}$ from $Y_a$, with $-Q \leq a \leq L$, based on the knowledge of the total data code sequence matrix $C_d$, the total pilot code sequence matrix $C_p$ and the total pilot symbol vector $s_p$.

We assume first, for the sake of clarity, there is no additive noise present in $Y_a (-Q \leq a \leq L)$. Because of assumptions 5 and 6, the rows of $Y_a$ span the row space of $X_a$. Hence, there exists a $1 \times (Q+1)M$ linear enhanced DPCCH-trained chip equalizer $f_a$, for which:

$$f_a Y_a - x_0 = 0$$

where $f_a$ is a ZF linear chip equalizer with $(Q+1)M - r$ degrees of freedom. Using Equation 70 we can then write:

$$f_a Y_a - s_d C_d - s_p C_p = 0 \quad (76)$$

Let us now assume that additive noise is present in $Y_a (-Q \leq a \leq L)$. We then solve the following Least Squares (LS) minimisation problem:

$$\bar{f}_a, \bar{s}_d = \underset{f_a, s_d}{\arg\min} \| f_a Y_a - s_d C_d - s_p C_p \|^2 \quad (77)$$

Since the LS cost function is a quadratic form in $f_a, s_d$, the minimisation can be done independently for $f_a$ and $s_d$. In order to obtain a direct equalizer estimation, we first solve for $s_d$, assuming $f_a$ to be known and fixed. The LS solution for $s_d$ can be simplified to:

$$\bar{s}_d = f_a Y_a C_d^H \quad (78)$$

because of the orthogonality between the data code sequence matrices $C_{d,k}(k=1 \ldots K)$ and the pilot code sequence matrices $C_{p,k}(k=1 \ldots K)$ of the different active users. Substituting $\bar{s}_d$ into the original LS problem of Equation 77, leads to a modified LS problem in $f_a$:

$$\bar{f}_a = \underset{f_a}{\arg\min} \| f_a Y_a (I_{BN} - C_d^H C_d) - s_p C_p \|^2 \quad (79)$$

which can be interpreted as follows. The equalized signal $f_a Y_a$ is projected on the orthogonal complement of the subspace spanned by the total data code sequence matrix $C_d$. The equalized signal after projecting $f_a Y_a (I_{BN} - C_d^H C_d)$ should then be as close as possible to the known total pilot chip sequence vector $s_p C_p$ in a Least Squares sense.

It is easy to prove that the modified LS problem of Equation 79 can be rewritten as in Equation 80 (see the top of the next page) showing that the enhanced DPCCH-trained LS problem naturally decouples into two different parts: a fully-trained part and a fully-blind part. On the one hand, the fully-trained part (corresponding to the first term in Equation 80)

$$\bar{f}_a = \underset{f_a}{\arg\min} \{ \| f_a Y_{p,a} - s_p \bar{C}_p \|^2 + \| f_a Y_{d,a} (I_{DN} - \bar{C}_d^H \bar{C}_d) \|^2 \} \quad (80)$$

forces the equalized signal to be as close a possible (in a Least Squares sense) to the transmitted multi-user chip sequence during the training mode of the receiver. On the other hand, the fully-blind part (corresponding to the second term of Equation 80) projects the equalized signal on the orthogonal complement of the subspace spanned by the total effective data code sequence matrix during the blind mode of the receiver. Furthermore, the energy in the projected equalized signal should be as small as possible (in a Least Squares sense) which actually corresponds to a Minimum Output Energy (MOE) criterion. For this reason, the enhanced DPCCH-trained chip equalizer is actually a semi-blind chip equalizer.

The LS solution for $f_a$ can be written as:

$$\bar{f}_a = s_p C_p Y_a^H \{ Y_a (I_{BN} - C_d^H C_d) Y_a^H \}^{-} \quad (81)$$

The obtained LS enhanced DPCCH-trained chip equalizer $\bar{f}_a$ may subsequently be used to extract the 1×D desired user's vector of soft symbol decisions $\bar{s}_{d,k}$. Equation 75 remains valid if we replace $\bar{g}_a$ by $\bar{f}_a$.

I.3 Space-time Adaptive Chip Equalizer Receivers

In this section, we derive Square Root Information (SRI) Recursive Least Squares (RLS) type [24] of adaptive chip equalizer receivers from the corresponding LS block chip equalizer receivers. These receivers address a single symbol at once and consist of two parts: a DPCCH-aided updating part and a user specific detection part.

I.3.a DPCCH-trained adaptive chip equalizer receiver. The DPCCH-trained updating part can work in two modes: a training mode and a decision-directed mode. By having a closer look at the corresponding LS block processing algorithm in Equation 73, it is rather straightforward to derive an SRI-RLS type of adaptive processing algorithm. The $(Q+1)$ M×N new incoming output matrix block $Y_a[i]$ is first despread with the desired user's code sequence vector for the i-th symbol instant $c_k[i]$. The new despread output matrix block $Y_a[i] c_k^H[i]$ is then used together with the new desired user's pilot symbol $s_k[i]$ (during the training mode) or the new desired user's estimated data symbol $\hat{s}_k[i]$ (during the decision-directed mode) in a QRD-updating step [24]. The QRD-updating step tracks a $(Q+1)M \times (Q+1)M$ lower triangular factor $R_a[i]$ and a corresponding $1 \times (Q+1)M$ right-hand side $z_a[i]$. The new values for the equalizer coefficients then follow from the backsubstitution step:

$$g_a[i] \cdot R_a[i] = z_a[i] \quad (82)$$

I.3.b Enhanced DPCCH-trained adaptive chip equalizer receiver.

The enhanced DPCCH-trained updating part can also work in two modes: a training mode and a blind mode. By having a closer look at the corresponding LS block processing algorithm in Equation 80, it is rather straightforward to derive an SRI-RLS type of adaptive processing algorithm. During the training mode, the new incoming output matrix block $Y_a[i]$ is used together with the 1×N new multi-user chip sequence vector $x_0[i]$ in a QRD-updating step. During the blind mode, the new incoming output matrix block $Y_a.[i]$ is first projected on the orthogonal complement of the subspace spanned by the active user codes, using the N×N projection matrix $I_N - C_d^H[i]C_d[i]$. The new projected output matrix block is then used together with the 1×N zero vector $0_{1 \times N}$ in a QRD-updating step [24].

I.4 Simulation Results

The simulations are performed for the forward link of a WCDMA system with K active, equal power users, QPSK data modulation, real orthogonal Walsh-Hadamard spreading codes of length N=8 along with a random scrambling code whose period measures ρ=B symbols. The number of receive antennas M=2, the block length B=200 and the number of pilot symbols P=15. The vector channel with order L=3 has M(L+1)=8 Rayleigh distributed channel taps of equal average power. The temporal smoothing factor is chosen to be Q=L and the performance is averaged over 100 randomly generated channels.

Figure 18:
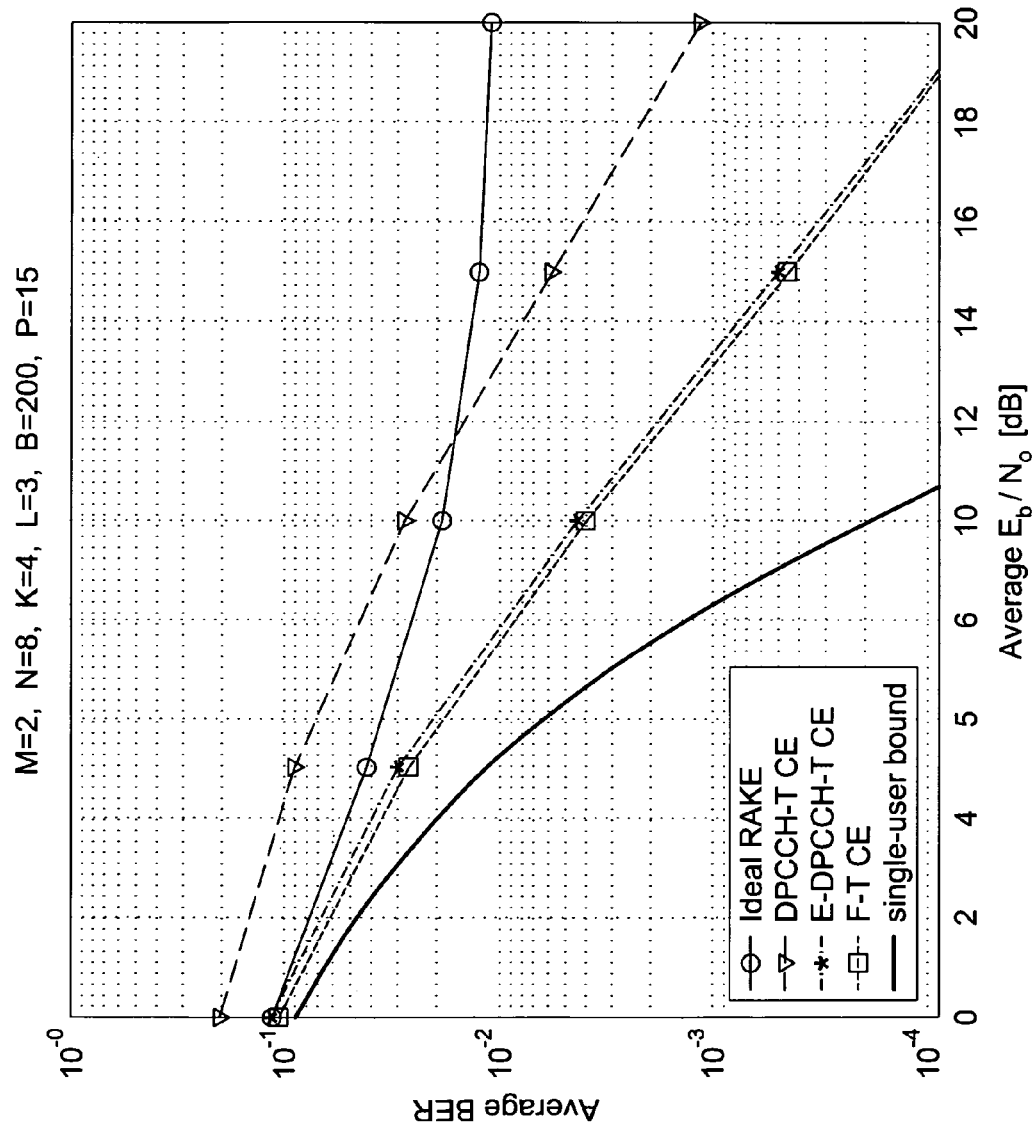
FIG. 18 illustrates a chart showing block processing algorithms for time-multiplexed pilot: J=1 base-station and half system load according to one embodiment of the invention.

FIG. 18 compares the average BER versus the average SNR per bit of the conventional RAKE receiver with perfect channel knowledge, the DPCCH-trained (DPCCH-T CE) and the enhanced DPCCH-trained chip equalizer (E-DPCCH-T CE) receiver for half system load (K=4). Also shown in the figure is the BER-curve of the ideal fully-trained chip equalizer (F-T CE) receiver that assumes knowledge of the total transmitted multi-user chip sequence and the theoretical BER-curve of QPSK with M(L+1)-th order diversity in Rayleigh fading channels (single-user bound) [27]. The ideal RAKE receiver clearly exhibits an error floor due to the MUI while both the DPCCH-T and the E-DPCCH-T CE receiver are near/far resistant. The E-DPCCH-T CE receiver realizes a 5 dB gain at a BER of $10^{-2}$ compared to the regular DPCCH-T CE receiver. Moreover, its performance nearly approaches that of the ideal F-T CE receiver.

Figure 19:
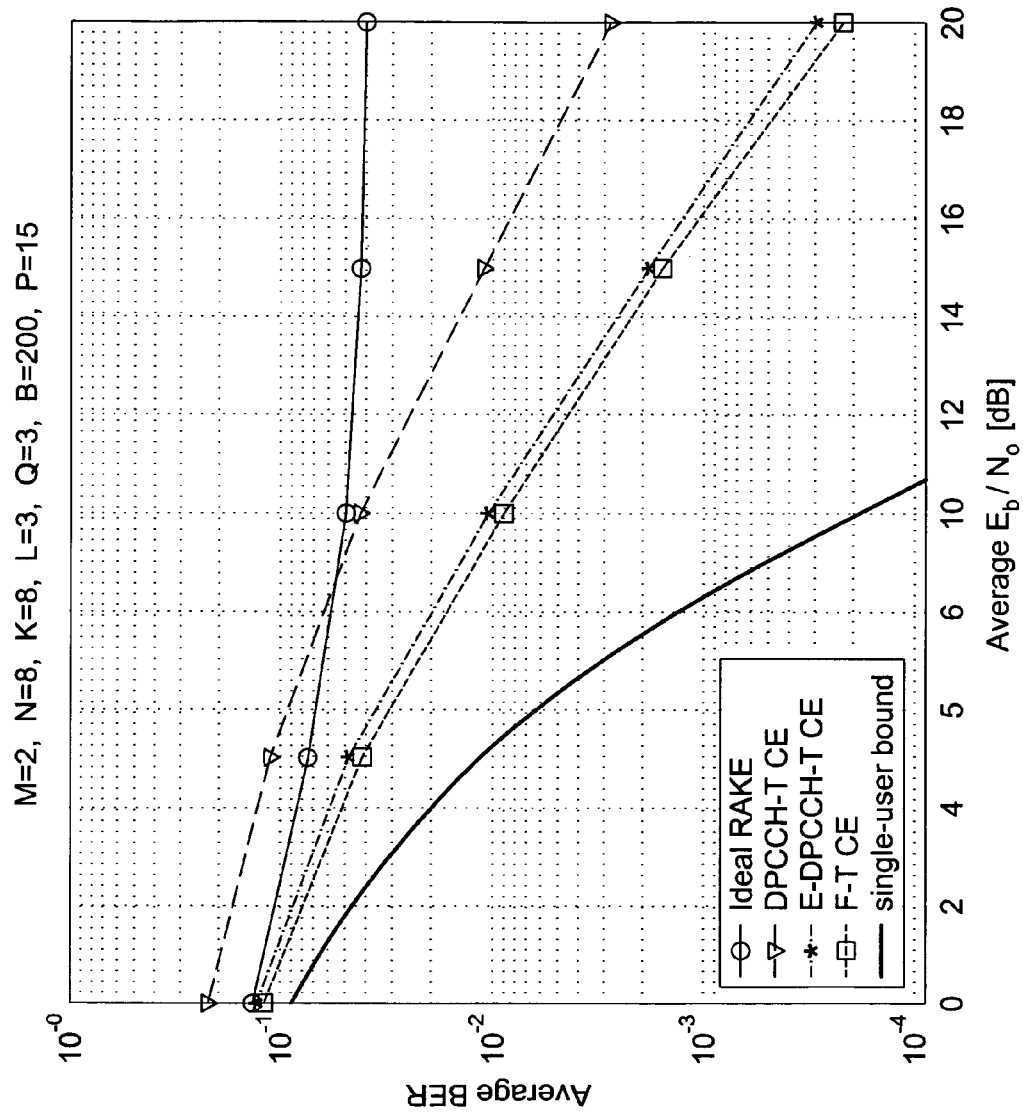
FIG. 19 illustrates a chart showing block processing algorithms for time-multiplexed pilot: J=1 base-station and full system load according to one embodiment of the invention.

FIG. 19 shows the same curves but now for a fully loaded system (K=8). Although the performance curves shift up due to the increased MUI, the formerly obtained conclusions remain valid.

I.5 Conclusion

In this paper, we proposed new DPCCH-trained and enhanced DPCCH-trained chip equalizer receivers for the forward link of WCDMA systems employing a time-multiplexed pilot. In reduced as well as full load settings, the enhanced DPCCH-trained receiver outperforms the regular DPCCH-trained receiver and comes close to the performance of the ideal fully-trained receiver.

The LS block chip equalizer receivers on the one hand, that detect B symbols at once, are suited for packet-switched type of communication. The performance gain of the enhanced DPCCH-trained receiver compared to the regular DPCCH-trained receiver increases for decreasing pilot length P. The RLS adaptive chip equalizer receivers on the other hand, that detect symbol by symbol, are suited for circuit-switched type of communication. They are able to track time-varying multipath channels and outperform the conventional RAKE receiver with perfect channel knowledge.

We can conclude that the enhanced DPCCH-trained chip equalizer receiver is a promising receiver for future WCDMA terminals, from a performance as well as complexity point of view.

J. Embodiment

J.1 Forward Link DS-CDMA Data Model

Let us consider the forward link of a single-cell DS-CDMA system. The base-station transmits a synchronous code division multiplex, employing user-specific orthogonal Walsh-Hadamard spreading codes and a site-specific aperiodic scrambling code. The transmitted multi-user chip sequence during the i-th symbol period consists of K user signals and a continuous pilot signal:

$$x[i,n] = \sum_{k=1}^{K} A_k \cdot b_k[i] \cdot c_k[i,n] + A_p \cdot b_p[i] \cdot c_p[i,n] \quad (83)$$

with $A_k$, $b_k[i]$, $c_k[i,n]$ and $A_p$, $b_p[i]$, $c_p[i,n]$ the amplitude, the transmitted bit and the aperiodic spreading code of user k respectively the pilot signal during the i-th symbol period. $c_k[i,n] = w_k[n] \cdot s[i,n]$ for n=0 ... N=1, with N the spreading factor, is the componentwise multiplication of the Walsh-Hadamard spreading code $w_k[n]$ and the aperiodic scrambling code $s[i,n]$. A similar equation also holds for the aperiodic spreading code of the pilot signal $c_p[i,n] = w_p[n] \cdot s[i,n]$. The total transmitted multi-user chip sequence is then the sum of different time-shifted versions of x[i,n]:

$$x[n] = \sum_{i} x[i, n - Ni] \quad (84)$$

The impulse response of the time-varying composite channel during the i-th symbol period, consisting of the low-pass transmit and receive filters and the actual propagation channel, can be modeled as follows:

$$h^{(i)}(t) = \sum_{m=0}^{M-1} h^{(i)}[m] \cdot \Psi_{RC}(t - \tau_m) \quad (85)$$

with M the number of paths in the propagation channel. $h^{(i)}[m]$ and $\tau_m$ are the time-varying complex channel gain respectively the delay of the m-th path. The composite chip waveform $\Psi_{RC}(t)$ includes both transmit and receive low-pass filters and has a raised-cosine spectrum.

The total received baseband signal at the mobile user terminal can be written as:

$$y(t) = \sum_{i} \sum_{n} x[i,n] \cdot h^{(i)}(t - (Ni+n)T_c) \eta(t) \quad (86)$$

$$H_q[i] = \begin{bmatrix} h_q[i,L] & h_q[i,L-1] & \cdots & h_q[i,0] & 0 & \cdots & 0 \\ 0 & h_q[i,L] & \cdots & h_q[i,1] & h_q[i,0] & \cdots & 0 \\ \vdots & \vdots & \ddots & \vdots & \ddots & \ddots & \vdots \\ 0 & \cdots & 0 & h_q[i,L] & \cdots & h_q[i,1] & h_q[i,0] \end{bmatrix} \quad (89)$$

where $\eta(t)$ is a zero-mean complex colored Gaussian noise process with power spectral density $\sigma^2$. The noise coloring is due to the receive low-pass filter. The signal $y(t)$ is now temporally oversampled at twice the chip-rate to obtain the first phase $y_1[n]=y(nT_c)$ respectively the second phase $$y_2[n] = y\left(\frac{T_c}{2} + nT_c\right)$$

of the oversampled received signal. These discrete-time signals correspond to the first phase $h_1[i,n]=h^{(i)}(nT_c)$ respectively the second phase $$h_2[i,n] = h^{(i)}\left(\frac{T_c}{2} + nT_c\right)$$

of the oversampled composite channel, that both have a channel order L.

We can now construct the (N+2F)-dimensional received signal vector for the first and the second phase, q=1 ... 2, during the i-th symbol period $y_q[i]=[y_q[iN-F] \ldots y_q[(i+1)N-1+F]]^T$, with 2F+1 the total length of the equivalent symbol-spaced equalizers. The total received signal vector during the i-th symbol period $y[i]=[y_1^T[i]\ y_2^T[i]]^T$ stacks the received signal vectors for both phases and relates to the (N+2F+L)-dimensional transmitted multi-user chip sequence vector $x[i]=[x[iN-F-L] \ldots x[(i+1)N-1+F]]^T$ through the following equation:

$$y[i] = \mathcal{H}[i]\cdot x[i]+\eta[i] \quad (87)$$

The total channel matrix $\mathcal{H}[i]$ stacks the channel matrices for the first respectively the second phase during the i-th symbol period:

$$\mathcal{H}[i] = \begin{bmatrix} H_1[i] \\ H_2[i] \end{bmatrix} \quad (88)$$

while $\eta[i]$ is the received noise vector during the i-th symbol period. $H_q[i]$, for q=1 ... 2 is a (N+2F)×(N+2F+L) Toeplitz-matrix, as shown in equation 89 on the next page.

Finally, the transmitted multi-user chip sequence vector relates to the transmitted bits through the following equation:

$$x[i]=C[i]\cdot A\cdot b[i] \quad (90)$$

The (3K+3)-dimensional bit vector b[i] contains the user and pilot transmitted bits during the i-th symbol period as well as the previous and the next symbol period. The (N+2F+L)×(3K+3) code matrix C[i] contains the aperiodic spreading codes corresponding to each of the transmitted bits while the (3K+3)-dimensional diagonal matrix A contains the amplitudes of the user signals and the pilot signal.

J.2 Adaptive Chip Equalizer Receiver

The proposed pilot-aided adaptive chip equalizer receiver is well-suited for implementation in a mobile user terminal, operating in fast fading multipath channels. By exploiting the presence of a continuous pilot signal in forthcoming third generation cellular and LEO satellite communication systems, it continuously updates at the symbol rate using a simple NLMS or a more advanced RLS adaptive scheme. The proposed receiver basically consists of two parts: a user-specific detection part and a pilot-aided updating part.

Figure 20:
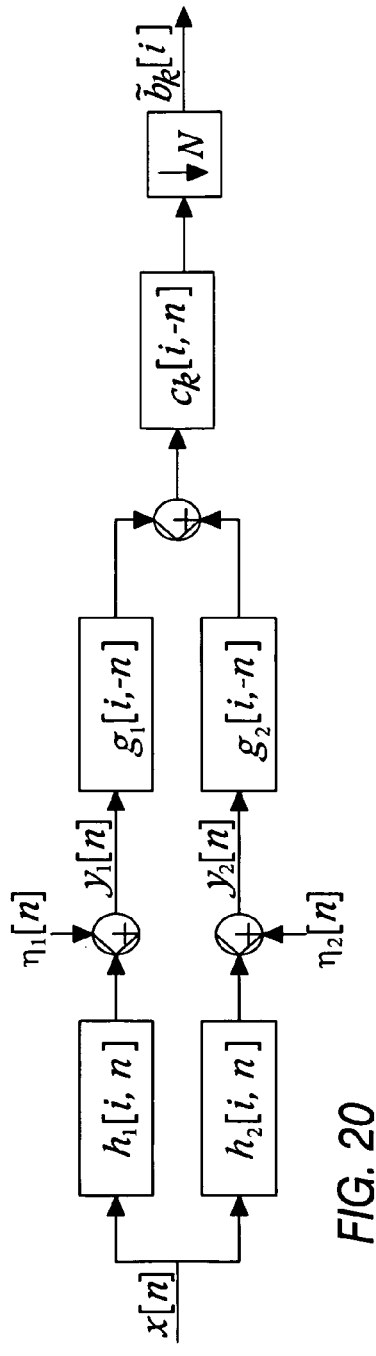
FIG. 20 illustrates a block diagram of a data model and user-specific detection part of pilot-aided adaptive chip equalizer receiver according to one embodiment of the invention.

J.2.a User-specific detection part. The user-specific detection part operates like the conventional chip equalizer receiver, as shown in FIG. 20. Initially, it uses for each symbol instant the corresponding equalizer coefficients, drawn from the pilot-aided updating part (see next subsection), to equalize the received signal. Finally, it descrambles and despreads the equalized signal with the aperiodic spreading code of the user of interest (user k) and makes a decision about the transmitted data symbol. Let $g_q^H[i]=[g_q[i,-F] \ldots g_q[i,0] \ldots g_q[i,+F]]$, for q=1 ... 2 denote the equalizer coefficient vector for the first respectively the second phase of the received signal during the i-th symbol period. The total equalizer coefficient vector $g^H[i]=g_1^H[i]\ g_2^H[i]]$ stacks the equalizer coefficient vectors for the first and the second phase. The soft estimate of the k-th user data symbol during the i-th symbol period can then $$G_q(i) = \begin{bmatrix} g_q[i,-F] & g_q[i,-F+1] & \cdots & g_p[i+F] & 0 & \cdots & 0 \\ 0 & g_q[i,-F] & \cdots & g_q[i+F-1] & g_p[i,+F] & \cdots & 0 \\ \vdots & \vdots & \ddots & \vdots & \ddots & \ddots & \vdots \\ 0 & \cdots & 0 & g_i[i,-F] & \cdots & g_q[i+F-1] & g_q[i,+F] \end{bmatrix} \quad (93)$$

be written as follows:

$$\overline{b}_k = c_k[i] \cdot G_1[i] \cdot y_1[i] + c_k[i] \cdot G_2[i] \cdot y_2[i] \quad (91)$$
$$= c_k[i] \cdot \mathcal{G}[i] \cdot y[i]$$

with $c_k[i]=[c_k[i,0] \ldots c_k[i, N-1]]$ the k-th user aperiodic spreading code vector. The total equalizer matrix $\mathcal{G}[i]$ simply stacks the equalizer matrices for both phases during the i-th symbol period:

$$\mathcal{G}[i]=[G_1[i]G_2[i]] \quad (92)$$

The equalizer matrix $G_q[i]$, with q=1 . . . 2 for the first respectively the second phase is a N×(N+2F) Toeplitz-matrix of the corresponding equalizer coefficient vector, as shown in equation 93. Note that the equalized signal is common to all codes that have been assigned to the mobile user terminal in a multi-code system, so a single equalizer suffices.

J.2.b Pilot-aided updating part. The updating part employs the pilot signal to adaptively update the equalizer coefficients at the symbol rate, as opposed to a classical chip equalizer that would be updated at the chip rate. The latter requires a continuous multi-user training chip sequence for fast fading channel conditions, which is impossible to realize in practice.

Figure 21:
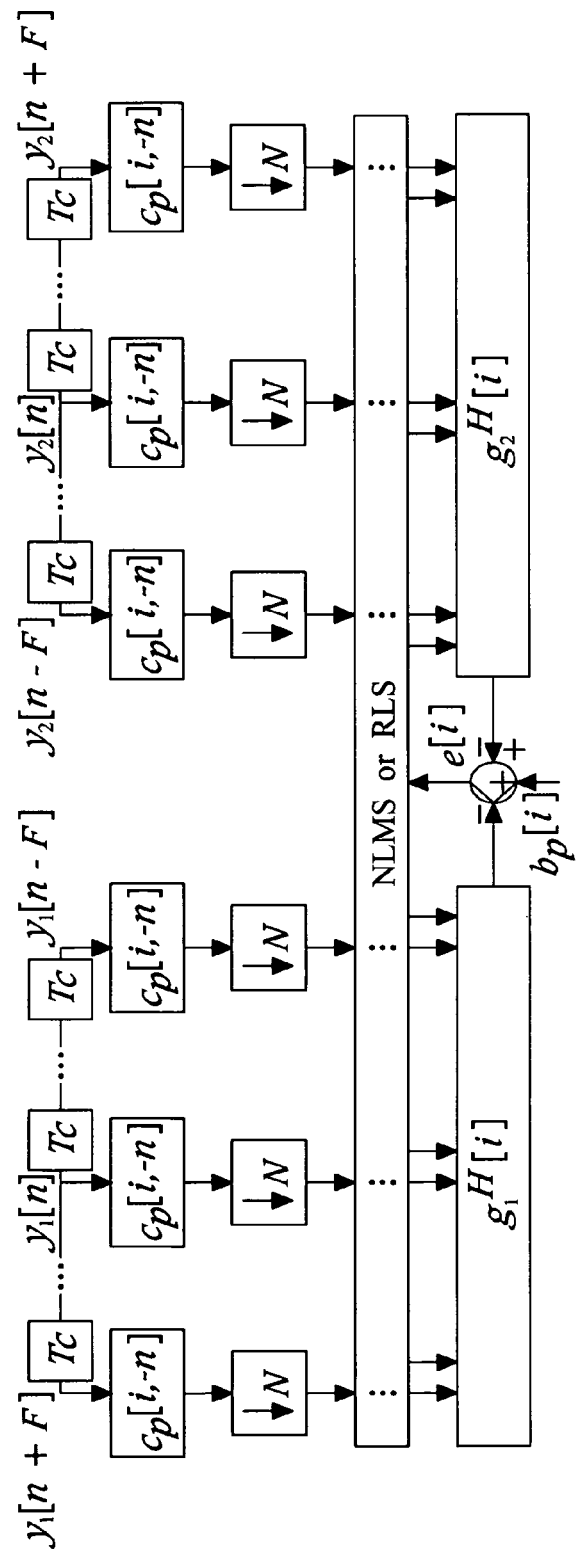
FIG. 21 illustrates a block diagram of a pilot-aided updating part of pilot-aided chip equalizer receiver according to one embodiment of the invention.

By reversing the order of the equalization and the descrambling/despreading for the pilot signal, one obtains an elegant adaptive scheme operating at the symbol rate, as shown in FIG. 21. Starting from the original equation 91, applied to the pilot signal, the soft estimate $$C_p[i] = \begin{bmatrix} c_p[i,0] & c_p[i,1] & \cdots & c_p[i,N-1] & 0 & \cdots & 0 \\ 0 & c_p[i,0] & \cdots & c_p[i,N-2] & c_p[i,N-1] & \cdots & 0 \\ \vdots & \vdots & \ddots & \vdots & \ddots & \ddots & \vdots \\ 0 & \cdots & 0 & c_p[i,0] & \cdots & c_p[i,N-2] & c_p[i,N-1] \end{bmatrix} \quad (95)$$

of the pilot symbol during the i-th symbol period can be written as:

$$\overline{b}_p[i] = g_1^H[i] \cdot C_p[i] \cdot y_1[i] + g_2^H[i] \cdot C_p[i] \cdot y_2[i] \quad (94)$$
$$= g^H[i] \cdot \begin{bmatrix} C_p[i] & 0 \\ 0 & C_p[i] \end{bmatrix} \cdot y[i]$$

with $C_p[i]$ the descrambling/despreading matrix for the pilot signal, being a (2F+1)×(N+2F) Toeplitz-matrix of the pilot's aperiodic spreading code vector $c_p[i]=[c_9[i,0] \ldots c_p[i, N-1]]$, as shown in equation 95. For a particular symbol the pilot's descrambling/despreading matrix provides 2F+1 correlation values for each phase (so 2·(2F+1) in total), with F the single-sided symbol-spaced equalizer length. These values are the correlator outputs at the correct symbol instant and F chip periods before and after the correct symbol instant. The total equalizer coefficient vector $g^H[i]$ (with 2·(2F+1) coefficients) coherently combines these correlation values to obtain an estimate of the transmitted pilot symbol. The optimal equalizer coefficients are determined iteratively by using a simple NLMS scheme or a more advanced RLS scheme [24].

J.3 Simulation Results

The simulations are performed for the forward link of a DS-CDMA system with K active, equal power users, BPSK data modulation, real orthogonal Walsh-Hadamard codes of length N=32 along with a Gold overlay code for scrambling. The period of the Gold overlay scrambling code measures 12 symbols or equivalently 384 chips. Both the first and second phase of the oversampled channel were modeled by L+1=2 (with L the channel order) independent time-varying Rayleigh-distributed channel taps of equal average power. The Symbol-Spaced (SS) Chip Equalizer (CE) receiver only uses the first phase while the Fractionally-Spaced (FS) Chip Equalizer (CE) receiver uses both phases of the received signal. The independence of the different channel taps of the different phases approximately corresponds to a roll-off factor $\alpha=1$.

Figure 22:
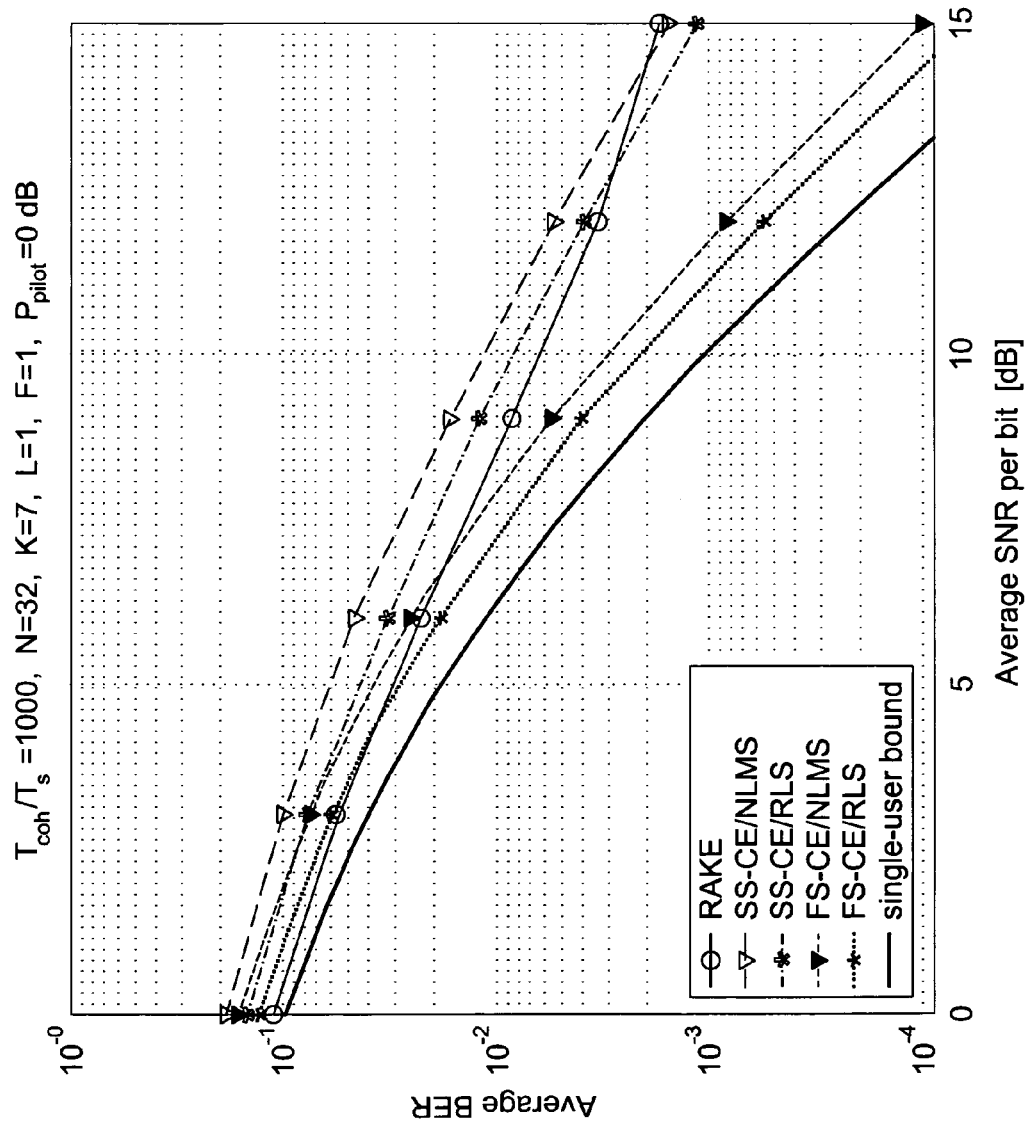
FIG. 22 illustrates a comparison chart of fractionally-spaced versus symbol-spaced adaptive chip equalizer receiver in quarter system load according to one embodiment of the invention.

FIG. 22 compares the average BER versus the average SNR per bit of the RAKE receiver with perfect channel knowledge, the SS-CE receiver and the FS-CE receiver with both NLMS and RLS updating for quarter system load (K=7). Also shown on the figure is the theoretical BEgR-urve of BPSK with 2·(L+1)-th order diversity in Rayleigh fading channels (single-user bound) [27]. The normalized Doppler-spread of the time-varying channel was $F_d \cdot T_S = 10^{-3}$, corresponding to a normalized coherence time $$\frac{T_{coh}}{T_S} = 1000.$$

The stepsize of the NLMS algorithm was optimally chosen to be μ=0.5. The optimal value of the RLS forgetting factor proved to be λ=0.9, corresponding to a data memory $$\frac{1}{1-\lambda}$$

being $$\frac{1}{100}$$

of the normalized coherence time. Only for rather high SNR per bit, the SS-CE achieves better performance than the RAKE receiver. The FS-CE with RLS updating outperforms the corresponding SS-CE by 4 dB for a BER of $10^{-3}$ and approaches the single-user bound. Performance of NLMS updating is within one dB of that of RLS updating.

Figure 23:
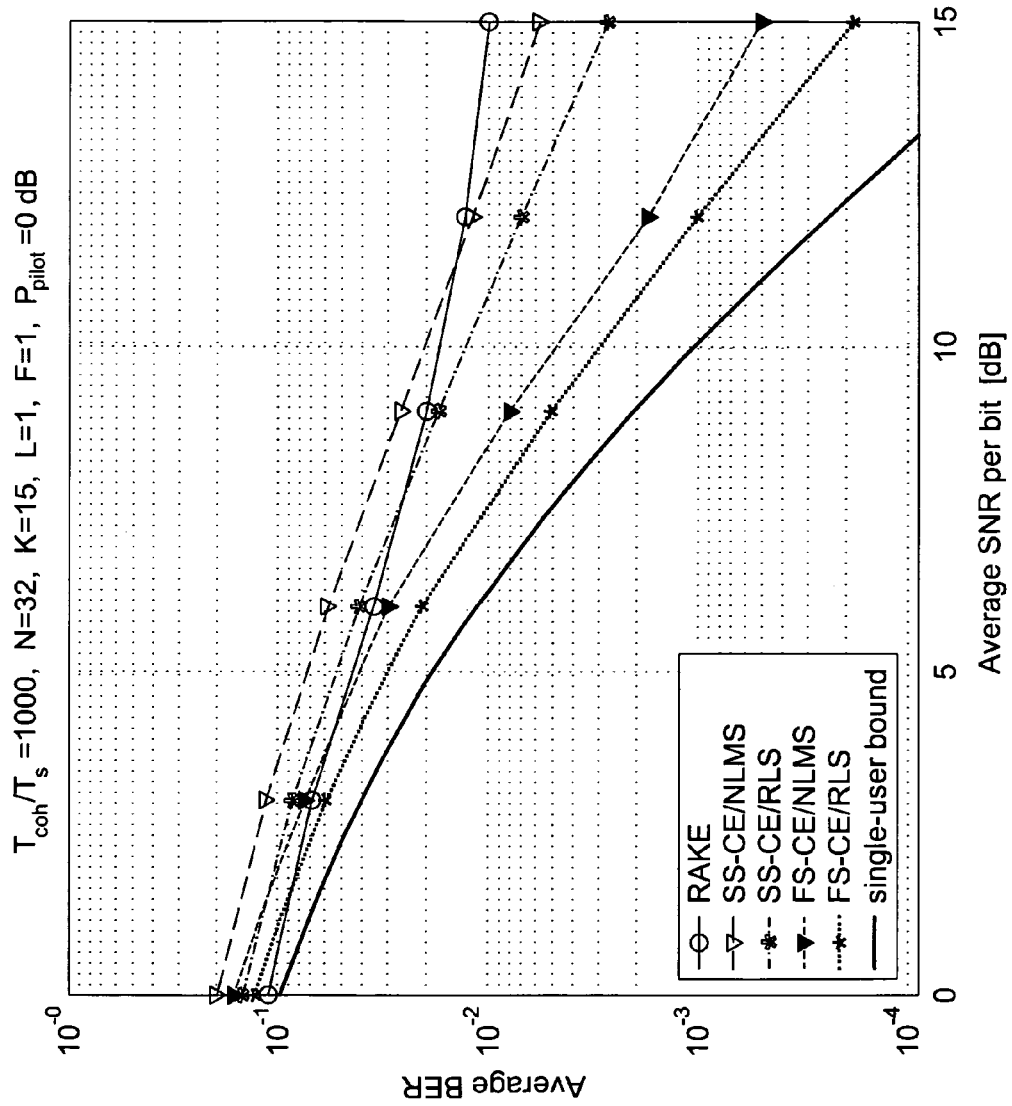
FIG. 23 illustrates a comparison chart of fractionally-spaced versus symbol-spaced adaptive chip equalizer receiver in half system load according to one embodiment of the invention.
Figure 24:
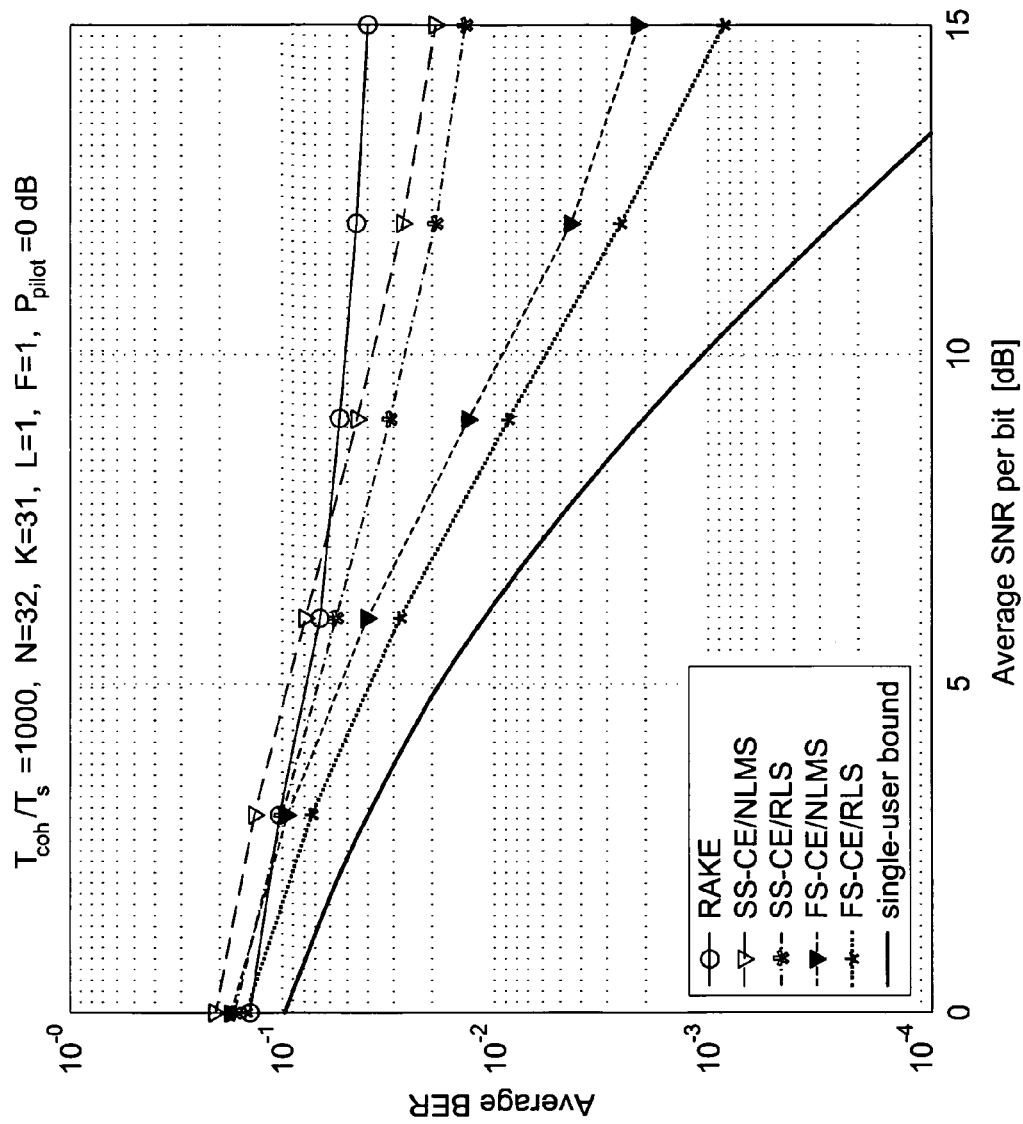
FIG. 24 illustrates a comparison chart of fractionally-spaced versus symbol-spaced adaptive chip equalizer receiver in full system load according to one embodiment of the invention.

FIG. 23 and FIG. 24 show the same curves as before but now for half (K=15) respectively full (K=31) system load. For half system load, the SS-CE and the FACE with RLS updating outperform the RAKE by 4 dB respectively 7 dB for a BER of $10^{-2}$. The performance of NLMS updating remains within one dB of that of RLS updating. For full system load, the RAKE clearly exhibits an error floor due to the increased MUI, while both the SS-CE and the FS-CE remain near/far resistant.

Figure 25:
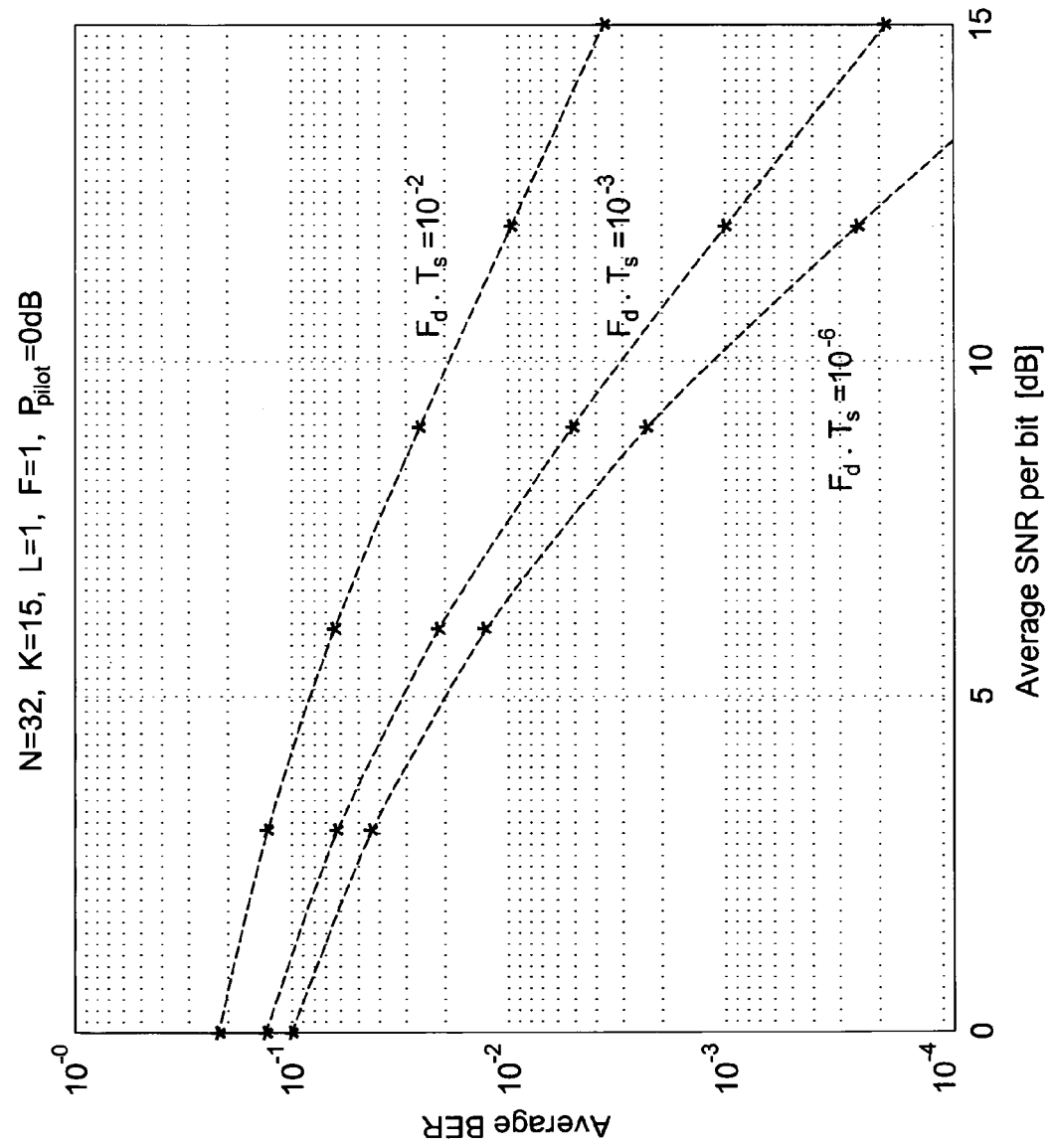
FIG. 25 illustrates a chart showing influence of Doppler-spread on performance of adaptive chip equalizer receiver according to one embodiment of the invention.

FIG. 25 shows the average BER versus the average SNR per bit of the FS-CE with RLS updating for different normalized Doppler spreads $F_d \cdot T_s$ ranging from $10^{-6}$, over $10^{-3}$ to $10^{-2}$. The optimal values of $\lambda$ were determined to be 0.9999, 0.9 respectively 0.8. The performance of the adaptive chip equalizer remains reasonable over a large range of the normalized Doppler spread. Only for a normalized Doppler spread of $F_d \cdot T_s = 10^{-2}$ the performance degrades significantly.

J.4 Conclusion

We have proposed a new pilot-aided adaptive fractionally-spaced receiver structure for the forward link of DS-CDMA systems employing aperiodic overlay scrambling codes and operating in fast fading multipath channels. By equalizing the multipath channel effects, the receiver restores the orthogonality between the different users and therefore suppresses the MUI. An NLMS or RLS symbol rate adaptation scheme, well-suited for fast fading channels, has been obtained by reversing the order of the equalizer and the descrambler/despreader for the updating part. Simulation results show that the proposed receiver outperforms the conventional RAKE receiver with perfect channel knowledge, for both slow and fast fading multipath channels.

K. Embodiment

Figure 26:
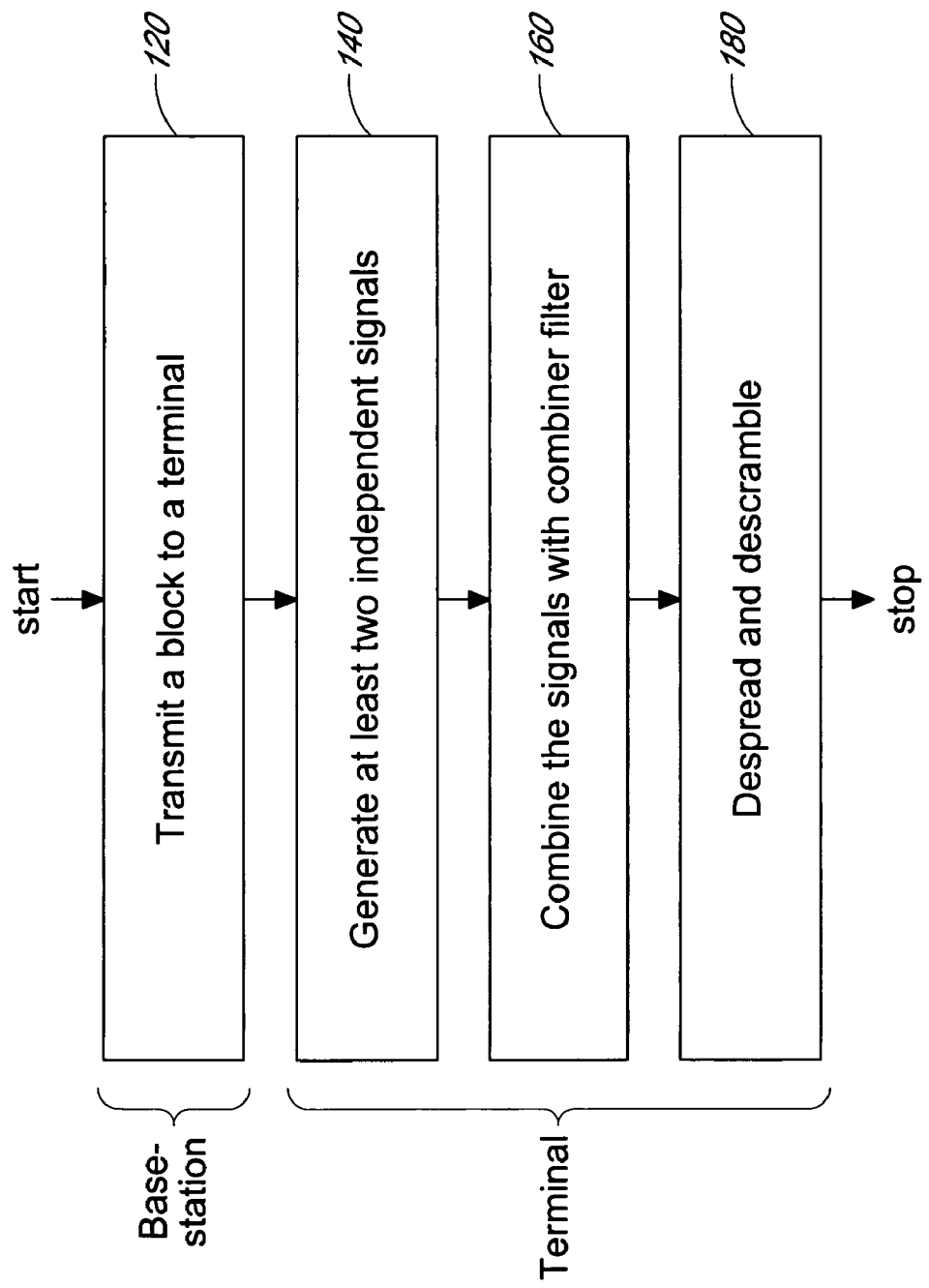
FIG. 26 illustrates a flowchart that explains the operation of a telecommunication system according to another embodiment of the invention.

Another embodiment of the invention is shown in FIG. 26. A block is transmitted from a basestation to a terminal (Step 120). The block comprises a plurality of chip symbols scrambled with a base station specific scrambling code, the plurality of chip symbols comprising a plurality of spread user specific data symbols which are user specific data symbols spread by using user specific spreading codes and at least one pilot symbol. In the terminal, at least two independent signals that comprise at least a channel distorted version of the transmitted block are generated (Step 140). After the independent signals are generated, the two independent signals are combined with a combiner filter with filter coefficients which are determined by using the pilot symbol, thus a combined filtered signal is obtained (Step 160). Lastly, the combined filtered signal is despread and descrambled with a composite code of the basestation specific scrambling code and one of the user specific codes (Step 180). While the above description has pointed out novel features of the invention as applied to various embodiments, the skilled person will understand that various omissions, substitutions, and changes in the form and details of the device or process illustrated may be made without departing from the scope of the invention. Therefore, the scope of the invention is defined by the appended claims rather than by the foregoing description. All variations coming within the meaning and range of equivalency of the claims are embraced within their scope.

APPENDIX

[1] L. B. Milstein, "Wideband code division multiple access," *IEEE Journal on Selected Areas in Communications*, vol. 18, no. 8, pp. 1344-1354, August 2000.

[2] R. Price and P. E. Green, "A communication technique for multipath channels," *IRE*, vol. 46, pp. 555-570, March 1958.

[3] S. Verdú, *Muliuser Detection*, Cambridge University Press, 1998.

[4] M. K Tsatsanis, "Inverse filtering for CDMA systems," *IEEE Transactions on Signal Processing*, vol. 45, no. 1, pp. 102-112, January 1997.

[5] M. K. Tsatsanis and Z. Xu, "Performance analysis of minimum variance receivers," *IEEE Transactions on Signal Processing*, vol. 46, no. 11, pp. 3014-3022, November 1998.

[6] X. Wang and H. V. Poor, "Blind equalization and multiuser detection in dispersive CDMA channels," *IEEE Transactions on Communications*. vol. 46, no. 1; January 1998; p. 91-103., vol. 46, no. 1, pp. 91-103, January 1998.

[7] Ghauri and D. T. M. Slock, "Blind and semi-blind single-user receiver techniques for asynchronous CDMA in multipath channels," in *GLOBECOM*, December 1998, vol. 6, pp. 3572-3577.

[8] F. Petré, M. Engels, A. Bourdoux, B. Gyselinckx, M. Moonen, and H. De Man, "Extended MMSE receiver for multiuser interference rejection in multipath DS-CDMA channels," in *Vehicular Technology Conference (VTC-Fall)*, September 1999, vol. 3, pp. 1840-1844.

[9] D. Gesbert, J. Sorelius, P. Stoica, and A. Paufraj, "Blind multiuser MMSE detector for CDMA signals in ISI channels," *IEEE Communications Letters*, vol. 3, no. 8, pp. 233-235, August 1999.

[10] M. Honig and M. K. Tsatsanis, "Adaptive techniques for multiuser CDMA receivers," *IEEE Signal Processing Magazine*, vol. 17, no. 3, pp. 49-61, May 2060.

[11] H. Holma and A. Toskala, *WCDMA for UMTS*, Wiley, 2001.

[12] A. Klein, "Data detection algorithms specially designed for the downlink of CDMA mobile radio systems," in *VTC*, May 1997, vol. 1, pp. 203-207.

[13] C. D. Frank and E. Visotsky, "Adaptive interference suppression for Direct-Sequence CDMA systems with long spreading codes," in *Allerton Conference on Communication, Control and Computing*, September 1998, pp. 411-420.

[14] I. Ghauri and D. T. M. Stock, "Linear receivers for the DS-CDMA downlink exploiting orthogonality of spreading sequences," in *Asilomar Conference on Signals, Systems and Computers*, November 1998, vol. 1, pp. 650-654.

[15] K. Hooli, M. Latva-aho, and M. Juntti, "Multiple access interference suppression with linear chip equalizers in WCDMA downlink receivers," in *GLOBECOM*, December 1999, vol. General Conference (Part A), pp. 467-471.

[16] T. P. Krauss, M. D. Zoltowski, and G. Leus, "Simple MMSE equalizers for CDMA downlink to restore chip sequence: Comparison to Zero-Forcing and RAKE," in *ICASSP*, May 2000, vol. 5, pp. 2865-2868.

[17] T. P. Krauss and M. D. Zoltowski, "Blind channel identification on CDMA forward link based on dual antenna receiver at handset and cross-relation," in *Asilomar Conference on Signals, Systems and Computers*, November 1999, vol. 1, pp. 75-79.

[18] K. Li and H. Liu, "A new blind receiver for downlink DS-CDMA communications," *IEEE Communications Letters, vol.* 3, no. 7, pp. 193-195, July 1999.

[19] S. Mudulodu and A. Paunraj, "A blind multiuser receiver for the CDMA downlink," in *ICASSP*, May 2000, vol. 5, pp. 2933-2936.

[20] R. G. Vaughan, "Polarization diversity in mobile comrmunications," *IEEE Transactions on Vehicular Technology*, vol. 39, no. 3, pp. 177-186, August 1990.

[21] N. S. Correal and B. D. Woerner, "Enhanced DS-CDMA uplink performance through base station polarization diversity and multistage interference cancellation," in *GLOBECOM*, December 1998, vol. 4, pp. 1905-1910.

[22] R. Fantacci and A. Galligani, "An efficient RAKE receiver architecture with pilot signal cancellation for downlink communications in DS-CDMA indoor wireless networks," *IEEE Transactions on Communications*, vol. 47, no. 6, pp. 823-827, June 1999.

[23] D. Gesbert, P. Duhamel, and S. Mayrargue, "On-line blind multichannel equalization based on mutually referenced filters," *IEEE Transactions on Signal Processing*, vol. 45, no. 9, pp. 2307-2317, September 1997.

[24] S. Haykin, *Adaptive Filter Theory*, Prentice Hall, 3 edition, 1996.

[25] F. Petré, M. Moonen, M. Engels, B. Gyselinckx, and H. De Man, "Pilot-aided adaptive chip equalizer receiver for interference suppression in DS-CDMA forward link," in *Vehicular Technology Conference* (VTC-Fall), September 2000, vol. 1, pp 303-308.

[26] S. Buzzi and H. V. Poor, "Channel estimation and multiuser detection in long-code DS/CDMA systems," *IEEE Journal on Selected Areas in Communications*, vol. 19, no. 8, pp. 1476-1487, August 2001

[27] J. G. Proakis, *Digital Communications*, Mcraw-Hill, 3 edition, 1995.

[28] Geert Leus, *Signal Posing Algorithms for CDMA-based Wireless Communications*, Ph.D. thesis, KULeuven, May 2000.

The invention claimed is:

1. A method of retrieving a desired user data symbol sequence from a received signal, the method comprising:
   receiving a channel modified version of a transmitted signal comprising a plurality of user data symbol sequences, each being encoded with a user specific known code and a pilot symbol;
   determining an equalization filter directly and in a deterministic way from the received signal whereby filter coefficients of the equalization filter are determined such that one version of the received signal after filtering by the equalization filter is as close as possible to a version of the pilot symbol, wherein the filter coefficients are directly computed by using an explicit equation; and
   applying the equalization filter on the received signal to thereby retrieve the transmitted signal,
wherein the explicit equation is one of the following:

$$\overline{w}_{a_j}^j = \arg\min_{w_{a_j}^j} \|w_{a_j}^j Y_{a_j} - x_0^j\|^2,$$

$$\overline{g}_{a_j}^j = \arg\min_{g_{a_j}^j} \|g_{a_j}^j Y_{a_j} C_p^{jH} - s_p^j\|^2,$$

$$\overline{g}_{a_j}^j = \arg\min_{g_{a_j}^j} \|g_{a_j}^j Y_{a_j} (C_p^{jH} C_p^j) - s_p^j C_p^j\|^2,$$

$$\overline{f}_{a_j}^j, \overline{s}_d^j = \arg\min_{f_{a_j}^j, s_d^j} \|f_{a_j}^j Y_{a_j} - s_d^j C_d^j - s_p^j C_p^j\|^2,$$

$$\overline{f}_a, \overline{s}_d = \arg\min_{f_a, s_d} \|f_a Y_a - s_d C_d - s_p C_p\|^2,$$

$$\overline{f}_a = \arg\min_{f_a} \|f_a Y_a (I_{BN} - C_d^H C_d) - s_p C_p\|^2,$$

$$\overline{g}_a = \arg\min_{g_a} \|g_a Y_a C_p^H - s_p\|^2,$$

$$\overline{g}_a = \arg\min_{g_a} \|g_a Y_a C_{p,k}^H - s_{p,k}\|^2,$$

$$\overline{g}_a = \arg\min_{g_a} \|g_a Y_{p,a} \overline{C}_{p,k}^H - s_{p,k}\|^2,$$

-continued $$\overline{f}_a, \overline{s}_d = \arg\min_{f_a, s_d} \|f_a Y_a - s_d C_d - s_p C_p\|^2, \text{ or}$$

$$\overline{f}_a = \arg\min_{f_a} \{\|f_a Y_{p,a} - s_p \overline{C}_p\|^2 + \|f_a Y_{d,a}(I_{DN} - \overline{C}_d^H \overline{C}_d)\|^2\},$$

wherein j is a base station number,
wherein $w_{a_j}^j, g_{a_j}^j, f_{a_j}^j, f_a, g_a$ are $1 \times (Q+1)M$ linear fully-trained chip-level equalizers,
wherein $Y_{a_j}, Y_a$ are $(Q+1)M \times BN$ output matrices,
wherein $x_o^j$ is a row of every input matrix $X_a$,
wherein $C_p^{jH}, C^p_j$, are pilot composite matrices,
wherein $s_p^j, s_p, S_{p,k}$ are pilot symbol vectors,
wherein $C_d^j$ is a multi-user composite code matrix,
wherein $s_d^j$ is a multi-user data symbol vector,
wherein $C_p, C_{p,k}^H$ are pilot code sequence matrices,
wherein $C_d, C_d^H$ are user code sequence matrices,
wherein $Y_{p,a}$ is part of output matrix $Y_a$,
wherein B is a block length,
wherein M is a number of antennas,
wherein N is a length of user specific codes,
wherein Q is a temporal smoothing factor,
wherein a denotes a delay,
wherein d denotes a user,
wherein p denotes a pilot, and
wherein H denotes a Hadamard matrix.

2. The method recited in claim 1, further comprising retrieving the desired user data symbol sequence by correlating the retrieved transmitted signal with the desired user specific known code.

3. The method recited in claim 1, wherein the determining the equalization filter does not rely on estimation of the channel characteristics.

4. The method recited in claim 1, wherein the determining the equalization filter does not rely on signal statistics.

5. The method recited in claim 1, wherein the transmitted signal further comprises a known pilot symbol sequence, being encoded with a pilot specific known code.

6. The method recited in claim 5, wherein the determining the equalization filter exploits a known pilot symbol sequence and a pilot specific known code.

7. The method recited in claim 6, wherein the determining the equalization -filter further exploits substantially all user specific known codes.

8. The method recited in claim 1, wherein the transmitted signal further comprises user specific known pilot symbol sequences, each being encoded with the user specific known code.

9. The method recited in claim 8, wherein the determining the equalization filter exploits a desired user specific known pilot symbol sequence and a desired user specific known code.

10. The method recited in claim 9, wherein the determining the equalization filter further exploits substantially all the user specific known pilot symbol sequences and substantially all the user specific known codes.

11. The method recited in claim 3, wherein the received signal comprises a plurality of channel modified versions being substantially different.

12. A system for retrieving a desired user data symbol sequence from a received signal, comprising:
   a receiving section configured to receive a channel modified version of a transmitted signal comprising a plurality of user data symbol sequences, each being encoded with a user specific known code and a pilot symbol;

a determining section configured to determine an equalization filter directly and in a deterministic way from the received signal whereby filter coefficients of the equalization filter are determined such that one version of the received signal after filtering by the equalization filter is as close as possible to a version of the pilot symbol, wherein the filter coefficients are directly computed by using an explicit equation; and an applying section configured to apply the equalization filter on the received signal to thereby retrieve the transmitted signal, wherein the explicit equation is one of the following:

$$\overline{w}_{a_j}^j = \operatorname*{argmin}_{w_{a_j}^j} \|w_{a_j}^j Y_{a_j} - x_0^j\|^2,$$

$$\overline{g}_{a_j}^j = \operatorname*{argmin}_{g_{a_j}^j} \|g_{a_j}^j Y_{a_j} C_p^{jH} - s_p^j\|^2,$$

$$\overline{g}_{a_j}^j = \operatorname*{argmin}_{g_{a_j}^j} \|g_{a_j}^j Y_{a_j}(C_p^{jH} C_p^j) - s_p^j C_p^j\|^2,$$

$$\overline{f}_{a_j}^j, \overline{s}_d^j = \arg \min_{f_{a_j}^j, s_d^j} \|f_{a_j}^j Y_{a_j} - s_d^j C_d^j - s_p^j C_p^j\|^2,$$

$$\overline{f}_a, \overline{s}_d = \arg \min_{f_a, s_d} \|f_a Y_a - s_d C_d - s_p C_p\|^2,$$

$$\overline{f}_a = \arg \min_{f_a} \|f_a Y_a (I_{BN} - C_d^H C_d) - -s_p C_p\|^2,$$

$$\overline{g}_a = \arg \min_{g_a} \|g_a Y_a C_p^H - s_p\|^2,$$

$$\overline{g}_a = \arg \min_{g_a} \|g_a Y_a C_{p,k}^H - s_{p,k}\|^2,$$

$$\overline{g}_a = \arg \min_{g_a} \|g_a Y_{p,a} \overline{C}_{p,k}^H - s_{p,k}\|^2,$$

$$\overline{f}_a, \overline{s}_d = \arg \min_{f_a, s_d} \|f_a Y_a - s_d C_d - s_p C_p\|^2, \text{ or}$$

$$\overline{f}_a = \operatorname*{argmin}_{f_a} \{\|f_a Y_{p,a} - s_p \overline{C}_p\|^2 + \|f_a Y_{d,a}(I_{DN} - \overline{C}_d^H \overline{C}_d)\|^2\},$$

wherein j is a base station number,
wherein $w_{a_j}^j$, $g_{a_j}^j$, $f_{a_j}^j$, $f_a$, $g_a$ are 1×(Q+1)M linear fully-trained chip-level equalizers,
wherein $Y_{a_j}$, $Y_a$ are (Q+1)M×BN output matrices,
wherein $x_o^j$ is a row of every input matrix $X_a$,
wherein $C_p^{jH}$, $C_{p,j}^p$ are pilot composite matrices,
wherein $s_p^j$, $s_p$, $S_{p,k}$ are pilot symbol vectors,
wherein $C_d^j$ is a multi-user composite code matrix,
wherein $s_d^j$ is a multi-user data symbol vector,
wherein $C_p$, $C_{p,k}^H$ are pilot code sequence matrices,
wherein $C_d$, $C_d^H$ are user code sequence matrices,
wherein $Y_{p,a}$ is part of output matrix $Y_a$,
wherein B is a block length,
wherein M is a number of antennas,
wherein N is a length of user specific codes,
wherein Q is a temporal smoothing factor,
wherein a denotes a delay,
wherein d denotes a user,
wherein p denotes a pilot, and
wherein H denotes a Hadamard matrix.

13. The system recited in claim 12, further comprising a retrieving section configured to retrieve the desired user data symbol sequence by correlating the retrieved transmitted signal with the desired user specific known code.

14. The system recited in claim 12, wherein the transmitted signal further comprises user specific known pilot symbol sequences, each being encoded with the user specific known code.

15. The system recited in claim 12, wherein the determining section is further configured not to rely on estimation of the channel characteristics.

16. The system recited in claim 15, wherein the received signal comprises a plurality of channel modified versions being substantially different.

17. A system for retrieving a desired user data symbol sequence from a received signal, comprising:

means for receiving a channel modified version of a transmitted signal comprising a plurality of user data symbol sequences, each being encoded with a user specific known code and a pilot symbol;

means for determining an equalization filter directly and in a deterministic way from the received signal whereby filter coefficients of the equalization filter are determined such that one version of the received signal after filtering by the equalization filter is as close as possible to a version of the pilot symbol, wherein the filter coefficients are directly computed by using an explicit equation; and means for applying the equalization filter on the received signal to thereby retrieve the transmitted signal, wherein the explicit equation is one of the following:

$$\overline{w}_{a_j}^j = \operatorname*{argmin}_{w_{a_j}^j} \|w_{a_j}^j Y_{a_j} - x_0^j\|^2,$$

$$\overline{g}_{a_j}^j = \operatorname*{argmin}_{g_{a_j}^j} \|g_{a_j}^j Y_{a_j} C_p^{jH} - s_p^j\|^2,$$

$$\overline{g}_{a_j}^j = \operatorname*{argmin}_{g_{a_j}^j} \|g_{a_j}^j Y_{a_j}(C_p^{jH} C_p^j) - s_p^j C_p^j\|^2,$$

$$\overline{f}_{a_j}^j, \overline{s}_d^j = \arg \min_{f_{a_j}^j, s_d^j} \|f_{a_j}^j Y_{a_j} - s_d^j C_d^j - s_p^j C_p^j\|^2,$$

$$\overline{f}_a, \overline{s}_d = \arg \min_{f_a, s_d} \|f_a Y_a - s_d C_d - s_p C_p\|^2,$$

$$\overline{f}_a = \arg \min_{f_a} \|f_a Y_a (I_{BN} - C_d^H C_d) - -s_p C_p\|^2,$$

$$\overline{g}_a = \arg \min_{g_a} \|g_a Y_a C_p^H - s_p\|^2,$$

$$\overline{g}_a = \arg \min_{g_a} \|g_a Y_a C_{p,k}^H - s_{p,k}\|^2,$$

$$\overline{g}_a = \arg \min_{g_a} \|g_a Y_{p,a} \overline{C}_{p,k}^H - s_{p,k}\|^2,$$

$$\overline{f}_a, \overline{s}_d = \arg \min_{f_a, s_d} \|f_a Y_a - s_d C_d - s_p C_p\|^2, \text{ or}$$

$$\overline{f}_a = \operatorname*{argmin}_{f_a} \{\|f_a Y_{p,a} - s_p \overline{C}_p\|^2 + \|f_a Y_{d,a}(I_{DN} - \overline{C}_d^H \overline{C}_d)\|^2\},$$

wherein j is a base station number,
wherein $w_{a_j}^j$, $g_{a_j}^j$, $f_{a_j}^j$, $f_a$, $g_a$ are 1×(Q+1)M linear fully-trained chip-level equalizers,
wherein $Y_{a_j}$, $Y_a$ are (Q+1)M×BN output matrices,
wherein $x_o^j$ is a row of every input matrix $X_a$, wherein $C_p^{j^H}$, $C^p{}_j$, are pilot composite matrices,
wherein $s_p^j$, $s_p$, $S_{p,k}$ are pilot symbol vectors,
wherein $C_d^j$ is a multi-user composite code matrix,
wherein $s_d^j$ is a multi-user data symbol vector,
wherein $C_p$, $C_{p,k}{}^H$ are pilot code sequence matrices,
wherein $C_d$, $C_d^H$ are user code sequence matrices,
wherein $Y_{p,a}$ is part of output matrix $Y_a$,
wherein B is a block length,
wherein M is a number of antennas,
wherein N is a length of user specific codes,
wherein Q is a temporal smoothing factor,
wherein a denotes a delay,
wherein d denotes a user,
wherein p denotes a pilot, and
wherein H denotes a Hadamard matrix.

18. A method of retrieving a desired user data symbol sequence from a received signal, the method comprising:
   receiving, by an electronic device, a channel modified version of a transmitted signal comprising a plurality of user data symbol sequences, each being encoded with a user specific known code;
   determining, by the electronic device, an equalization filter directly and in a deterministic way from the received signal without channel estimation, wherein filter coefficients are directly computed by using an explicit equation; and
   applying, by the electronic device, the equalization filter on the received signal to thereby retrieve the transmitted signal,
wherein the explicit equation is one of the following:

$$\overline{w}_{a_j}^j = \underset{w_{a_j}^j}{\operatorname{argmin}} \| w_{a_j}^j Y_{a_j} - x_0^j \|^2,$$

$$\overline{g}_{a_j}^j = \underset{g_{a_j}^j}{\operatorname{argmin}} \| g_{a_j}^j Y_{a_j} C_p^{j^H} - s_p^j \|^2,$$

$$\overline{g}_{a_j}^j = \underset{g_{a_j}^j}{\operatorname{argmin}} \| g_{a_j}^j Y_{a_j} (C_p^{j^H} C_p^j) - s_p^j C_p^j \|^2,$$

$$\overline{f}_{a_j}^j, \overline{s}_d^j = \arg \underset{f_{a_j}^j, s_d^j}{\min} \| f_{a_j}^j Y_{a_j} - s_d^j C_d^j - s_p^j C_p^j \|^2,$$

$$\overline{f}_a, \overline{s}_d = \arg \underset{f_a, s_d}{\min} \| f_a Y_a - s_d C_d - s_p C_p \|^2,$$

$$\overline{f}_a = \arg \underset{f_a}{\min} \| f_a Y_a (I_{BN} - C_d^H C_d) - s_p C_p \|^2,$$

$$\overline{g}_a = \arg \underset{g_a}{\min} \| g_a Y_a C_p^H - s_p \|^2,$$

$$\overline{g}_a = \arg \underset{g_a}{\min} \| g_a Y_a C_{p,k}^H - s_{p,k} \|^2,$$

$$\overline{g}_a = \arg \underset{g_a}{\min} \| g_a Y_{p,a} \overline{C}_{p,k}^H - s_{p,k} \|^2,$$

-continued $$\overline{f}_a, \overline{s}_d = \arg \underset{f_a, s_d}{\min} \| f_a Y_a - s_d C_d - s_p C_p \|^2, \text{ or}$$

$$\overline{f}_a = \underset{f_a}{\operatorname{argmin}} \{ \| f_a Y_{p,a} - s_p \overline{C}_p \|^2 + \| f_a Y_{d,a} (I_{DN} - \overline{C}_d^H \overline{C}_d) \|^2 \},$$

wherein j is a base station number,
wherein $w_{a_j}^j$, $g_{a_j}^j$, $f_{a_j}^j$, $f_a$, $g_a$ are $1 \times (Q+1)M$ linear fully-trained chip-level equalizers,
wherein $Y_{a_j}$, $Y_a$ are $(Q+1)M \times BN$ output matrices,
wherein $x_o^j$ is a row of every input matrix $X_a$,
wherein $C_p^{j^H}$, $C^p{}_j$, are pilot composite matrices,
wherein $s_p^j$, $s_p$, $S_{p,k}$ are pilot symbol vectors,
wherein $C_d^j$ is a multi-user composite code matrix,
wherein $s_d^j$ is a multi-user data symbol vector,
wherein $C_p$, $C_{p,k}{}^H$ are pilot code sequence matrices,
wherein $C_d$, $C_d^H$ are user code sequence matrices,
wherein $Y_{p,a}$ is part of output matrix $Y_a$,
wherein B is a block length,
wherein M is a number of antennas,
wherein N is a length of user specific codes,
wherein Q is a temporal smoothing factor,
wherein a denotes a delay,
wherein d denotes a user,
wherein p denotes a pilot, and
wherein H denotes a Hadamard matrix.

19. The method recited in claim 1, wherein the filter coefficients are directly calculated without an intermediate filter coefficient adjustment.

20. The system recited in claim 12, wherein the filter coefficients are directly calculated without an intermediate filter, coefficient adjustment.

21. The system recited in claim 17, wherein the filter coefficients are directly calculated without an intermediate filter coefficient adjustment.

22. The method recited in claim 1, wherein the as close as possible determination is performed according to a norm defined on signals.

23. The method recited in claim 22, wherein the norm comprises a two-norm resulting in least square sense minimization.

24. The system recited in claim 12, wherein the as close as possible determination is performed according to a norm defined on signals.

25. The system recited in claim 24, wherein the norm comprises a two-norm resulting in least square sense minimization.

26. The system recited in claim 17, wherein the as close as possible determination is performed according to a norm defined on signals.

27. The system recited in claim 26, wherein the norm comprises a two-norm resulting in least square sense minimization.

* * * * *

UNITED STATES PATENT AND TRADEMARK OFFICE
CERTIFICATE OF CORRECTION

PATENT NO. : 7,623,571 B2
APPLICATION NO. : 11/599680
DATED : November 24, 2009
INVENTOR(S) : Frederik Petre et al.

It is certified that error appears in the above-identified patent and that said Letters Patent is hereby corrected as shown below:

At (Item 56), page 2, column 1, line 27 under Other Publications, change "Suppersion" to --Suppression--.

At (Item 56), page 2, column 1, line 27, page 2, column 1, line 30-31 under Other Publications, change "Doenlink Exploting" to --Downlink Exploiting--.

At (Item 56), page 2, column 2, line 27 under Other Publications, change "Communicationsl"," to --Communications",--.

At (Item 56), page 2, column 2, line 34 under Other Publications, change "Receiversl"" to --Receivers"--.

At column 1, line 8 after "filed" insert --on--.

At column 1, line 47 change "[11]," to --[11]),--.

At column 4, line 46 change after "invention" insert --.--.

At column 4, line 46-48 after "invention" delete "FIG. 14 illustrates........invention." and insert the same on Column 4, Line 47 as a new paragraph.

At column 8, line 38 after "code" insert --.--.

At column 10, line 50 change "user's." to --users.--.

At column 11, line 10 after "sequence" insert --.--.

At column 11, line 57 change "corrected" to --connected--.

At column 13, line 56 after "antenna" insert --.--.

Signed and Sealed this

Twenty-first Day of December, 2010

David J. Kappos
*Director of the United States Patent and Trademark Office*

CERTIFICATE OF CORRECTION (continued)
U.S. Pat. No. 7,623,571 B2

At column 14, line 17-19 change " $h^j[n]=[h_1^j[n]h_2^j[n]\ldots h_M^j[]]^T$ " to
-- $\mathbf{h}^j[n] = \begin{bmatrix} h_1^j[n] & h_2^j[n] & \ldots & h_M^j[n] \end{bmatrix}^T$ --.

At column 14, line 45-48 after " $\frac{1}{T_c}$ " insert --.--.

At column 14, line 49 change "oversampling;" to --oversampling.--.

At column 15, line 15 after "as" insert --:--.

At column 15, line 20-24 change " $Y_a = \sum_{j=1}^{J} H^j X_a^j + E_a$ " to -- $\mathbf{Y}_a = \sum_{j=1}^{J} \mathcal{H}^j \mathbf{X}_a^j + \mathbf{E}_a$ --.

At column 15, line 30-35 change "
$H^j = \begin{bmatrix} h^j[\delta_j+L_j] & \cdots & h^j[\delta_j] & 0 & \cdots & 0 \\ 0 & h^j[\delta_j+L_j] & \cdots & h^j[\delta_j] & \cdots & 0 \\ & & \ddots & & \ddots & \\ 0 & \cdots & 0 & h^j[\delta_j+L_j] & \cdots & h^j[\delta_j] \end{bmatrix}$
" to
--
$\mathcal{H}^j = \begin{bmatrix} h^j[\delta_j+L_j] & \cdots & h^j[\delta_j] & 0 & \cdots & 0 \\ 0 & h^j[\delta_j+L_j] & \cdots & h^j[\delta_j] & \cdots & 0 \\ & & \ddots & & \ddots & \\ 0 & \cdots & 0 & h^j[\delta_j+L_j] & \cdots & h^j[\delta_j] \end{bmatrix}$
--.

At column 15, line 40 change " $X_a^j = [x_{a-\delta_j-L_j}^{jT} \ldots x_{a-\delta_j+Q}^{jT}]^T$ " to
-- $\mathbf{X}_a^j = \begin{bmatrix} \mathbf{x}_{a-\delta_j-L_j}^{jT} & \cdots & \mathbf{x}_{a-\delta_j+Q}^{jT} \end{bmatrix}^T$ --.

At column 16, line 66 change "basestation" to --base-station:--.

At column 16, line 67 change " $s_d^j = [s_1^j \ldots s_{K_j}^j]$ " to -- $\mathbf{s}_d^j = \begin{bmatrix} s_1^j & \ldots & s_{K_j}^j \end{bmatrix}$ --.

At column 17, line 6 change "s-p" to -- $s_p^j$ --.

At column 17, line 12 after "base-station" insert --:--.

At column 17, line 30 after " $\mathbf{c}_s^j[i]$ " insert --:--.

At column 17, line 56 change " $\{Y_{a_j}\}_{a_j=A_1^j}^{A_2^j}$ , " to -- $\{\mathbf{Y}_{a_j}\}_{a_j=A_1^j}^{A_2^j}$ , --.

At column 18, line 37 after "estimates" insert --:--.

At column 19, line 10 change " $Y_{a_j}(\delta_j - Q \leq a_j \leq \delta_j + L_j);$ " to -- $\mathbf{Y}_{a_j}(\delta_j - Q \leq a_j \leq \delta_j + L_j).$ --.

CERTIFICATE OF CORRECTION (continued)
U.S. Pat. No. 7,623,571 B2

At column 20, line 11 change " $C_{k_k}^{\ j},$ " to -- $C_{k_j}^{\ j},$ --.

At column 20, line 24 after "write" insert --:--.

At column 20, line 30 change " $C_d^{\ j}C_p^{\ j^H}=I_B$ " to -- $\mathbf{C}_p^j \mathbf{C}_p^{jH} = \mathbf{I}_B$ --.

At column 20, line 34 after "problem" insert --:--.

At column 20, line 46 after "condition" insert --:--.

At column 20, line 55-59 change " $\frac{1}{A_j}g^jY^jC_p^j - s_p^j = 0$ " to -- $\frac{1}{A^j}g^j y^j C_p^{jH} - s_p^j = 0$ --.

At column 21, line 15 change "basestation" to --base-station--.

At column 21, line 32 change "should-then" to --should then--.

At column 21, line 51 change " $Y_{e_j}(\delta_j - \le a_j \le \delta_j + L_j).$ " to -- $Y_{e_j}(\delta_j - Q \le a_j \le \delta_j + L_j).$ --.

At column 22, line 55 change " $C_p^{\ j}C_d^{\ j^H}$ " to -- $\mathbf{C}_p^j \mathbf{C}_d^{jH}$ --.

At column 22, line 58 change " $f_{a_j}^{\ f}$ " to -- $\mathbf{f}_{a_j}^{j}$ --.

At column 23, line 15-16 change " $\tilde{f}_{a_j}^j = \underset{f_{a_j}^j}{\text{argmin}}\{\|f_{a_j}^j Y_{a_j} C_p^{jH} - s_p^j\|^2 + \|f_{a_j}^j Y_{a_j}(I_{BN} - C_d^{jH}C_d^j - C_p^{jH}C_p^j)\|^2\}$ "

to -- $\tilde{\mathbf{f}}_{a_j}^j = \underset{\mathbf{f}_{a_j}^j}{\text{arg min}}\left\{\|\mathbf{f}_{a_j}^j \mathbf{Y}_{a_j} \mathbf{C}_p^{jH} - \mathbf{s}_p^j\|^2 + \|\mathbf{f}_{a_j}^j \mathbf{Y}_{a_j}(\mathbf{I}_{BN} - \mathbf{C}_d^{jH}\mathbf{C}_d^j - \mathbf{C}_p^{jH}\mathbf{C}_p^j)\|^2\right\}$ --.

At column 23, line 31, change " $f_{a_j}^{\ j} Y_{a_j}(I_{BN} - C_d^{\ j^H}C_d^{\ j} - C_{p_H}^{\ j}C_p^{\ j})$ "

to -- $\mathbf{f}_{a_j}^j \mathbf{Y}_{a_j}\left(\mathbf{I}_{BN} - \mathbf{C}_d^{jH}\mathbf{C}_d^j - \mathbf{C}_p^{jH}\mathbf{C}_p^j\right)$ --.

At column 24, line 22 change " $Y_{\delta_j} 1,$ " to -- $\mathbf{Y}_{\delta_j}[1],$ --.

At column 24, line 40 change " $Y_{\delta_j}[i]c_p^{\ j[i]H}$ " to -- $\mathbf{Y}_{\delta_j}[i]\mathbf{c}_p^j[i]^H$ --.

CERTIFICATE OF CORRECTION (continued)
U.S. Pat. No. 7,623,571 B2

At column 25, line 16 change "$\mathcal{G}(JNLM)$" to --$\mathcal{O}(JNLM)$--.

At column 25, line 20 after "branches" insert --:--.

At column 25, line 65 change "[24]0." to --[24].--.

At column 26, line 20 after "symbol" insert --:--.

At column 26, line 42 change "$\bar{s}d_{du}[i]$" to -- $\bar{s}_{du}[i]$ --.

At column 26, line 44 change "$\hat{s}d_{du}[i]$." to -- $\hat{s}_{du}[i]$. --.

At column 27, line 12 change "new-values" to --new values--.

At column 27, line 32 after "$g_{a_j}^{j}[i]$" to --.--.

At column 28, line 36-37 change "basestation" to --base-station--.

At column 28, line 55 change "chin level" to --chip-level--.

At column 32, line 45 change "$x[n] = \sum_{k=1}^{K} s_k[i]c_k + s_p[i]c_p[n]$" to -- $x[n] = \sum_{k=1}^{K} s_k[i]c_k[n] + s_p[i]c_p[n]$ --.

At column 33, line 35 change "M-1 FIR" to --M×1 FIR--.

At column 33, line 40 after "as" insert --:--.

At column 33, line 41-42 change "$Y_a = \mathcal{H}X_a + E_a$" to -- $Y_a = \mathcal{H}X_a + E_a$ --.

At column 34, line 1 after "vector" insert --:--.

At column 34, line 15 after "matrix" insert --:--.

At column 34, line 36 change "$\{X_a\}_{a=-Q}^{L}$" to -- $\{X_a\}_{a=-Q}^{L}$ --.

At column 34, line 37 change "$\{X_a\}_{a=-Q}^{L}$." to -- $\{Y_a\}_{a=-Q}^{L}$. --.

At column 35, line 66 change "$Y_a[i]\tilde{C}d[i]$" to -- $Y_a[i]\tilde{C}_d[i]$ --.

At column 36, line 44 change "&" to --$g_a$--.

CERTIFICATE OF CORRECTION (continued)
U.S. Pat. No. 7,623,571 B2

At column 36, line 48-49 change "$B \geq r(61)$" to -- $B \geq r$ --.

At column 37, line 4 change "continous" to --continuous--.

At column 40, line 28 change "basestation" to --base-station--.

At column 42, line 21 change "a" to --as--.

At column 42, line 35-37 change "$\tilde{f}_a = s_p C_p Y_a^H \{Y_a(I_{BN} - C_d^H C_d) Y_a^H\}^-$"

to -- $\tilde{f}_a = s_p C_p Y_a^H \{Y_a(I_{BN} - C_d^H C_d) Y_a^H\}^{-1}$ --.

At column 42, line 61 change "$\hat{s}k[i]$" to -- $\hat{s}_k[i]$ --.

At column 43, line 11 change "$Y_a.[i]$" to --$Y_a[i]$--.

At column 45, line 45-47 change "$y[i] = \mathcal{H}[i] \cdot x[i] + \eta[i]$" to -- $y[i] = \mathcal{H}[i] \cdot x[i] + \eta[i]$ --.

At column 47, line 2 change "$\tilde{b}_k = c_k[i] \cdot G_1[i] \cdot y_1[i] + c_k[i] \cdot G_2[i] \cdot y_2[i]$"

to -- $\tilde{b}_k[i] = c_k[i] \cdot G_1[i] \cdot y_1[i] + c_k[i] \cdot G_2[i] \cdot y_2[i]$ --.

At column 47, line 56 change "[c$_9$[i,0]" to --[c$_p$[i,0]--.

At column 48, line 21 change "BEgR-urve" to --BER-curve--.

At column 49, line 66 change "Muliuser" to --Multiuser--.

At column 50, line 10-11 after "communications." delete "vol. 46, no. 1; January 1998; p. 91-103.,".

At column 50, line 21 change "Paufraj," to --Paulraj,--.

At column 50, line 27 change "2060." to --2000.--.

At column 50, line 58 change "Paunraj," to --Paulraj,--.

At column 50, line 61-62 change "comrmunications,"" to --communications,"--.

At column 51, line 20 after "2001" insert --.--.

At column 51, line 21 change "Mcraw-Hill," to --McGraw-Hill,--.

CERTIFICATE OF CORRECTION (continued)
U.S. Pat. No. 7,623,571 B2

At column 51, line 23 change "Posing" to --Processing--.

At column 51, line 60 in Claim 1, change " $\bar{f}_a = \arg \min_{f_a} \|f_a Y_a (I_{BN} - C_d^H C_d) - s_p C_p\|^2,$ "

to -- $\bar{f}_a = \arg \min_{f_a} \|f_a Y_a (I_{BN} - C_d^H C_d) - s_p C_p\|^2,$ --.

At column 52, line 12 in Claim 1, change "are(Q+1)M×BN" to --are (Q+1)M×BN--.

At column 52, line 13 in Claim 1, change "$X_o^J$" to --$x_o^j$--.

At column 52, line 46 in Claim 7, change "-filter" to --filter--.

At column 53, line 35 in Claim 12, change " $\bar{f}_a = \arg \min_{f_a} \|f_a Y_a (I_{BN} - C_d^H C_d) - s_p C_p\|^2,$ "

to -- $\bar{f}_a = \arg \min_{f_a} \|f_a Y_a (I_{BN} - C_d^H C_d) - s_p C_p\|^2,$ --.

At column 53, line 52 in Claim 12, change "are(Q+1)M×BN" to --are (Q+1)M×BN--.

At column 53, line 53 in Claim 12, change "$x_o^J$" to --$x_o^j$--.

At column 54, line 50 in Claim 17, change " $\bar{f}_a = \arg \min_{f_a} \|f_a Y_a (I_{BN} - C_d^H C_d) - s_p C_p\|^2,$ "

to -- $\bar{f}_a = \arg \min_{f_a} \|f_a Y_a (I_{BN} - C_d^H C_d) - s_p C_p\|^2,$ --.

At column 54, line 66 in Claim 17, change "are(Q+1)M×BN" to --are (Q+1)M×BN--.

At column 54, line 67 in Claim 17, change "$x_o^J$" to --$x_o^j$--.

At column 55, line 49 in Claim 18, change " $\bar{f}_a = \arg \min_{f_a} \|f_a Y_a (I_{BN} - C_d^H C_d) - s_p C_p\|^2,$ "

to -- $\bar{f}_a = \arg \min_{f_a} \|f_a Y_a (I_{BN} - C_d^H C_d) - s_p C_p\|^2,$ --.

At column 56, line 9 in Claim 18, change "are(Q+1)M×BN" to --are (Q+1)M×BN--.

At column 56, line 10 in Claim 18, change "$x_o^J$" to --$x_o^j$--.